US012628140B2

(12) United States Patent
Yang et al.

(10) Patent No.: US 12,628,140 B2
(45) Date of Patent: May 12, 2026

(54) ALLOCATING A PLURALITY OF RESOURCE ALLOCATION UNITS TO A STATION BY USING ONE OR MORE USER INFORMATION FIELDS

(71) Applicant: HUAWEI TECHNOLOGIES CO., LTD., Shenzhen (CN)

(72) Inventors: Mao Yang, Xi'an (CN); Bo Li, Xi'an (CN); Mengshi Hu, Shenzhen (CN); Jian Yu, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 389 days.

(21) Appl. No.: 17/861,001

(22) Filed: Jul. 8, 2022

(65) Prior Publication Data

US 2022/0353865 A1     Nov. 3, 2022

Related U.S. Application Data

(63) Continuation of application No. PCT/CN2021/070882, filed on Jan. 8, 2021.

(30) Foreign Application Priority Data

Jan. 10, 2020     (CN) .......................... 202010028087.9

(51) Int. Cl.
  *H04W 72/0453*     (2023.01)
  *H04L 5/00*     (2006.01)
        (Continued)
(52) U.S. Cl.
  CPC ....... *H04W 72/0453* (2013.01); *H04L 5/0044* (2013.01); *H04L 5/0053* (2013.01);
        (Continued)

(58) Field of Classification Search
  CPC ............. H04W 72/0453; H04W 72/23; H04W 72/231; H04W 72/232; H04W 84/12
  See application file for complete search history.

(56) References Cited

U.S. PATENT DOCUMENTS

2017/0181136 A1*   6/2017   Bharadwaj ............ H04W 72/12
2017/0325202 A1   11/2017   Verma et al.
        (Continued)

FOREIGN PATENT DOCUMENTS

CN     107079431 A     8/2017
CN     107925470 A     4/2018
        (Continued)

OTHER PUBLICATIONS

Liu et al., "Interleaving Methods for Multiple Resource Units Combination in WLAN", Dec. 20, 2019, pp.1-12 (Year: 2019).*
        (Continued)

*Primary Examiner* — Brian T Le
(74) *Attorney, Agent, or Firm* — Fish & Richardson P.C.

(57)     ABSTRACT

The embodiments of the application provides a resource allocation method. In an example method, a trigger frame is sent by an access point to a station. The trigger frame includes one user information field, and the user information field may indicate a plurality of resource units allocated to the station. The technical solutions provided in this application may be applied to Wi-Fi systems such as 802.11ax and 802.11be.

15 Claims, 25 Drawing Sheets

(51) Int. Cl.
*H04W 72/044* (2023.01)
*H04W 72/23* (2023.01)
*H04W 72/53* (2023.01)
*H04W 84/12* (2009.01)

(52) U.S. Cl.
CPC .......... *H04L 5/0091* (2013.01); *H04L 5/0094* (2013.01); *H04W 72/23* (2023.01); *H04W 72/53* (2023.01); *H04L 5/0064* (2013.01); *H04W 72/044* (2013.01); *H04W 84/12* (2013.01)

(56) References Cited

U.S. PATENT DOCUMENTS

| | | | |
|---|---|---|---|
| 2019/0053275 A1 | 2/2019 | Lanante et al. | |
| 2019/0124556 A1* | 4/2019 | Verma | H04L 5/0064 |
| 2019/0327746 A1 | 10/2019 | Porat et al. | |
| 2020/0014509 A1 | 1/2020 | Asterjadhi et al. | |
| 2020/0329495 A1 | 10/2020 | Ryu et al. | |
| 2021/0194630 A1* | 6/2021 | Liu | H04L 5/0005 |
| 2022/0224381 A1* | 7/2022 | Yun | H04B 7/063 |
| 2022/0353865 A1 | 11/2022 | Yang et al. | |

FOREIGN PATENT DOCUMENTS

| | | |
|---|---|---|
| CN | 109315013 A | 2/2019 |
| GB | 2575330 A | 1/2020 |
| WO | 2016186310 A1 | 11/2016 |

OTHER PUBLICATIONS

Huang et al., "Signaling Support for Multi-RU Assignment," IEEE 802.11-19/1868r2, Jan. 8, 2020, 12 pages.
Yu et al., "Multiple RU discussion," IEEE 802.11-19/1914r3, Nov. 6, 2019, 10 pages.
Liu et al., "Multiple RU Combinations for EHT," IEEE 802.11-19/1907r0, Nov. 12, 2019, 19 pages.
Porat et al., "Multi-RU Support," IEEE 802.11-19/1908r0, Nov. 8, 2019, 15 pages.
IEEE P802.11ax/D6.0, "Draft Standard for Information Technology—Tele-communications and Information Exchange Between Systems Local and Metropolitan Area Networks-Specific Requirements, Part 11: Wireless LAN Medium Access Control (MAC) and Physical Layer (PHY) Specifications," Nov. 2019, 780 pages.
International Search Report and Written Opinion in International Appln. No. PCT/CN2021/070882, mailed on Apr. 8, 2021, 15 pages (with English translation).
Patil et al., "Resolution for CIDs related to UORA," IEEE 802.11-19/0508r2, May 2019, 18 pages.
Kim et al., "Multiple RU Support for 11be," IEEE 802.11-19/2161r1, Jan. 9, 2020, 14 pages.
Liu et al., "Multiple RU Combinations for EHT," IEEE 802.11-19/1907r1, Nov. 12, 2019, 22 pages.
Park et al., "Consideration on 320MHz Bandwidth and 16 Spatial Streams," IEEE 802.11-19/0778r0, May 13, 2019, 21 pages.
Office Action in Japanese Appln. No. 2022-542443, mailed on Aug. 14, 2023, 9 pages (with English translation).
Office Action in Canadian Appln. No. 3,164,364, mailed on Aug. 8, 2023, 5 pages.
Office Action in Indian Appln. No. 202237042754, mailed on Feb. 28, 2023, 6 pages (with English translation).
Khorov (IITP RAS) et al., "Random Access RU Allocation in the Trigger Frame," IEEE 802.11-16/0582r0, May 16, 2016, 24 pages.
Huang (Panasonic) et al., "Enabling persistent allocation for EHT," IEEE 802.11-19/0806r2, Jul. 31, 2019, 10 pages.
Office Action in Japanese Appln. No. 2023-200992, mailed on Oct. 28, 2024, 6 pages (with English translation).
Khorov et al., "Random Access RU Allocation in the Trigger Frame," IEEE 802.11-16/0582r2, May 2016, 24 pages.
Office Action in Japanese Appln. No. 2025-067672, mailed on Jan. 27, 2026, 7 pages (with English translation).

* cited by examiner

| Data (data) (STA 1) | Data (data) (STA 1) | ⋮ | Data (data) (STA 1) |
|---|---|---|---|
| High-efficiency long training field (HE-LTF) | High-efficiency long training field (HE-LTF) | | High-efficiency long training field (HE-LTF) |
| High-efficiency short training field (HE-STF) | High-efficiency short training field (HE-STF) | | High-efficiency short training field (HE-STF) |

High-efficiency signal field A (HE-SIGA)

Repeated legacy signal field (RL-SIG)

Legacy signal field (L-SIG)

Legacy long training field (L-LTF)

Legacy short training field (L-STF)

Trigger frame (trigger frame)

FIG. 3

RU distribution in first 20 MHz or second 20 MHz in 80 MHz

RU distribution in a third 20 MHz frequency band range
or a fourth 20 MHz frequency band range in 80 MHz RU distribution in a third 20 MHz frequency band range
or a fourth 20 MHz frequency band range in 80 MHz Combined RU Uncombined RU RU distribution in first 20 MHz or second 20 MHz in 80 MHz Combined RU Uncombined RU RU distribution in a 20 MHz frequency band range in 80 MHz
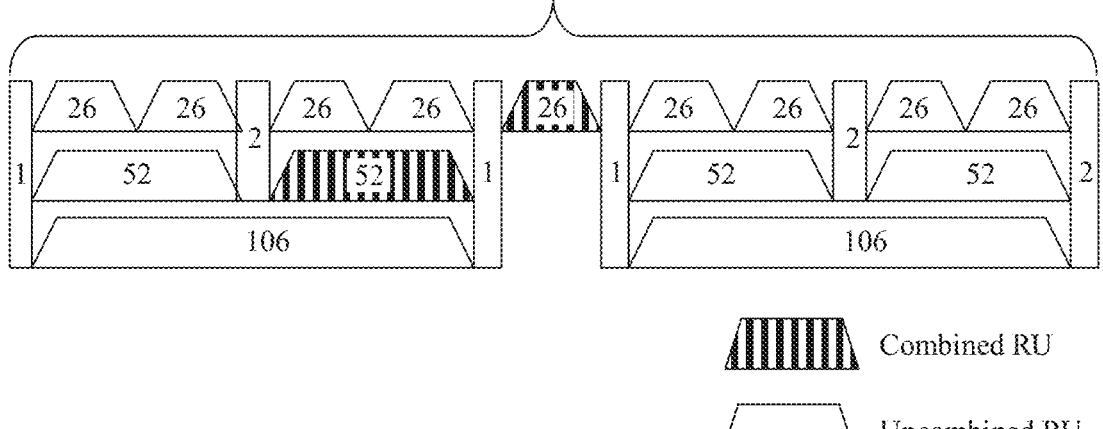
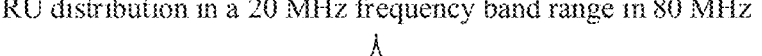
FIG. 16
RU distribution in a 20 MHz frequency band range in 80 MHz
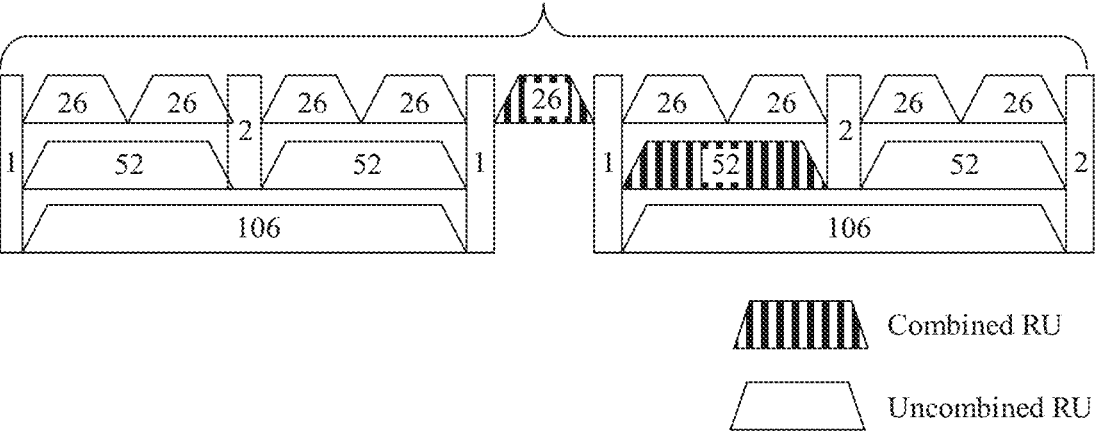
FIG. 17

RU distribution in a 20 MHz frequency band range in 80 MHz

RU distribution in a 20 MHz frequency band range in 80 MHz

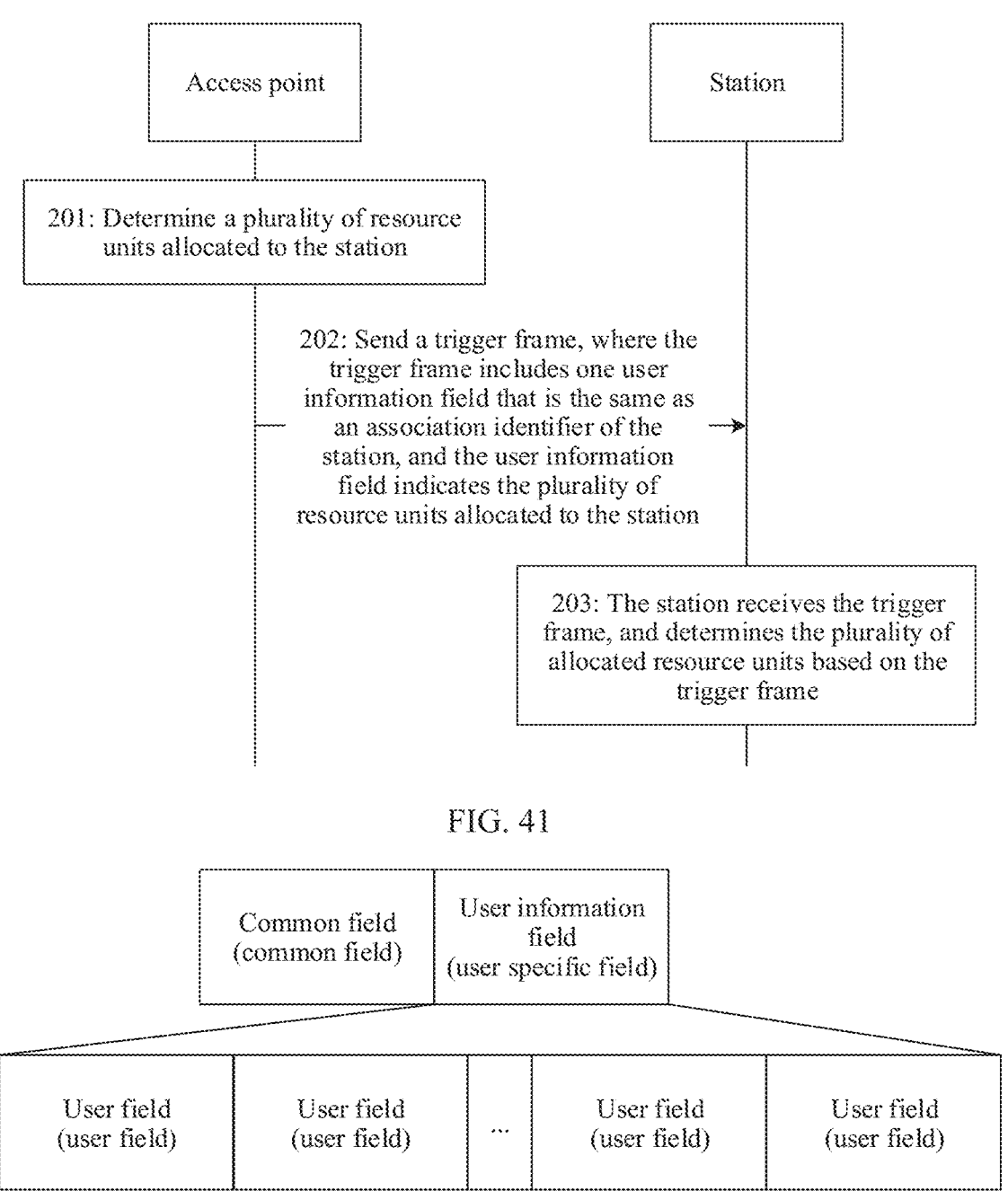

Access point

201: Determine a plurality of resource units allocated to the station

202: Send a trigger frame, where the trigger frame includes one user information field that is the same as an association identifier of the station, and the user information field indicates the plurality of resource units allocated to the station

Station

203: The station receives the trigger frame, and determines the plurality of allocated resource units based on the trigger frame

FIG. 41

| Common field (common field) | User information field (user specific field) |
|---|---|

| User field (user field) | User field (user field) | ... | User field (user field) | User field (user field) |
|---|---|---|---|---|

FIG. 42

ALLOCATING A PLURALITY OF RESOURCE ALLOCATION UNITS TO A STATION BY USING ONE OR MORE USER INFORMATION FIELDS

CROSS-REFERENCE TO RELATED APPLICATION

This application is a continuation of International Application No. PCT/CN2021/070882, filed on Jan. 8, 2021, which claims priority to Chinese Patent Application No. 202010028087.9, filed on Jan. 10, 2020. The disclosure of the aforementioned applications are hereby incorporated by reference in their entireties.

TECHNICAL FIELD

This application relates to the field of communication technologies, and in particular, to a resource allocation method, a communication apparatus, and a related device.

BACKGROUND

In a conventional wireless local area network (WLAN), when each station needs to send uplink data, the station occupies an entire channel for data transmission in a contention manner, and consequently, frequency utilization efficiency is greatly reduced. To improve this situation, currently, an OFDMA technology is used to divide a radio channel into a plurality of subchannels (subcarriers) in frequency domain, to form resource units (RU). User data is carried on a part of resource units instead of occupying the entire channel, so that a plurality of users can simultaneously perform parallel transmission in each time period without queuing or contending with each other. This improves frequency utilization efficiency.

In a downlink, an access point (AP) may determine, based on a priority of downlink data of each station, a status of allocating an RU. However, in an uplink, the AP needs to notify, by using a trigger frame, a terminal device of an allocated resource unit. The trigger frame includes a plurality of user information fields, and one user information field includes information that one station needs to read. For example, M user information fields are information that a station 1 to a station M need to read respectively. A resource unit allocation subfield in the user information field indicates a resource unit allocated to the station. Further, the station may send a data packet on the allocated resource unit.

However, sizes of data that needs to be transmitted in an uplink by stations are different, and how to allocate a plurality of resource units to one station is an urgent problem to be resolved.

SUMMARY

This application provides a resource allocation method, a communication apparatus, and a related device, to allocate a plurality of resource units to each station.

According to a first aspect, this application provides a resource allocation method. In the method, a station receives a trigger frame from an access point. The trigger frame includes a plurality of user information fields that are the same as an association identifier of the station, and each user information field indicates one or more resource units allocated to the station. Therefore, the station may determine the one or more resource units indicated by each of the plurality of user information fields as a plurality of allocated resource units.

In another possible design, the trigger frame includes one user information field that is the same as an association identifier of the station, and the user information field indicates a plurality of resource units allocated to the station, to allocate the plurality of resource units to the station. In the design, the plurality of resource units are allocated to the station by using one user information field, so that a quantity of required user information fields is reduced. This helps simultaneously allocate a plurality of resource units to a plurality of stations.

In a possible implementation, that the station determines the plurality of allocated resource units based on the trigger frame includes: the station selects, from the trigger frame, one or more user information fields that are the same as the association identifier of the station. For each of the selected one or more user information fields, the station determines one or more resource units indicated by the user information field. The one or more resource units indicated by each of the selected one or more user information fields are the plurality of resource units allocated to the station.

The user information field in the trigger frame may be deployed in a user information list field. Therefore, the implementation may alternatively be: selecting, from the user information list field, one or more user information fields that are the same as the association identifier of the station.

For a specific manner in which the station selects the one or more user information fields from the user information list field, refer to four optional possible implementations in the following. Alternatively, the four possible implementations may be used in combination. This is not limited in this application.

In a possible implementation, the station separately parses an association identifier indicated by an association identifier field in each of all the user information fields in the trigger frame, and selects, from all the parsed user information fields, one or more user information domains that are the same as the association identifier of the station. All the user information fields may be deployed in the user information list field. The station may parse all the user information fields based on a boundary of the user information list field. It can be seen that the user information list field does not need to be modified in this manner, so that the resource allocation method has better compatibility.

In another possible implementation, the access point may configure N for the station in a protocol-predefined manner or by using signaling, where N is a quantity of user information fields included in the trigger frame that are the same as the association identifier of the station. Alternatively, the access point may configure, in a protocol-predefined manner or by using signaling, a quantity $N_1$ of resource units that can be allocated for the station, and a quantity $N_2$ of resource units that can be indicated by each user information field. In this case, a quantity N of user information fields included in the trigger frame that are the same as the association identifier of the station may be equal to $N_1/N_2$.

In the implementation, that the station selects, from the trigger frame, one or more user information fields that are the same as the association identifier of the station includes: the station parses, based on an index of each user information field in the trigger frame, whether an association identifier indicated by an association identifier field in each user information field is the same as the association identifier of the station, and stops performing the step of parsing whether an association identifier indicated by an association identifier field in each user information field is the same as the association identifier of the station, until a quantity of user information fields that are the same as the association identifier of the station is equal to N; and selects, from all the parsed user information fields, N user information fields that are the same as the association identifier of the station.

It can be seen that a quantity of user information fields parsed by the station can be reduced in the implementation. This helps reduce processing load of the station.

In still another possible implementation, the user information field may include an end flag. The end flag may be set by using a newly added bit in the user information field, by reusing another information field, or by using a reserved field. The end flag indicates whether allocation of the resource unit to the station ends. It can be seen that a quantity of user information fields parsed by the station can further be reduced in the implementation. This helps reduce processing load of the station.

That the station selects, from the trigger frame, one or more user information fields that are the same as the association identifier of the station includes: the station parses, based on an index of each user information field in the trigger frame, whether an association identifier indicated by an association identifier field in each user information field is the same as the association identifier of the station, and stops performing the step of parsing whether an association identifier indicated by an association identifier field in each user information field is the same as the association identifier of the station, until an end flag in a parsed user information field indicates that allocation of the resource unit to the station ends; and selects, from all the parsed user information fields, one or more user information fields that are the same as the association identifier of the station.

In still another possible implementation, that the station selects, from the trigger frame, one or more user information fields that are the same as the association identifier of the station includes: the station parses, based on an index of each user information field and starting from a first user information field, in the trigger frame, that is the same as the association identifier of the station, whether an association identifier indicated by an association identifier field in each user information field is the same as the association identifier of the station, until a user information field different from the association identifier of the station is parsed; and selects, from all the parsed user information fields, one or more user information fields that are the same as the association identifier of the station. In this implementation, a plurality of user information fields corresponding to each station may be distributed continuously in the user information list field of the trigger frame, so that parsing complexity of the station can be greatly reduced.

The following describes, by using some optional implementations, how the user information field indicates one or more resource units, and how the station determines one or more resource units indicated by each user information field.

In a possible implementation, the user information field includes a resource unit indication. That the station determines a plurality of resource units indicated by the user information field includes: the station determines the plurality of resource units indicated by the resource unit indication in the user information field. It can be seen that the resource unit indication may indicate the plurality of resource units in the implementation.

Optionally, the plurality of resource units indicated by the resource unit indication are a plurality of resource units corresponding to any one of the following combinations:

a combination of two first resource units, where the first resource unit is a resource unit including 996 subcarriers;

a combination of four first resource units;

a combination of two first resource units at a lowest frequency and one first resource unit at a highest frequency in a 320 MHz frequency band range;

a combination of one first resource unit at a lowest frequency and two first resource units at a highest frequency in a 320 MHz frequency band range;

a combination of three first resource units at a lowest frequency in a 320 MHz frequency band range;

a combination of three first resource units at a highest frequency in a 320 MHz frequency band range;

a combination of two first resource units, where the first resource unit is a resource unit including 996 subcarriers; and a combination of four first resource units.

In another possible implementation, the user information field includes a frequency band range indication and a resource unit indication. The frequency band range indication indicates an 80 MHz frequency band range in a bandwidth, and the resource unit indication indicates one resource unit. That the station determines one resource unit indicated by the user information field includes: the station determines, based on the frequency band range indicated by the frequency band range indication, the one resource unit indicated by the resource unit indication. It can be seen that each of the plurality of user information fields selected by the station indicates one resource unit, so that the plurality of resource units allocated to the station can be obtained.

It can be seen that in the implementation, regardless of a range of a bandwidth of a combination of resource units and a quantity of required RUs, a quantity of user information fields may respectively indicate a same quantity of RUs.

Optionally, the one resource unit indicated by the resource unit indication is any one of the following resource units:

any seventh resource unit, where the seventh resource unit is a resource unit including 2×996 subcarriers;

any sixth resource unit in the frequency band range indicated by the frequency band range indication, where the sixth resource unit is a resource unit including 52 subcarriers;

any fifth resource unit in the frequency band range indicated by the frequency band range indication, where the fifth resource unit is a resource unit including 26 subcarriers;

any fourth resource unit in the frequency band range indicated by the frequency band range indication, where the fourth resource unit is a resource unit including 106 subcarriers;

any third resource unit in the frequency band range indicated by the frequency band range indication, where the third resource unit is a resource unit including 242 subcarriers;

any second resource unit in the frequency band range indicated by the frequency band range indication, where the second resource unit is a resource unit including 484 subcarriers; and any first resource unit in the frequency band range indicated by the frequency band range indication, where the first resource unit is a resource unit including 996 subcarriers.

In still another implementation, the resource unit indication indicates the plurality of resource units. In other words, the station determines, based on the frequency band range indicated by the frequency band range indication, the plurality of resource units indicated by the resource unit indication. The station may be notified, in a protocol-predefined manner or a signaling configuration manner, of a correspondence between indexes or values of the resource unit indication and combinations of the plurality of resource units.

It can be seen that in the implementation, regardless of a range of a bandwidth of a combination of resource units, one user information field may indicate a plurality of resource units.

Optionally, a manner in which one user information field is needed to indicate every 80 MHz is used. In this case, a maximum of two user information fields are needed to indicate a combination of RUs in a frequency band range greater than 80 MHz and less than or equal to 160 MHz. A maximum of four user information fields are needed to indicate a combination of RUs in a frequency band range greater than 160 MHz and less than or equal to 320 MHz. Alternatively, a manner in which one user information field is needed to indicate every 160 MHz is used. In this case, a maximum of one user information field is needed to indicate a combination of RUs in a frequency band range less than or equal to 160 MHz. A maximum of two user information fields are needed to indicate a combination of RUs in a frequency band range greater than 160 MHz and less than or equal to 320 MHz.

In addition, when three 996-tone RUs are combined, each 996-tone RU is indicated by using one user information field, and three user information fields may be needed to indicate the combination of the three 996-tone RUs. When four RUs in a 160 MHz frequency band range are combined, for example, a 484-tone RU, a 242-tone RU, a 484-tone RU, and a 242-tone RU, one user information field is needed to indicate every 80 MHz, to indicate a combination of one 484-tone RU and one 242-tone RU. In this case, two user information fields may indicate the combination of the four RUs.

Optionally, the plurality of resource units indicated by the resource unit indication are a plurality of resource units corresponding to any one of the following combinations:

a combination of a fourth resource unit at a lowest frequency in one 20 MHz frequency band range indicated by the frequency band range indication and a fifth resource unit in a center of the 20 MHz frequency band range;

a combination of a fourth resource unit at a highest frequency in one 20 MHz frequency band range and a fifth resource unit in a center of the 20 MHz frequency band range;

a combination of a sixth resource unit at a second lowest frequency in one 20 MHz frequency band range and a fifth resource unit, in the 20 MHz frequency band range, that is on a same side as and that is adjacent to the sixth resource unit;

a combination of a sixth resource unit at a second lowest frequency in one 20 MHz frequency band range and a fifth resource unit in a center of the 20 MHz frequency band range;

a combination of a sixth resource unit at a second highest frequency in one 20 MHz frequency band range and a fifth resource unit, in the 20 MHz frequency band range, that is on a same side as and that is adjacent to the sixth resource unit;

a combination of a sixth resource unit at a second highest frequency in one 20 MHz frequency band range and a fifth resource unit in a center of the 20 MHz frequency band range;

a combination of a second resource unit in the frequency band range and a third resource unit adjacent to the second resource unit;

a combination of a second resource unit in the frequency band range and a third resource unit that is not adjacent to the second resource unit;

a combination of two third resource units on two sides of the frequency band range;

a combination of a first resource unit corresponding to the frequency band range and a second resource unit that is in a lower-frequency 80 MHz adjacent to the first resource unit and that is not adjacent to the first resource unit;

a combination of a first resource unit corresponding to the frequency band range and a second resource unit that is in a higher-frequency 80 MHz adjacent to the first resource unit and that is not adjacent to the first resource unit;

a combination of a first resource unit corresponding to the frequency band range and a second resource unit and a third resource unit that are in a lower-frequency 80 MHz adjacent to the first resource unit and that are adjacent to the first resource unit;

a combination of a first resource unit corresponding to the frequency band range and a second resource unit and a third resource unit that are in a higher-frequency 80 MHz adjacent to the first resource unit and that are adjacent to the first resource unit;

a combination of a first resource unit corresponding to the frequency band range and two third resource units in a lower-frequency 80 MHz adjacent to the first resource unit;

a combination of a first resource unit corresponding to the frequency band range and two third resource units in a higher-frequency 80 MHz adjacent to the first resource unit;

a combination of one second resource unit and one third resource unit that are in the frequency band range and one second resource unit and one third resource unit that are in a lower-frequency band range adjacent to the frequency band range; and a combination of one second resource unit and one third resource unit that are in the frequency band range and one second resource unit and one third resource unit that are in a higher-frequency band range adjacent to the frequency band range.

The sixth resource unit is a resource unit including 52 subcarriers, the fifth resource unit is a resource unit including 26 subcarriers, the fourth resource unit is a resource unit including 106 subcarriers, the third resource unit is a resource unit including 242 subcarriers, the second resource unit is a resource unit including 484 subcarriers, and the first resource unit is a resource unit including 996 subcarriers.

It can be seen that in the implementation, regardless of a range of a bandwidth of a combination of RUs, one user information field may be used for indication.

In still another possible implementation, the user information field includes a frequency band range indication, a resource unit indication, and a resource unit combination indication. The frequency band range indication indicates an 80 MHz frequency band range in a bandwidth, the resource unit indication indicates one resource unit in the frequency band range, and the resource unit combination indication indicates a combination of a plurality of resource units. The combination of the plurality of resource units includes the resource unit indicated by the resource unit indication. It can be seen that a resource unit allocation subfield in the user information field can be modified in the implementation, so that the user information field can indicate the combination of the plurality of resource units. It can be seen that in the implementation, regardless of a range of a bandwidth of a combination of RUs, one user information field may be used for indication.

Optionally, a manner in which one user information field is needed to indicate every 80 MHz is used. In this case, a maximum of one user information field is needed to indicate a combination of RUs in a frequency band range less than or equal to 80 MHz. A maximum of two user information fields are needed to indicate a combination of RUs in a frequency band range greater than 80 MHz and less than or equal to 160 MHz. A maximum of four user information fields are needed to indicate a combination of RUs in a frequency band range greater than 160 MHz and less than or equal to 320 MHz.

Alternatively, a manner in which one user information field is needed to indicate every 160 MHz is used. In this case, a maximum of one user information field is needed to indicate a combination of RUs in a frequency band range less than or equal to 160 MHz. A maximum of two user information fields are needed to indicate a combination of RUs in a frequency band range greater than 160 MHz and less than or equal to 320 MHz.

In addition, when three 996-tone RUs are combined, each 996-tone RU is indicated by using one user information field, and three user information fields may be needed to indicate the combination of the three 996-tone RUs. In this case, the implementation in which the user information field indicates one resource unit may be used.

When four RUs in a 160 MHz frequency band range are combined, for example, a 484-tone RU, a 242-tone RU, a 484-tone RU, and a 242-tone RU, one user information field is needed to indicate every 80 MHz, to indicate a combination of one 484-tone RU and one 242-tone RU. In this case, the manner in which one user information field indicates a plurality of resource units may be used, that is, two user information fields are needed to indicate the combination of the four RUs. Optionally, a manner in which one user information field is needed to indicate every 160 MHz is used. In this case, one user information field is needed to indicate the combination of the four RUs.

Correspondingly, that the station determines a plurality of resource units indicated by the user information field includes: the station determines, based on the resource unit combination indication and the resource unit indicated by the resource unit indication, the combination of the plurality of resource units as the plurality of resource units indicated by the user information field.

Optionally, a correspondence between indexes or values of the resource unit combination indication and combinations of the plurality of resource units may be determined in a protocol-predefined manner or in a signaling configuration manner. The following describes a possible correspondence.

In an optional implementation, the resource unit combination indication indicates a combination of the fourth resource unit and the fifth resource unit. The fourth resource unit is a resource unit including 106 subcarriers that is indicated by the resource unit indication, and the fifth resource unit is a resource unit including 26 subcarriers that is in a center of a 20 MHz frequency band range in which the fourth resource unit is located.

In an optional implementation, the resource unit combination indication indicates a combination of the sixth resource unit and the fifth resource unit. The sixth resource unit is a resource unit including 52 subcarriers that is indicated by the resource unit indication, and the fifth resource unit is a resource unit including 26 subcarriers that is in a center of a 20 MHz frequency band range in which the sixth resource unit is located, or a resource unit including 26 subcarriers that is on a same side as and that is adjacent to the sixth resource unit.

In an optional implementation, the resource unit combination indication indicates a combination of the second resource unit and the third resource unit. The second resource unit is a resource unit including 484 subcarriers that is indicated by the resource unit indication, and the third resource unit is a resource unit, in the frequency band range, including 242 subcarriers that is adjacent to the second resource unit, or a resource unit, in the frequency band range, including 242 subcarriers that is not adjacent to the second resource unit.

In an optional implementation, the resource unit combination indication indicates a combination of two third resource units, and the two third resource units are two resource units, each including 242 subcarriers, on an outermost side of the frequency band range.

In an optional implementation, the first resource unit is a resource unit including 996 subcarriers that is indicated by the resource unit indication. The resource unit combination indication indicates any one of the following combinations of a plurality of resource units: a combination of the first resource unit and the second resource unit, where the second resource unit is a resource unit including 484 subcarriers that is not adjacent to the first resource unit; a combination of the first resource unit and the third resource unit, where the third resource unit is a resource unit including 484 subcarriers that is not adjacent to the first resource unit, and a resource unit including 242 subcarriers; and a combination of two third resource units, where the two third resource units are two resource units, each including 242 subcarriers, on an outermost side of the frequency band range.

In an optional implementation, the first resource unit is a resource unit including 996 subcarriers that is indicated by the resource unit indication. The resource unit combination indication indicates any one of the following combinations of a plurality of resource units:

a combination of the second resource unit and the first resource unit, where the second resource unit is a resource unit including 484 subcarriers that is in a lower-frequency 80 MHz adjacent to the first resource unit and that is not adjacent to the first resource unit;

a combination of the second resource unit and the first resource unit, where the second resource unit is a resource unit including 484 subcarriers that is in a higher-frequency 80 MHz adjacent to the first resource unit and that is not adjacent to the first resource unit;

a combination of the second resource unit, the third resource unit, and the first resource unit, where the second resource unit is a resource unit including 484 subcarriers that is in a lower-frequency 80 MHz adjacent to the first resource unit, and the third resource unit is a resource unit including 242 subcarriers that is in the lower-frequency 80 MHz adjacent to the first resource unit;

a combination of the second resource unit, the third resource unit, and the first resource unit, where the second resource unit is a resource unit including 484 subcarriers that is in a higher-frequency 80 MHz adjacent to the first resource unit, and the third resource unit is a resource unit including 242 subcarriers that is in the higher-frequency 80 MHz adjacent to the first resource unit; and a combination of the first resource unit and two resource units that each include 996 subcarriers and that are adjacent to the first resource unit.

The frequency band range indicated by the frequency band range indication is any one of the following: a primary 80 MHz frequency band range, a secondary 80 MHz frequency band range, a third 80 MHz frequency band range, and a fourth 80 MHz frequency band range.

In this application, a combination solution of a plurality of resource units that can be indicated by the resource unit combination indication is not limited to the foregoing possible implementations. A quantity of bits occupied by the resource unit combination indication is related to a quantity of combination solutions that need to be indicated. A smaller quantity of combination solutions that need to be indicated by the resource unit combination indication indicates lower required bit overheads. In conclusion, a manner in which the resource unit combination indication indicates a combination of a plurality of resource units can reduce total overheads of a method for allocating a plurality of resource units.

According to a second aspect, this application further provides a resource allocation method. The resource allocation method is described from a perspective of an access point. In the method, an access point determines a plurality of resource units allocated to a station. The access point sends a trigger frame to the station. The trigger frame includes a plurality of user information fields that are the same as an association identifier of the station, and each user information field indicates one or more resource units allocated to the station; or the trigger frame includes one user information field that is the same as an association identifier of the station, and the one user information field indicates the plurality of resource units allocated to the station.

In a possible implementation, a quantity N of user information fields in the trigger frame that are the same as the association identifier of the station is configured for the station in a protocol-predefined manner or by using signaling. Alternatively, the access point may configure, in a protocol-predefined manner or by using signaling, a quantity $N_1$ of resource units that can be allocated for the station, and a quantity $N_2$ of resource units that can be indicated by each user information field. In this case, a quantity N of user information fields included in the trigger frame that are the same as the association identifier of the station may be equal to $N_1/N_2$. It can be seen that a user information list field does not need to be modified in this manner, so that the resource allocation method has better compatibility.

In a possible implementation, the user information field includes an end flag, and the end flag indicates whether allocation of the resource unit to the station ends. It can be seen that a quantity of user information fields parsed by the station can be reduced in the implementation. This helps reduce processing load of the station.

In a possible implementation, the plurality of user information fields in the trigger frame that are the same as the association identifier of the station are arranged continuously. It can be seen that a quantity of user information fields parsed by the station can further be reduced in the implementation. This helps reduce processing load of the station.

In a possible implementation, the user information field includes a resource unit indication, and the resource unit indication indicates the plurality of resource units allocated to the station. This helps the station determine the plurality of allocated resource units based on the resource unit indication.

In another possible implementation, the user information field includes a frequency band range indication and a resource unit indication, the frequency band range indication indicates an 80 MHz frequency band range in a bandwidth, and the resource unit indication indicates one or more resource units allocated to the station. This helps the station determine the plurality of allocated resource units based on the information.

In still another possible implementation, the user information field includes a frequency band range indication, a resource unit indication, and a resource unit combination indication. The frequency band range indication indicates an 80 MHz frequency band range in a bandwidth, the resource unit indication indicates one resource unit in the frequency band range, and the resource unit combination indication indicates a combination of a plurality of resource units. The combination of the plurality of resource units includes the resource unit indicated by the resource unit indication. It can be seen that a resource unit allocation subfield in the user information field can be modified in the implementation, so that the user information field can indicate the combination of the plurality of resource units.

In a possible implementation, the frequency band range indicated by the frequency band range indication is any one of the following: a primary 80 MHz frequency band range, a secondary 80 MHz frequency band range, a third 80 MHz frequency band range, and a fourth 80 MHz frequency band range. This helps the station determine the one or more resource units based on the frequency band ranges.

In a possible implementation, the one resource unit indicated by the resource unit indication is any one of the following resource units: any seventh resource unit, where the seventh resource unit is a resource unit including 2×996 subcarriers; any sixth resource unit in the frequency band range indicated by the frequency band range indication, where the sixth resource unit is a resource unit including 52 subcarriers; any fifth resource unit in the frequency band range indicated by the frequency band range indication, where the fifth resource unit is a resource unit including 26 subcarriers; any fourth resource unit in the frequency band range indicated by the frequency band range indication, where the fourth resource unit is a resource unit including 106 subcarriers; any third resource unit in the frequency band range indicated by the frequency band range indication, where the third resource unit is a resource unit including 242 subcarriers; any second resource unit in the frequency band range indicated by the frequency band range indication, where the second resource unit is a resource unit including 484 subcarriers; and any first resource unit in the frequency band range indicated by the frequency band range indication, where the first resource unit is a resource unit including 996 subcarriers.

In a possible implementation, the plurality of resource units indicated by the resource unit indication are a plurality of resource units corresponding to any one of the following combinations:

a combination of two first resource units, where the first resource unit is a resource unit including 996 subcarriers;

a combination of four first resource units;

a combination of a fourth resource unit at a lowest frequency in one 20 MHz frequency band range indicated by the frequency band range indication and a fifth resource unit in a center of the 20 MHz frequency band range;

a combination of a fourth resource unit at a highest frequency in one 20 MHz frequency band range and a fifth resource unit in a center of the 20 MHz frequency band range;

a combination of a sixth resource unit at a second lowest frequency in one 20 MHz frequency band range and a fifth resource unit, in the 20 MHz frequency band range, that is on a same side as and that is adjacent to the sixth resource unit;

a combination of a sixth resource unit at a second lowest frequency in one 20 MHz frequency band range and a fifth resource unit in a center of the 20 MHz frequency band range;

a combination of a sixth resource unit at a second highest frequency in one 20 MHz frequency band range and a fifth resource unit, in the 20 MHz frequency band range, that is on a same side as and that is adjacent to the sixth resource unit;

a combination of a sixth resource unit at a second highest frequency in one 20 MHz frequency band range and a fifth resource unit in a center of the 20 MHz frequency band range;

a combination of a second resource unit in the frequency band range and a third resource unit adjacent to the second resource unit;

a combination of a second resource unit in the frequency band range and a third resource unit that is not adjacent to the second resource unit;

a combination of two third resource units on two sides of the frequency band range;

a combination of a first resource unit corresponding to the frequency band range and a second resource unit that is in a lower-frequency 80 MHz adjacent to the first resource unit and that is not adjacent to the first resource unit;

a combination of a first resource unit corresponding to the frequency band range and a second resource unit that is in a higher-frequency 80 MHz adjacent to the first resource unit and that is not adjacent to the first resource unit;

a combination of a first resource unit corresponding to the frequency band range and a second resource unit and a third resource unit that are in a lower-frequency 80 MHz adjacent to the first resource unit and that are adjacent to the first resource unit;

a combination of a first resource unit corresponding to the frequency band range and a second resource unit and a third resource unit that are in a higher-frequency 80 MHz adjacent to the first resource unit and that are adjacent to the first resource unit;

a combination of a first resource unit corresponding to the frequency band range and two third resource units in a lower-frequency 80 MHz adjacent to the first resource unit;

a combination of a first resource unit corresponding to the frequency band range and two third resource units in a higher-frequency 80 MHz adjacent to the first resource unit;

a combination of two first resource units at a lowest frequency and one first resource unit at a highest frequency in a 320 MHz frequency band range;

a combination of one first resource unit at a lowest frequency and two first resource units at a highest frequency in a 320 MHz frequency band range;

a combination of three first resource units at a lowest frequency in a 320 MHz frequency band range;

a combination of three first resource units at a highest frequency in a 320 MHz frequency band range;

a combination of one second resource unit and one third resource unit that are in the frequency band range and one second resource unit and one third resource unit that are in a lower-frequency band range adjacent to the frequency band range; and a combination of one second resource unit and one third resource unit that are in the frequency band range and one second resource unit and one third resource unit that are in a higher-frequency band range adjacent to the frequency band range.

The sixth resource unit is a resource unit including 52 subcarriers, the fifth resource unit is a resource unit including 26 subcarriers, the fourth resource unit is a resource unit including 106 subcarriers, the third resource unit is a resource unit including 242 subcarriers, the second resource unit is a resource unit including 484 subcarriers, and the first resource unit is a resource unit including 996 subcarriers.

In a possible implementation, the resource unit combination indication indicates a combination of the fourth resource unit and the fifth resource unit. The fourth resource unit is a resource unit including 106 subcarriers that is indicated by the resource unit indication, and the fifth resource unit is a resource unit including 26 subcarriers that is in a center of a 20 MHz frequency band range in which the fourth resource unit is located.

In a possible implementation, the resource unit combination indication indicates a combination of the sixth resource unit and the fifth resource unit. The sixth resource unit is a resource unit including 52 subcarriers that is indicated by the resource unit indication, and the fifth resource unit is a resource unit including 26 subcarriers that is in a center of a 20 MHz frequency band range in which the sixth resource unit is located, or a resource unit including 26 subcarriers that is on a same side as and that is adjacent to the sixth resource unit.

In a possible implementation, the resource unit combination indication indicates a combination of the second resource unit and the third resource unit. The second resource unit is a resource unit including 484 subcarriers that is indicated by the resource unit indication, and the third resource unit is a resource unit, in the frequency band range, including 242 subcarriers that is adjacent to the second resource unit, or a resource unit, in the frequency band range, including 242 subcarriers that is not adjacent to the second resource unit.

In a possible implementation, the resource unit combination indication indicates a combination of two third resource units, and the two third resource units are two resource units, each including 242 subcarriers, on an outermost side of the frequency band range.

In a possible implementation, the first resource unit is a resource unit including 996 subcarriers that is indicated by the resource unit indication. The resource unit combination indication indicates any one of the following combinations of a plurality of resource units: a combination of the first resource unit and the second resource unit, where the second resource unit is a resource unit including 484 subcarriers that is not adjacent to the first resource unit; a combination of the first resource unit and the third resource unit, where the third resource unit is a resource unit including 484 subcarriers that is not adjacent to the first resource unit, and a resource unit including 242 subcarriers; and a combination of two third resource units, where the two third resource units are two resource units, each including 242 subcarriers, on an outermost side of the frequency band range.

In a possible implementation, the first resource unit is a resource unit including 996 subcarriers that is indicated by the resource unit indication. The resource unit combination indication indicates any one of the following combinations of a plurality of resource units: a combination of the second resource unit and the first resource unit, where the second resource unit is a resource unit including 484 subcarriers that is in a lower-frequency 80 MHz adjacent to the first resource unit and that is not adjacent to the first resource unit; a combination of the second resource unit and the first resource unit, where the second resource unit is a resource unit including 484 subcarriers that is in a higher-frequency 80 MHz adjacent to the first resource unit and that is not adjacent to the first resource unit; a combination of the second resource unit, the third resource unit, and the first resource unit, where the second resource unit is a resource unit including 484 subcarriers that is in a lower-frequency 80 MHz adjacent to the first resource unit, and the third resource unit is a resource unit including 242 subcarriers that is in the lower-frequency 80 MHz adjacent to the first resource unit; a combination of the second resource unit, the third resource unit, and the first resource unit, where the second resource unit is a resource unit including 484 subcarriers that is in a higher-frequency 80 MHz adjacent to the first resource unit, and the third resource unit is a resource unit including 242 subcarriers that is in the higher-frequency 80 MHz adjacent to the first resource unit; and a combination of the first resource unit and two resource units that each include 996 subcarriers and that are adjacent to the first resource unit.

In this application, a combination solution of a plurality of resource units that can be indicated by the resource unit combination indication is not limited to the foregoing possible implementations. A quantity of bits occupied by the resource unit combination indication is related to a quantity of combination solutions that need to be indicated. A smaller quantity of combination solutions that need to be indicated by the resource unit combination indication indicates lower required bit overheads. In conclusion, a manner in which the resource unit combination indication indicates a combination of a plurality of resource units can reduce total overheads of a method for allocating a plurality of resource units.

According to a third aspect, this application further provides a communication apparatus. The communication apparatus has some or all functions of the station in the method example in the first aspect. For example, the functions of the communication apparatus may have functions in some or all embodiments of this application, or may have functions of independently implementing any embodiment of this application. The functions may be implemented by hardware, or may be implemented by hardware executing corresponding software. The hardware or the software includes one or more units or modules corresponding to the functions.

In a possible design, a structure of the communication apparatus may include a processing unit and a communication unit. The processing unit is configured to support the communication apparatus in performing a corresponding function in the foregoing method. The communication unit is configured to support communication between the communication apparatus and another device. The communication apparatus may further include a storage unit. The storage unit is configured to be coupled to the processing unit and a sending unit, and the storage unit stores program instructions and data that are necessary for the communication apparatus.

In an implementation, the communication apparatus includes:

a communication unit, configured to receive a trigger frame from an access point, where the trigger frame includes a plurality of user information fields that are the same as an association identifier of the communication apparatus, and each user information field indicates one or more resource units allocated to the communication apparatus; or the trigger frame includes one user information field that is the same as an association identifier of the communication apparatus, and the one user information field indicates a plurality of resource units allocated to the communication apparatus; and a processing unit, configured to determine the plurality of allocated resource units based on the trigger frame.

For example, the processing unit may be a processor, the communication unit may be a transceiver or a communication interface, and the storage unit may be a memory.

In an implementation, the communication apparatus includes:

a transceiver, configured to receive a trigger frame from an access point, where the trigger frame includes a plurality of user information fields that are the same as an association identifier of the communication apparatus, and each user information field indicates one or more resource units allocated to the communication apparatus, or the trigger frame includes one user information field that is the same as an association identifier of the communication apparatus, and the one user information field indicates a plurality of resource units allocated to the communication apparatus; and a processor, configured to determine the plurality of allocated resource units based on the trigger frame.

According to a fourth aspect, this application further provides a communication apparatus. The communication apparatus has some or all functions of the access point in the method example in the second aspect. For example, the functions of the communication apparatus may have functions of the access point in some or all embodiments of this application, or may have functions of independently implementing any embodiment of this application. The functions may be implemented by hardware, or may be implemented by hardware executing corresponding software. The hardware or the software includes one or more units or modules corresponding to the functions.

In a possible design, a structure of the communication apparatus may include a processing unit and a communication unit. The communication unit is configured to support the communication apparatus in performing a corresponding function in the foregoing method. The communication unit is configured to support communication between the communication apparatus and another device, for example, a station. The communication apparatus may further include a storage unit. The storage unit is configured to be coupled to an obtaining unit and a sending unit, and the storage unit stores program instructions and data that are necessary for the communication apparatus.

In an implementation, the communication apparatus includes:

a processing unit, configured to determine a plurality of resource units allocated to a station; and a communication unit, configured to send a trigger frame to the station, where the trigger frame includes a plurality of user information fields that are the same as an association identifier of the station, and each user information field indicates one or more resource units allocated to the station; or the trigger frame includes one user information field that is the same as an association identifier of the station, and the one user information field indicates the plurality of resource units allocated to the station.

In another implementation, the communication apparatus includes:

a processor, configured to determine a plurality of resource units allocated to a station; and a transceiver, configured to send a trigger frame to the station, where the trigger frame includes a plurality of user information fields that are the same as an association identifier of the station, and each user information field indicates one or more resource units allocated to the station; or the trigger frame includes one user information field that is the same as an association identifier of the station, and the one user information field indicates the plurality of resource units allocated to the station.

In a specific implementation process, the processor may be configured to perform, for example, but not limited to, baseband-related processing, and the transceiver may be configured to perform, for example, but not limited to, radio frequency transmission. The foregoing components may be separately disposed on chips that are independent of each other, or at least a part or all of the components may be disposed on a same chip. For example, the processor may further be divided into an analog baseband processor and a digital baseband processor. The analog baseband processor and the transceiver may be integrated on a same chip, and the digital baseband processor may be disposed on an independent chip. With continuous development of integrated circuit technologies, more components can be integrated on a same chip. For example, the digital baseband processor and a plurality of application processors (for example, but not limited to, a graphics processor and a multimedia processor) may be integrated on a same chip. The chip may be referred to as a system on chip. Whether all the components are separately disposed on different chips or integrated and disposed on one or more chips usually depends on a specific requirement for a product design. A specific implementation form of the foregoing components is not limited in this embodiment of the present application.

According to a fifth aspect, this application further provides a processor, configured to perform the method in the first aspect or the second aspect. In a process of performing these methods, a process of sending the foregoing information and a process of receiving the foregoing information in the foregoing methods may be understood as a process of outputting the foregoing information by the processor and a process of receiving the foregoing input information by the processor. Specifically, when outputting the information, the processor outputs the information to a transceiver, so that the transceiver transmits the information. Still further, after the information is output by the processor, other processing may further need to be performed on the information before the information arrives at the transceiver. Similarly, w % ben the processor receives the input information, the transceiver receives the information and inputs the information into the processor. Still further, after the transceiver receives the information, other processing may need to be performed on the information before the information is input into the processor.

Based on the foregoing principle, for example, receiving joint feedback information mentioned in the foregoing method may be understood as inputting the joint feedback information by the processor. For another example, sending joint feedback information in the foregoing method may be understood as outputting the joint feedback information by the processor.

In this case, for operations such as transmission, sending, and receiving related to the processor, if there is no particular statement, or if the operations do not contradict an actual function or internal logic of the operations in related descriptions, the operations may be more generally understood as operations such as output, receiving, and input of the processor, instead of operations such as transmission, sending, and receiving directly performed by a radio frequency circuit and an antenna.

In a specific implementation process, the processor may be a processor specially configured to perform these methods, or a processor, for example, a general-purpose processor, that executes computer instructions in a memory to perform these methods. The memory may be a non-transitory memory such as a read-only memory (ROM). The memory and the processor may be integrated on a same chip, or may be separately disposed on different chips. A type of the memory and a manner of disposing the memory and the processor are not limited in embodiments of the present application.

According to a sixth aspect, an embodiment of the present application provides a computer-readable storage medium, configured to store computer software instructions that are used by the foregoing station and that include a program used to perform the method in the first aspect.

According to a seventh aspect, an embodiment of the present application provides a computer-readable storage medium, configured to store computer software instructions that are used by the foregoing access point and that include a program used to perform the method in the second aspect.

According to an eighth aspect, this application further provides a computer program product including instructions. When the computer program product is run on a computer, the computer is enabled to perform the method in the first aspect.

According to a ninth aspect, this application further provides a computer program product including instructions. When the computer program product is run on a computer, the computer is enabled to perform the method in the second aspect.

According to a tenth aspect, this application provides a chip system. The chip system includes a processor and an interface, and is configured to support a station in implementing functions, for example, at least one of determining or processing data and information related in the method, in the first aspect. In a possible design, the chip system further includes a memory, and the memory is configured to store program instructions and data that are required by the station. The chip system may include a chip, or may include a chip and another discrete component.

According to an eleventh aspect, this application provides a chip system. The chip system includes a processor and an interface, and is configured to support an access point in implementing functions, for example, at least one of determining or processing data and information related in the method, in the second aspect. In a possible design, the chip system further includes a memory, and the memory is configured to store program instructions and data that are required by the access point. The chip system may include a chip, or may include a chip and another discrete component.

BRIEF DESCRIPTION OF DRAWINGS

FIG. 3 is a schematic flowchart of sending a data packet based on a trigger frame according to an embodiment of this application;

FIG. 12 to FIG. 17 each are a schematic diagram of a combination of a 52-tone RU and a 26-tone RU according to an embodiment of this application;

FIG. 41 is a schematic flowchart of another resource allocation method according to an embodiment of this application;

FIG. 42 is a schematic diagram of a structure of a PPDU preamble message according to an embodiment of this application;

DESCRIPTION OF EMBODIMENTS

With development of a wireless local area network, a data rate required by a station to transmit uplink data accordingly increases. Therefore, how an access point allocates a plurality of resource units to a station, so that the station can transmit uplink data by using the plurality of resource units, to improve a data rate becomes an urgent problem to be resolved.

To resolve the problem, this application provides a resource allocation method. In the method, an access point can allocate a plurality of resource units to a station. The plurality of resource units allocated to the station may also be referred to as a combination of a plurality of resource units or a plurality of combined resource units. Unless otherwise specified, "combination" and "combined" in this specification have the same meaning.

Figure 1:
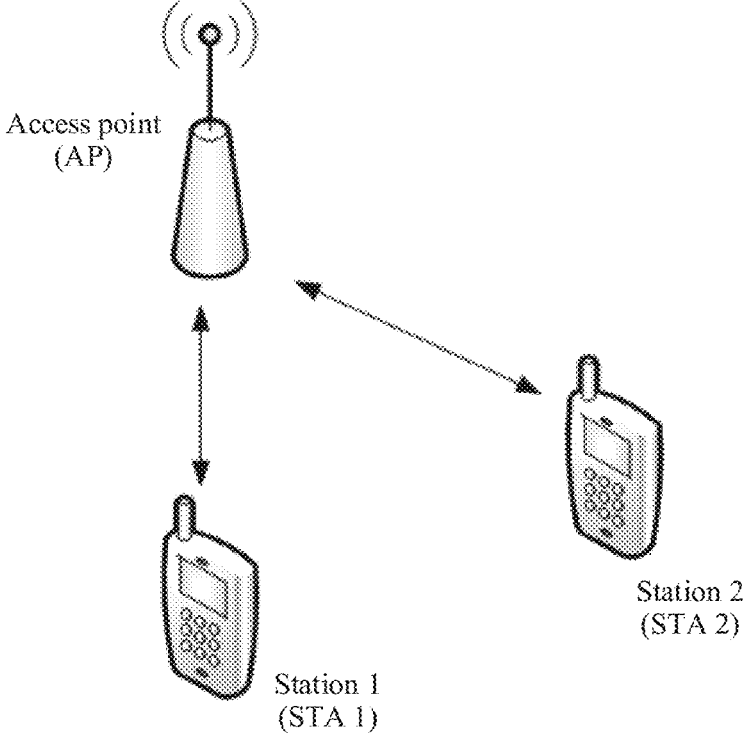
FIG. 1 is a schematic diagram of a network structure according to an embodiment of this application.

First, FIG. 1 is used as an example to describe a network structure to which the resource allocation method in this application is applicable. FIG. 1 is a schematic diagram of a network structure according to an embodiment of this application. As shown in FIG. 1, the network structure may include an access point (AP) and a plurality of non-access point stations (non-AP STA). For ease of description, the non-access point station is referred to as a station for short in the following. FIG. 1 is described by using an example in which the network structure includes one access point (AP) and two stations (a STA 1 and a STA 2). The network structure may further include more access points and stations. Alternatively, the network structure may include only two stations. This is not limited in this application.

The access point may be an access point used by a terminal device (such as a mobile phone) to access a wired (or wireless) network, and is mainly deployed at home, in a building, and in a park. A typical coverage radius is tens of meters to a hundred meters. Certainly, the access point may alternatively be deployed outdoors. The access point is equivalent to a bridge that connects the wired network and the wireless network. A main function of the access point is to connect various wireless network clients together and then connect the wireless network to the Ethernet. Specifically, the access point may be a terminal device (such as a mobile phone) or a network device (such as a router) with a wireless fidelity (Wi-Fi) chip. The access point may be a device that supports the 802.11be standard. Alternatively, the access point may be a device that supports a plurality of wireless local area network (WLAN) standards of the 802.11 family such as the 802.11 be standard, the 802.11ax standard, the 802.11ac standard, the 802.11n standard, the 802.11g standard, the 802.11b standard, and the 802.11a standard.

The station may be a wireless communication chip, a wireless sensor, a wireless communication terminal, or the like, and may also be referred to as a user. For example, the station may be a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communication device supporting a Wi-Fi communication function, or a computer supporting a Wi-Fi communication function. Optionally, the station may support the 802.11be standard. The station may also support a plurality of wireless local area network (WLAN) standards of the 802.11 family such as the 802.11be standard, the 802.11ax standard, the 802.11ac standard, the 802.11n standard, the 802.11g standard, the 802.11b standard, and the 802.11a standard.

For example, the access point and the station may be devices applied to the Internet of vehicles, Internet of things nodes or sensors in the Internet of things (IoT), smart cameras, smart remote controls, and smart water meters in a smart home, and sensors in a smart city.

Then, to facilitate understanding of related content in embodiments of this application, the following describes some concepts in embodiments of this application.

In embodiments of this application, a trigger frame includes a plurality of user information fields that are the same as an association identifier of the station, and each user information field indicates one or more resource units allocated to the station; or the trigger frame includes one user information field that is the same as an association identifier of the station, and the one user information field indicates a plurality of resource units allocated to the station.

Figure 2:
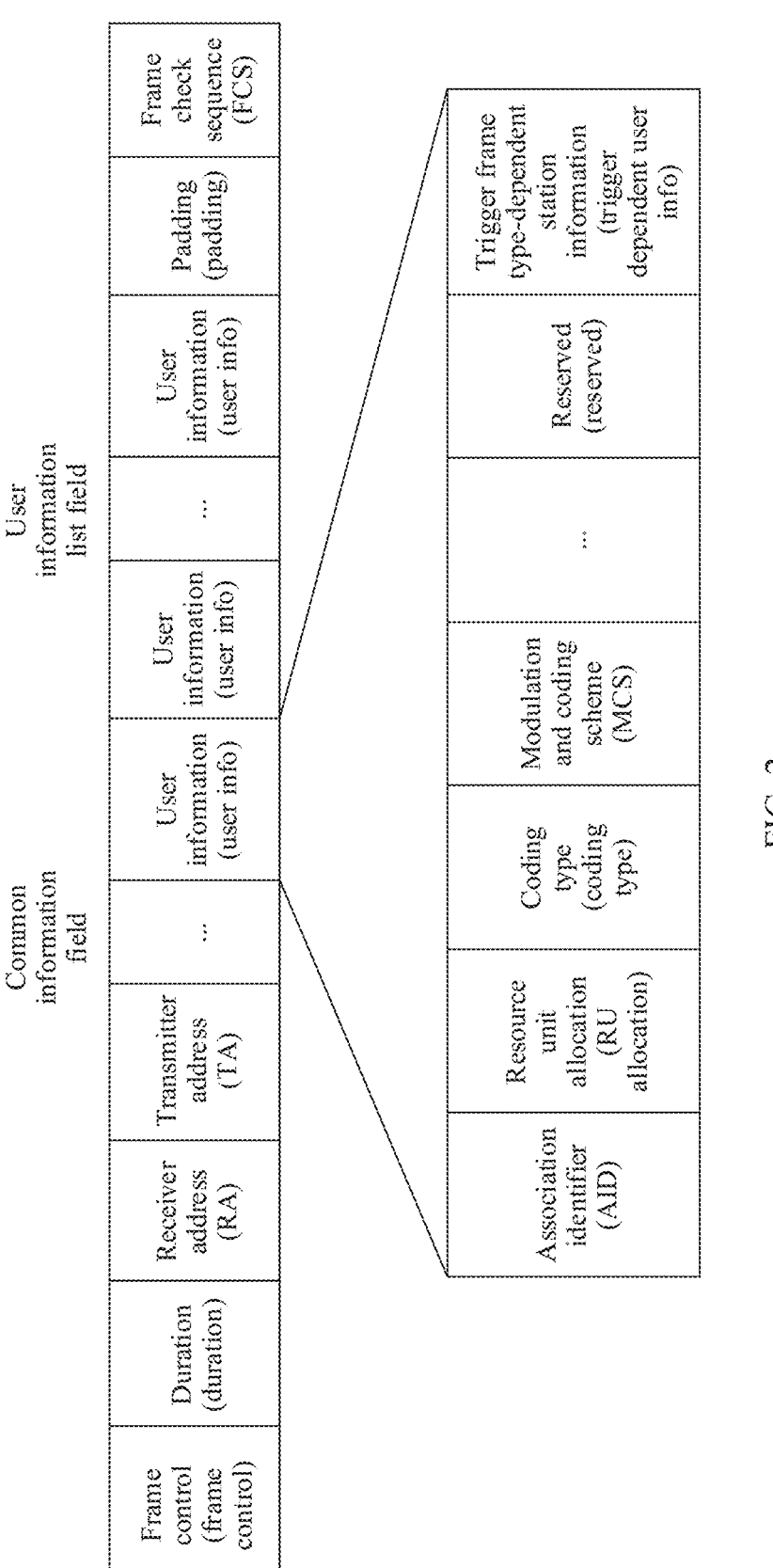
FIG. 2 is a schematic diagram of a structure of a trigger frame according to an embodiment of this application.

Optionally, a frame format of the trigger frame may be shown in FIG. 2. FIG. 2 is a schematic diagram of a structure of a trigger frame according to an embodiment of this application. The trigger frame may include only a part of fields shown in FIG. 2. Alternatively, the trigger frame may include more fields than those shown in FIG. 2. This is not limited in embodiments of this application.

For example, the trigger frame includes a common information field and a user information list field. The trigger frame may further include a frame control field, a duration field, a receiver address (RA) field, a transmitter address (TA) field, a padding field, a frame check sequence (FCS) field, and the like.

The common information field may also be referred to as a common domain or a common information domain. The common information field includes common information that needs to be read by all stations, for example, a trigger frame type (trigger type) subfield, a length subfield, a cascade indication subfield, a carrier-sense required (CS Required) subfield, a bandwidth subfield, a guard interval and long training field (GI+LTF) subfield, and a trigger frame type-dependent common information subfield.

The user information list field may also be referred to as a user information list domain, a per station domain, or the like. The user information list field includes one or more user information (user info) fields. Each user information field includes information that needs to be read by each station, for example, an association identifier (AID) subfield, a resource unit allocation (RU allocation) subfield, a coding type subfield, a modulation and coding scheme (MCS) subfield, a reserved subfield, a trigger frame type-dependent user information (trigger dependent user info) subfield, and the like.

The association identifier field indicates an association identifier of a station corresponding to the user information field. The resource unit allocation subfield indicates a resource unit (or a resource unit location) that is indicated by the user information field and that is allocated to the station. In embodiments of this application, the user information field may indicate one or more resource units by using the resource unit allocation subfield, but this is not limited to the resource unit allocation subfield. In other words, a part or all of a frequency band range indication, a resource unit indication, and a resource unit combination indication that are included in the user information field may be distributed in the resource unit allocation subfield.

The "field" described in this specification may also be referred to as a "domain", "information", or the like, and the "subfield" may be referred to as a "subdomain", "information", or the like. The field shown in FIG. 2 is merely an example. The trigger frame may include only a part of fields shown in FIG. 2. Alternatively, the trigger frame may include more fields than those shown in FIG. 2.

Scheduling-based uplink transmission based on a trigger frame means that the station may send a data packet on a plurality of allocated resource units, namely, physical layer protocol data units (PPDU). The data packet may be a high-efficiency trigger-based physical layer protocol data unit (HE TB PPDU) or an extremely high throughput trigger-based physical layer protocol data unit (EHT TB PPDU). The HE TB PPDU is one of high-efficiency physical layer protocol data units (HE PPDU). FIG. 3 is a schematic flowchart of scheduling-based uplink transmission based on a trigger frame according to an embodiment of this application. As shown in FIG. 3, after receiving a trigger frame, a station may determine a plurality of allocated resource units, and send a PPDU on the plurality of resource units. A structure of the PPDU is shown in FIG. 3. That a STA 1 sends the PPDU is used as an example. HE-LTF to Data include a plurality of resource units for transmitting uplink data of the STA 1. Functions of fields in the PPDU are shown in Table 1.

TABLE 1

| description | Function |
| --- | --- |
| Legacy short training field (L-STF) | Used for PPDU discovery, coarse synchronization, and automatic gain control |
| Legacy long training field (L-LTF) | Used for fine synchronization and channel estimation |
| Legacy signal field (L-SIG) | Used to carry signal information related to a PPDU length, to ensure coexistence |
| High-efficiency signal field A (HE-SIGA) | Used to carry a signal used to demodulate subsequent data |
| High-efficiency short training field (HE-STF) | Used for automatic gain control of a subsequent field |
| High-efficiency long training field (HE-LTF) | Used for channel estimation |
| Data | Used to carry data information |

Figure 4:
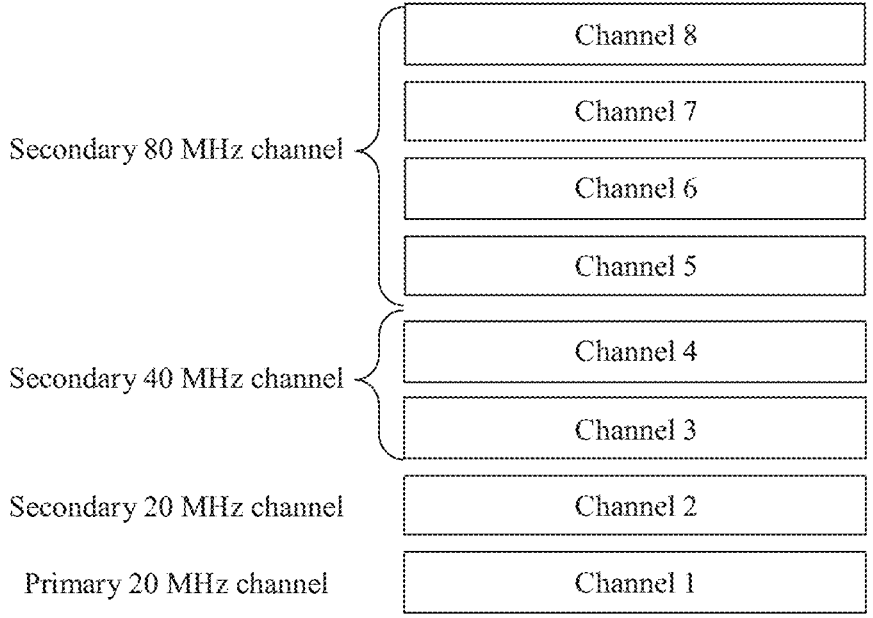
FIG. 4 is a schematic diagram of channel distribution according to an embodiment of this application.

A radio channel is divided into a plurality of subchannels or subcarriers in frequency domain. FIG. 4 is a schematic diagram of channel distribution according to an embodiment of this application. As shown in FIG. 4, when a bandwidth is 160 MHz, the channel may, be divided into a primary 20 MHz channel (which is also referred to as a primary channel, Primary 20 MHz, P20), a secondary 20 MHz channel (S20), a secondary 40 MHz channel (S40), and a secondary 80 MHz channel (S80). A channel 1 may correspond to the primary 20 MHz channel, a channel 2 corresponds to the secondary 20 MHz channel, a channel 3 and a channel 4 are combined into the secondary 40 MHz channel, and a channel 5 to a channel 8 are combined into the secondary 80 MHz channel.

Different quantities of subcarriers on the channel may be combined into resource units of different sizes. For a bandwidth of 20 MHz, 40 MHz, 80 MHz, 160 MHz, or 320 MHz, resource units of different sizes may include the following seven resource units: a first resource unit (which is a resource unit including 996 subcarriers, and may be referred to as a 996-tone RU), a second resource unit (which is a resource unit including 484 subcarriers, and may be referred to as a 484-tone RU), a third resource unit (which is a resource unit including 242 subcarriers, and may, be referred to as a 242-tone RU), a fourth resource unit (which is a resource unit including 106 subcarriers, and may be referred to as a 106-tone RU), a fifth resource unit (which is a resource unit including 26 subcarriers, and may be referred to as a 26-tone RU), a sixth resource unit (which is a resource unit including 52 subcarriers, and may be referred to as a 52-tone RU), and a seventh resource unit (which is a resource unit including 2×996 subcarriers, and may be referred to as a 2×996-tone RU). This helps the access point allocate, based on a data transmission requirement of each station, a plurality of resource units to the station for uplink data transmission.

Figure 5:
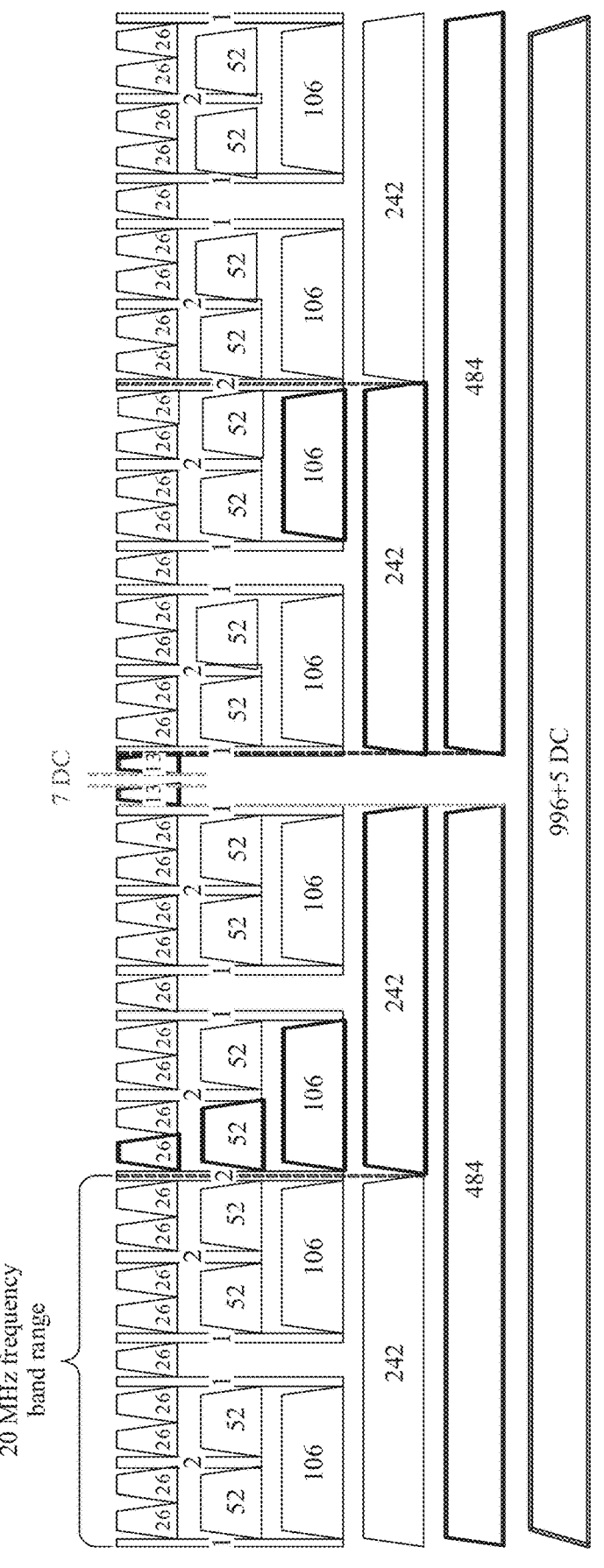
FIG. 5 is a schematic diagram of possible distribution of resource units in an 80 MHz bandwidth according to an embodiment of this application.

FIG. 5 is a schematic diagram of possible distribution of resource units in an 80 MHz bandwidth according to an embodiment of this application. As shown in FIG. 5, a first row indicates that the 80 MHz bandwidth may include 37 26-tone RUs, a second row indicates that the 80 MHz bandwidth may include 16 52-tone RUs, a third row indicates that the 80 MHz bandwidth may include eight 106-tone RUs, a fourth row indicates that the 80 MHz bandwidth may include four 242-tone RUs, a fifth row indicates that the 80 MHz bandwidth may include two 484-tone RUs, and a sixth row indicates that the 80 MHz bandwidth may include one 996-tone RU. As shown in FIG. 5, there may be a maximum of nine resource units, namely, nine 26-tone RUs, in a 20 MHz frequency band range.

Figure 6:
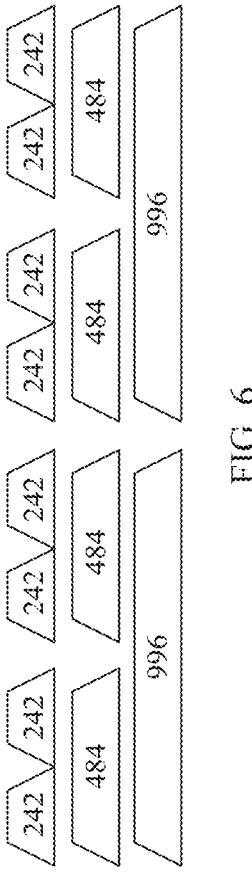
FIG. 6 is a schematic diagram of possible distribution of resource units in a 160 MHz bandwidth according to an embodiment of this application.

FIG. 6 is a schematic diagram of possible distribution of resource units in a 160 MHz bandwidth according to an embodiment of this application. As shown in FIG. 6, a first row indicates that the 160 MHz bandwidth may include eight 242-tone RUs, a second row indicates that the 160 MHz bandwidth may include four 484-tone RUs, and a third row indicates that the 160 MHz bandwidth may include two 996-tone RUs.

Figure 7:
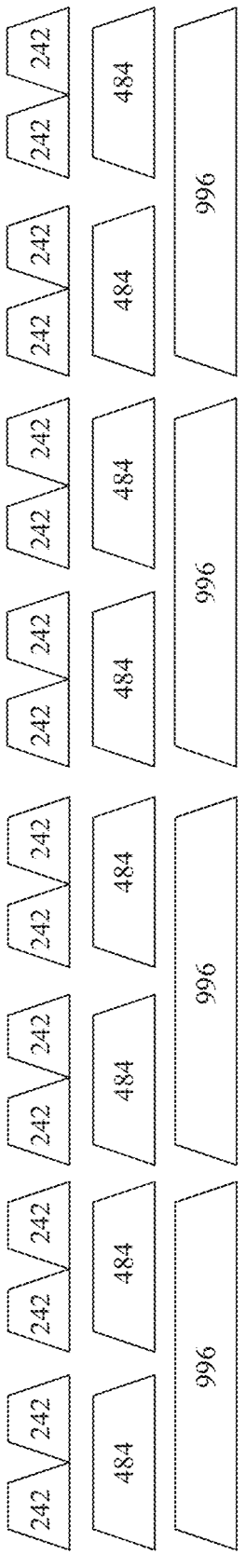
FIG. 7 is a schematic diagram of possible distribution of resource units in a 320 MHz bandwidth according to an embodiment of this application.

FIG. 7 is a schematic diagram of possible distribution of resource units in a 320 MHz bandwidth according to an embodiment of this application. As shown in FIG. 7, a first row indicates that the 320 MHz bandwidth may include four 996-tone RUs.

Resource units shown in each row in FIG. 5 to FIG. 7 do not occupy the entire bandwidth, and each row may include some remaining subcarriers used for isolation between resource units. As shown in FIG. 5, each 20 MHz channel has a spacing of two subcarriers and a spacing of one subcarrier, and there is a spacing of 26 subcarriers between a 484-tone RU and a 484-tone RU.

Possible distribution of resource units is not limited to that shown in FIG. 5 to FIG. 7. For example, the 320 MHz bandwidth may include eight 484-tone RUs or the like. Alternatively, the distribution manner of resource units shown in FIG. 4 may be used for each 80 MHz frequency band range in the 320 MHz bandwidth, and for each 80 MHz frequency band range in the 160 MHz bandwidth. In other words, possible distribution of resource units in a bandwidth is not limited in embodiments of this application. To facilitate understanding of the resource allocation method in this application, distribution shown in FIG. 5 to FIG. 7 is used as an example to describe a plurality of resource units allocated to the station, or locations of a plurality of resource units allocated to the station, or which resource units are combined, so that the station can transmit uplink data on the plurality of resource units.

The following describes the resource allocation method and a related device in embodiments of this application with reference to the accompanying drawings. The resource allocation method may also be referred to as an indication method of a plurality of resource units, a combination method of a plurality of resource units, or the like. In embodiments of this application, a trigger frame is used to allocate a plurality of resource units to a station. The following provides a description from two aspects. In a first aspect, the trigger frame indicates, by using a plurality of user information fields, the plurality of resource units allocated to the station. In other words, the trigger frame includes a plurality of user information (user info) fields that are the same as an association identifier of the station. In a second aspect, the trigger frame indicates, by using one user information field, the plurality of resource units allocated to the station. In other words, the trigger frame includes one user information (user info) field that is the same as an association identifier of the station.

1. The trigger frame includes the plurality of user information (user info) fields that are the same as the association identifier of the station.

Each user information (user info) field may indicate one or more resource units, and the one or more resource units indicated by each of the plurality of user information fields are the plurality of resource units allocated to the station.

Figure 8:
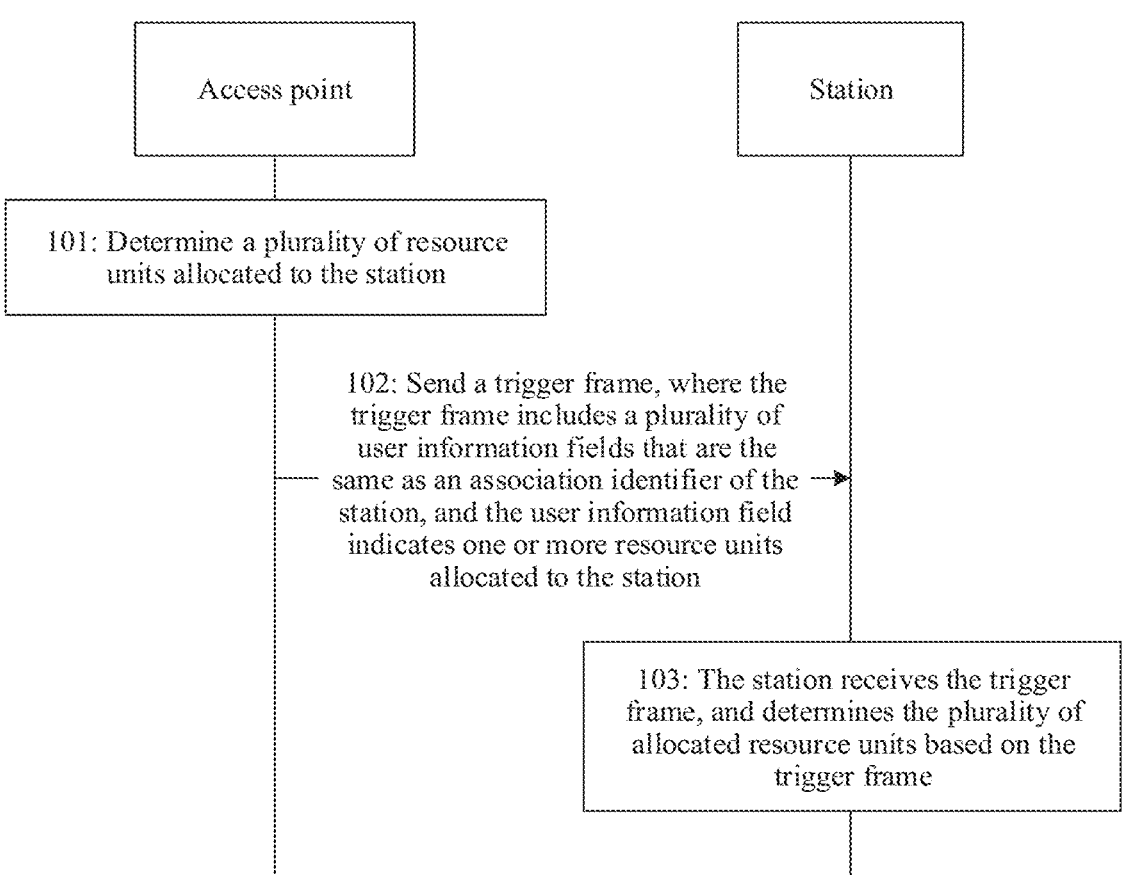
FIG. 8 is a schematic flowchart of a resource allocation method according to an embodiment of this application.

Based on the design of the trigger frame. FIG. 8 is a schematic flowchart of a resource allocation method according to an embodiment of this application. As shown in FIG. 8, the resource allocation method includes the following steps.

101: An access point determines a plurality of resource units allocated to a station.

102: The access point sends a trigger frame to the station, where the trigger frame includes a plurality of user information fields that are the same as an association identifier of the station, and each user information field indicates one or more resource units allocated to the station.

103: The station receives the trigger frame, and determines the plurality of allocated resource units based on the trigger frame.

That the station determines the plurality of allocated resource units based on the trigger frame includes the following steps.

The station selects, from the trigger frame, one or more user information fields that are the same as the association identifier of the station.

For each of the selected one or more user information fields, the station determines one or more resource units indicated by the user information field, where the one or more resource units indicated by each of the selected one or more user information fields are the plurality of resource units allocated to the station.

Optionally, the structure of the frame shown in FIG. 2 is used as an example. User information fields are distributed in a user information list field. Therefore, the station may select, from the user information list field, one or more user information fields that are the same as the association identifier of the station. In other words, the station receives the user information list field, parses association identifiers indicated by association identifier fields in the user information fields, and selects a plurality of user information fields that are the same as the association identifier of the station.

In step 1031, the station may select, in the following several optional implementations from the trigger frame, the plurality of user information fields that are the same as the association identifier of the station, but the following implementations are not limited thereto. For example, one or more of the following implementations may be simultaneously used to select the plurality of user information fields.

1.1. All User Information Fields in the Trigger Frame are Parsed.

In the implementation, the station may separately parse an association identifier indicated by an association identifier field in each of all the user information fields in the trigger frame; and select, from all the parsed user information fields, a plurality of user information fields that are the same as the association identifier of the station. As shown in FIG. 2, the user information list field in the trigger frame has a boundary, so that the station can parse all the user information fields based on the boundary.

For ease of description, in this specification, "a plurality of user information fields that are the same as the association identifier of the station" may be referred to as user information fields of the station, user information fields matching the station, or the like.

The plurality of user information fields corresponding to the station in the trigger frame may appear continuously or discontinuously. For example, it is assumed that the user information list field includes M user information fields, an association identifier of a STA 1 is an AID 1, and user information fields corresponding to the STA 1 in FIG. 9 appear continuously in the user information list field. In other words, first two user information fields in the user information list field are user information fields corresponding to the STA 1, and a third user information field to an M$^{th}$ user information field are not user information fields corresponding to the STA 1. User information fields corresponding to the STA 1 in FIG. 10 appear discontinuously in the user information list field. In other words, the user information fields corresponding to the STA 1 may be a first user information field, a third user information field, and the like in the user information list field. It can be seen that for the user information list field shown in FIG. 9 or FIG. 10, in the implementation, the station may determine, by parsing all the user information fields one by one, the plurality of user information fields that are the same as the association identifier of the station.

1.2. A Quantity N of User Information Fields of the Station in the Trigger Frame is Configured for the Station in a Protocol-Predefined Manner or by Using Signaling.

In the implementation, the station may select N user information fields of the station from the user information list field in the trigger frame based on N.

Specifically, that the station selects, from the trigger frame, the plurality of user information fields that are the same as the association identifier of the station may include: the station parses and determines, based on an index of each user information field in the user information list field, whether an association identifier indicated by an association identifier field in each user information field is the same as the association identifier of the station, and stops performing the step of parsing whether an association identifier indicated by an association identifier field in each user information field is the same as the association identifier of the station, until a quantity of user information fields that are the same as the association identifier of the station is equal to N;

and selects, from all the parsed user information fields. N user information fields that are the same as the association identifier of the station. It can be seen that the implementation ensures flexibility of deploying the user information fields, and reduces complexity of parsing the user information list field by the station.

Figure 9:
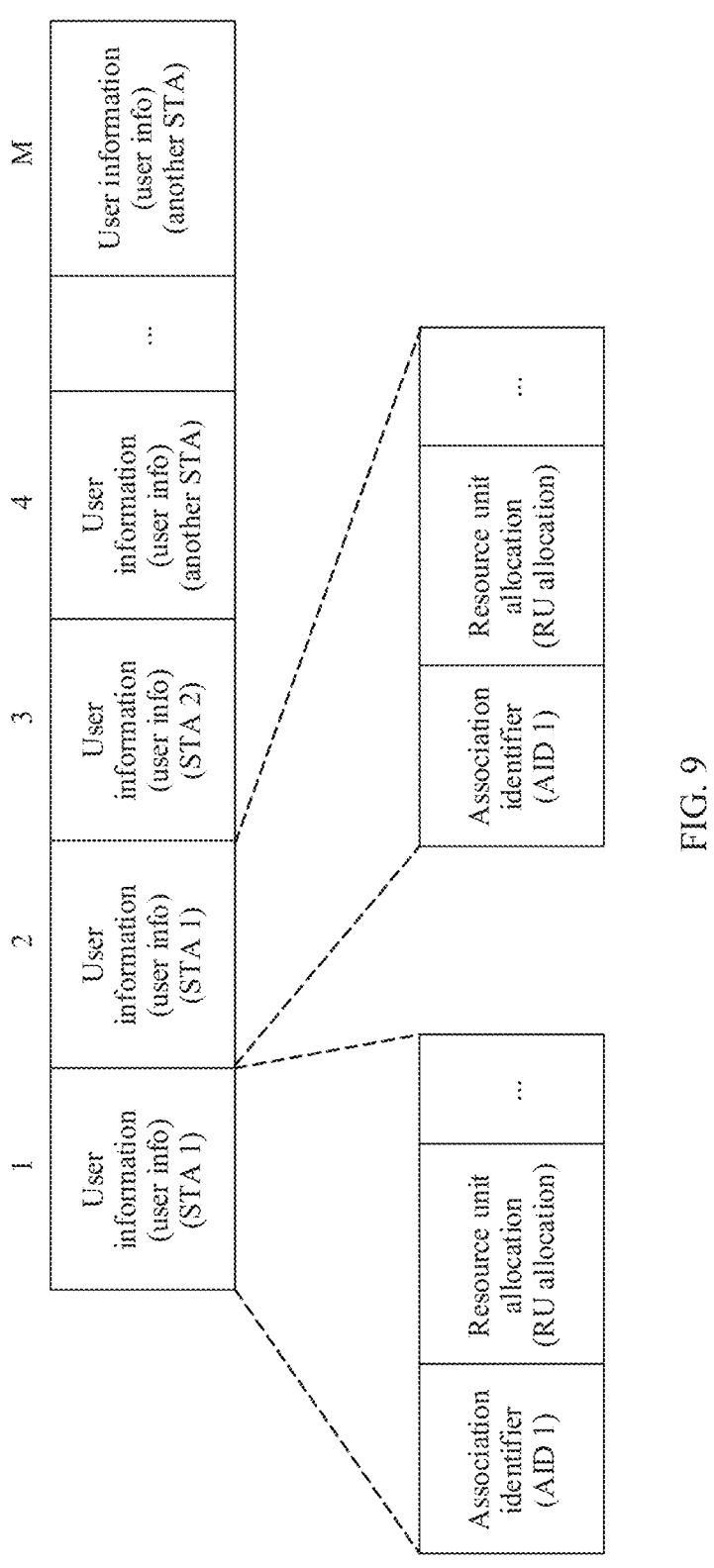
FIG. 9 is a schematic diagram of a user information list field according to an embodiment of this application.

For example, in the user information list field shown in FIG. 9, if a quantity of user information fields of the STA 1 in the user information list field is equal to 2, that is, N=2, when parsing a second user information field and determining two user information fields of the STA 1, the STA 1 may stop parsing the user information list field.

Figure 10:
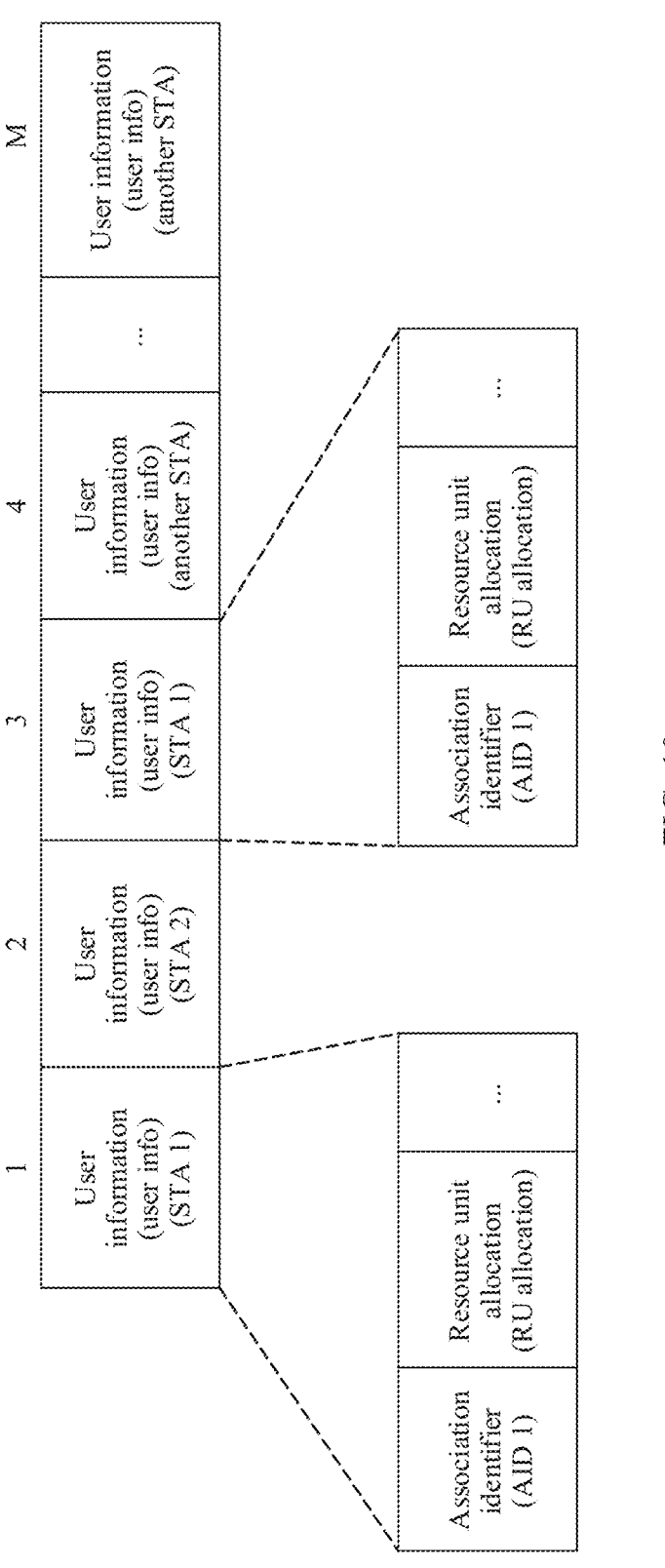
FIG. 10 is another schematic diagram of a user information list field according to an embodiment of this application.

For another example, in the user information list field shown in FIG. 10, if a maximum quantity of user information fields of the STA 1 in the user information list field is equal to 2, that is, N=2, when parsing a third user information field and determining two user information fields of the STA 1, the STA 1 may stop parsing the user information list field.

Optionally, the quantity N of user information fields of the station in the user information list field is configured for the station in a protocol-predefined manner or by using signaling, or calculated by the access point. For example, it is assumed that a quantity of resource units that can be indicated by each user information field is 1. N may be equal to a quantity of resource units that can be allocated and is configured for the station in a protocol-predefined manner or by using signaling.

1.3. User Information Fields of a Same Station in the Trigger Frame are Distributed Continuously.

In other words, user information fields of different stations are distributed continuously in the user information list field. As shown in FIG. 9, after distribution of the user information fields of the STA 1 in the user information list field ends, user information fields of the STA 2 are distributed.

In the implementation, in step 103, that the station selects, from the user information list field, the plurality of user information fields that are the same as the association identifier of the station may include: the station sequentially parses and determines, based on an index of each user information field and starting from a first parsed user information field, in the user information list field, that is the same as the association identifier of the station, whether an association identifier indicated by an association identifier field in each user information field is the same as the association identifier of the station, until a user information field different from the association identifier of the station is parsed and determining; and selects, from all the parsed user information fields, the plurality of user information fields that are the same as the association identifier of the station. It can be seen that the implementation can reduce complexity of parsing the user information list field by the station.

For example, as shown in FIG. 9, both the user information fields of the STA 1 and the user information fields of the STA 2 are distributed continuously in the user information list field. Once distribution of the user information fields of the STA 2 starts, it indicates that distribution of the user information fields of the STA 1 ends. In this way, after parsing and determining the second user information field, the STA 1 continues to parse the third user information field. After determining that the third user information field is not a user information field of the STA 1, the STA 1 may stop parsing a subsequent user information field, that is, no longer parse the user information list field.

1.4. The User Information Field Includes an End Flag.

Figure 11:
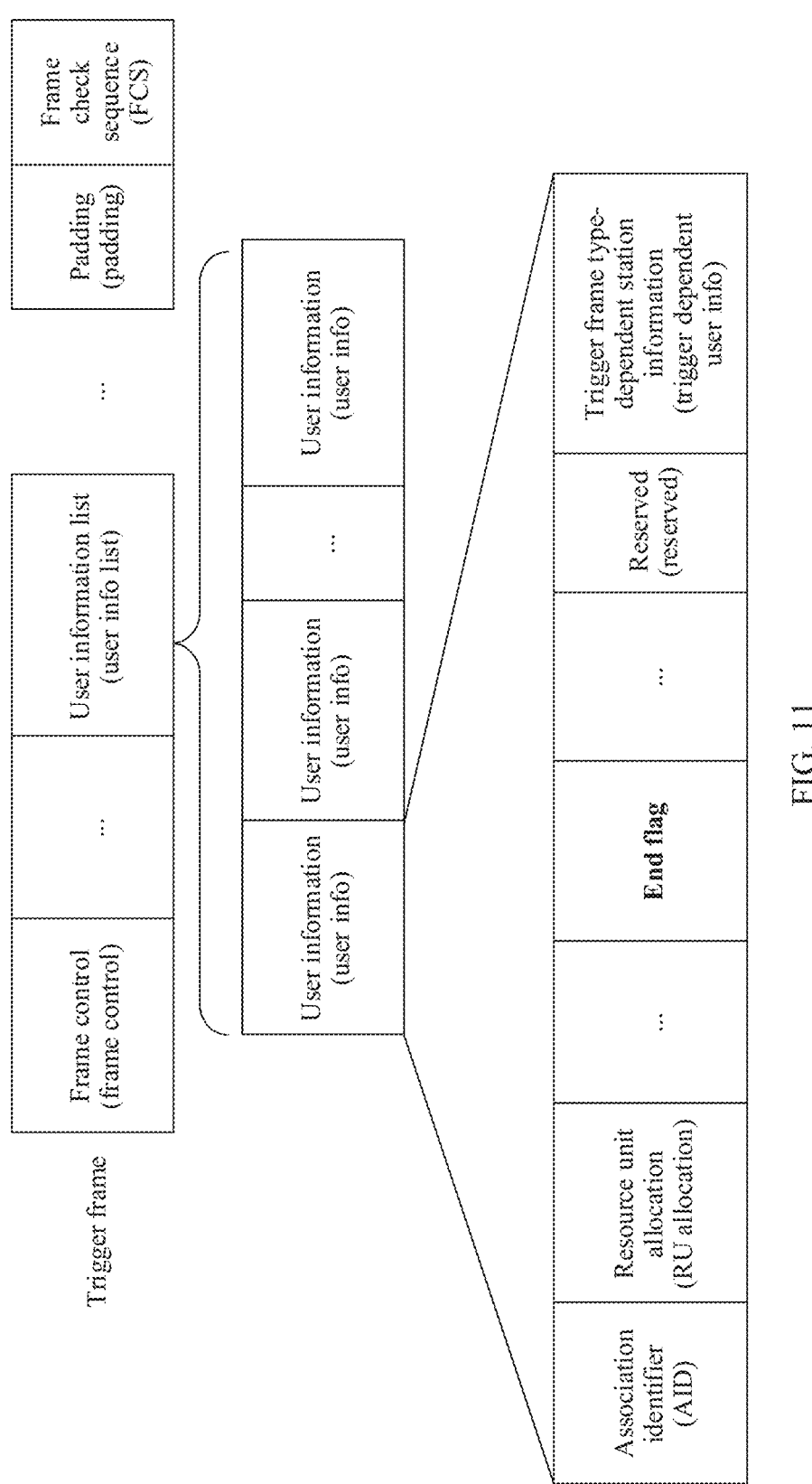
FIG. 11 is a schematic diagram of a structure of another user information list field according to an embodiment of this application.

To be specific, FIG. 11 is a schematic diagram of a structure of another user information list field according to an embodiment of this application. In FIG. 11, the user information field further includes an end flag, and the end flag indicates whether allocation of the resource unit to the station ends.

The end flag may occupy one bit. The one bit may be one bit in a reserved field in the user information field, one bit newly added to the user information field, or one bit that is of other information and that is reused. This is not limited in embodiments of this application.

The end flag may also be referred to as an end flag domain, end flag information, an end flag indication, or the like. That a value of the end flag is 1 may indicate that allocation of the resource unit to the station with the user information field in which the end flag is located ends. That a value of the end flag is 0 may indicate that allocation of the resource unit to the station with the user information field in which the end flag is located does not end, and the station further needs to parse a next user information field, or vice versa.

In the implementation, that the station selects, from the user information list field, the plurality of user information fields that are the same as the association identifier of the station may include; the station sequentially parses, based on an index of each user information field in the trigger frame, whether an association identifier indicated by an association identifier field in each user information field is the same as the association identifier of the station, and stops the step of parsing whether an association identifier indicated by an association identifier field in each user information field is the same as the association identifier of the station, until an end flag in a parsed user information field indicates that allocation of the resource unit to the station ends; and selects, from all the parsed user information fields, the plurality of user information fields that are the same as the association identifier of the station.

It is assumed that, that the value of the end flag is 1 indicates allocation of the resource unit to the station with the user information field in which the end flag is located ends. As shown in FIG. 9, if the second user information field is a last user information field in the user information fields for allocating the resource unit to the STA 1, the AP may set the value of the end flag to 1 in the second user information field. In this way, when parsing the second user information field, and reading that the value of the end flag is 1, the station may stop parsing the user information list field. In other words, the station does not need to parse the third user information field and a user information field after the third user information field. Correspondingly, because the first user information field is not the last user information field in the user information fields for allocating the resource unit to the STA 1, the value of the end flag may be set to 0 in the first user information field. In this way, after parsing and determining the first user information field, the STA 1 may continue to parse and determine the second user information field.

As shown in FIG. 10, if the third user information field is a last user information field in the user information fields for allocating the resource unit to the STA 1, the AP may set the value of the end flag to 1 in the third user information field. In this way, when parsing the third user information field, and reading that the value of the end flag is 1, the station may stop parsing and determining the user information list field. In other words, the station does not need to parse the fourth user information field and a user information field after the fourth user information field. Correspondingly, because the first user information field is not the last user information field in the user information fields for allocating the resource unit to the STA 1, the value of the end flag may be set to 0 in the first user information field. In this way, after parsing and determining the first user information field, the STA 1 may continue to parse and determine the second user information field. In addition, in FIG. 10, after parsing the second user information field, and determining that the second user information field is not a user information field of the STA 1, the STA 1 may continue to parse and determine the third user information field.

In addition, a method in which the station selects the plurality of user information fields of the station from the user information list field may include any one or more of the foregoing implementations described in 1.1 to 1.4, but is not limited to the implementations.

A manner in which the station determines one or more resource units indicated by each of the plurality of selected user information fields may be described by using the following several optional implementations in embodiments of this application, but the following implementations are not limited thereto.

2.1. Each User Information Field Indicates One Resource Unit.

The user information field may indicate one resource unit. For example, the resource unit allocation subfield shown in FIG. 2 indicates the resource unit. In other words, a resource unit indication and a frequency band range indication that are included in a user information field may be included in the resource unit allocation subfield.

It can be seen that in the implementation, regardless of a range of a bandwidth of a combination of resource units and a quantity of required RUs, a quantity of user information fields may respectively indicate a same quantity of RUs.

In the implementation, the station may be notified, in a protocol-predefined manner or a signaling configuration manner, of a correspondence between resource units and indexes. The AP may indicate one of the indexes by using the resource unit allocation subfield, so that the station can determine a corresponding resource unit based on the index indicated by the resource unit allocation subfield.

A bandwidth of a wireless local area network may include 20 MHz, 40 MHz, 80 MHz, 160 MHz, 240 MHz, 320 MHz, and the like. For a bandwidth of 20 MHz, 40 MHz, or 80 MHz, when allocating a resource unit to the station, the AP may directly indicate one resource unit in the bandwidth by using the resource unit allocation subfield. For a bandwidth greater than or equal to 160 MHz, for example, 160 MHz, 240 MHz, or 320 MHz, the AP further needs to use the resource unit allocation subfield to indicate a bandwidth of 80 MHz, in the bandwidth, in which a resource unit is located. Therefore, the resource unit allocation subfield may include a frequency band range indication and a resource unit indication.

The frequency band range indication indicates a frequency band range in which a resource unit indicated by the resource unit indication is located, and the resource unit indication indicates one allocated resource unit. Optionally, if a size of the resource unit indicated by the resource unit indication is greater than 80 MHz, or a quantity of subcarriers included in the resource unit indicated by the resource unit indication is greater than 996, for example, 2×996-tone RUs, the frequency band range indication may be ignored, that is, the station does not need to parse the frequency band range indication.

Table 2 shows a relationship among a value of the frequency band range indication, a bandwidth, and a frequency band range provided in embodiments of this application. As shown in Table 2, for bandwidths of 20 MHz, 40

MHz, and 80 MHz, the resource unit allocation subfield may not include the frequency band range indication. For a bandwidth of 160 MHz, the frequency band range indication in the resource unit allocation subfield may occupy one bit, that is, a quantity of required bits is 1. That the frequency band range indication is equal to 0 indicates that a resource unit indicated by the resource unit indication is located in primary 80 MHz in the bandwidth, or a resource unit indicated by the resource unit indication is one resource unit in primary 80 MHz. That the frequency band range indication is equal to 1 indicates that a resource unit indicated by the resource unit indication is located in secondary 80 MHz in the bandwidth, or a resource unit indicated by the resource unit indication is one resource unit in secondary 80 MHz. For a bandwidth of 320 MHz, the frequency band range indication in the resource unit allocation subfield may occupy two bits, that is, a quantity of required bits is 2. That the frequency band range indication is equal to 0 indicates that a resource unit indicated by the resource unit indication is located in primary 80 MHz in the bandwidth, or a resource unit indicated by the resource unit indication is one resource unit in primary 80 MHz. That the frequency band range indication is equal to 1 indicates that a resource unit indicated by the resource unit indication is located in secondary 80 MHz in the bandwidth, or a resource unit indicated by the resource unit indication is one resource unit in secondary 80 MHz. That the frequency band range indication is equal to 2 indicates that a resource unit indicated by the resource unit indication is located in third 80 MHz in the bandwidth, or a resource unit indicated by the resource unit indication is one resource unit in third 80 MHz. That the frequency band range indication is equal to 3 indicates that a resource unit indicated by the resource unit indication is located in fourth 80 MHz in the bandwidth, or a resource unit indicated by the resource unit indication is one resource unit in fourth 80 MHz. In addition, in Table 2, a correspondence between each value of the frequency band range indication and each 80 MHz frequency band range may be adjusted. This is not limited in embodiments of this application.

TABLE 2

| Bandwidth (BW) | Frequency band range indication | Quantity of bits |
|---|---|---|
| 20 MHz, 40 MHz, and 80 MHz | 0 | 0 |
| 160 MHz | 0: primary 80 MHz (which is also referred to as first 80 MHz or low-frequency 80 MHz) 0: secondary 80 MHz (which is also referred to as second 80 MHz or high-frequency 80 MHz) | 1 |
| 320 MHz | 0: primary 80 MHz (which is also referred to as first 80 MHz or lowest-frequency 80 MHz) 1: secondary 80 MHz (which is also referred to as second 80 MHz, second lowest-frequency 80 MHz, or second lowest-frequency 80 MHz) 2: third 80 MHz (which is also referred to as second highest-frequency 80 MHz) 3: fourth 80 MHz (which is also referred to as highest-frequency 80 MHz) | 2 |

The resource unit indication indicates one resource unit. A size of the resource unit may include but is not limited to the foregoing seven sizes. With reference to the schematic diagram of distribution of resource units in an 80 MHz bandwidth shown in FIG. 5, the 80 MHz frequency band range may include 37 26-tone RUs located at different locations, 16 52-tone RUs located at different locations, eight 106-tone RUs located at different locations, four 242-tone RUs located at different locations, two 484-tone RUs located at different locations, or one 996-tone RU. In addition, the resource unit indication may alternatively indicate 2×996-tone RUs. Therefore, the value of the resource unit indication or the index indicated by the resource unit indication ranges from at least 0 to 68, to respectively indicate the 68 resource units.

Table 3 shows a correspondence between a value of the resource unit indication and each resource unit. To indicate the 68 resource units, the resource unit indication needs at least seven bits. Therefore, values 0 to 68 of the seven bits may respectively indicate resource units shown in Table 3, and values 69 to 127 may be reserved. In addition, the correspondence between each value and an indicated resource unit in Table 3 may be adjusted. This is not limited in embodiments of this application. For example, values of the resource unit indication may indicate, in descending order, resource units that are arranged in descending order, or the like. Related content described in Table 3 may include related literal descriptions of claim 13 in the claims. In other words, the specification describes cases in which the first resource unit to the seventh resource unit are replaced with resource units of corresponding sizes. For example, the first resource unit is a 996-tone RU, the second resource unit is a 484-tone RU, and the third resource unit is a 242-tone RU. Similarly, descriptions in Table 2 to Table 13 are also provided by using corresponding RUs, and include content of corresponding claims.

TABLE 3

| Resource unit indication | Indicated resource unit (description) | Quantity (number of entries) |
|---|---|---|
| 0 to 36 | Respectively indicate 37 26-tone RUs in 80 MHz (possible 26-tone RU cases in 80 MHz) | 37 |
| 37 to 52 | Respectively indicate 16 52-tone RUs in 80 MHz (possible 52-tone RU cases in 80 MHz) | 16 |
| 53 to 60 | Respectively indicate eight 106-tone RUs in 80 MHz (possible 106-tone RU cases in 80 MHz.) | 8 |
| 61 to 64 | Respectively indicate four 242-tone RUs in 80 MHz (possible 242-tone RU cases in 80 MHz) | 4 |
| 65 and 66 | Respectively indicate two 484-tone RUs in 80 MHz (possible 484-tone RU cases in 80 MHz) | 2 |
| 67 | Indicate one 996-tone RU in 80 MHz (996-tone RU case in 80 MHz) | 1 |
| 68 | Indicate 2 × 996-tone RUs (2 × 996-tone RU cases) | 1 |
| 69 | Indicate 3 × 996-tone RUs (3 × 996-tone RU cases) | 1 |
| 70 | Indicate 4 × 996-tone RUs (4 × 996-tone RU cases) | 1 |
| 71 to 127 | Reserved | 57 |

In the implementation, the frequency band range indication indicates an 80 MHz frequency band range in a bandwidth, and the resource unit indication indicates one resource unit. The resource unit may be any resource unit in the 80 MHz frequency band range or any resource unit in a frequency band range greater than 80 MHz. In other words, each user information field may indicate any resource unit in an 80 MHz frequency band range or a resource unit in a frequency band range greater than 80 MHz. Therefore, for the plurality of selected user information fields in step 103 in this embodiment of this application, a resource unit allocation subfield in each user information field may be used to determine one resource unit. In this case, resource units separately indicated by the plurality of user information fields are the plurality of resource units allocated to the station.

If a bandwidth is 20 MHz, 40 MHz, or 80 MHz, in this implementation, the frequency band range indication may be 0 by default. For each user information field of the station, the station may determine one resource unit based on the resource unit indication. If a bandwidth is 160 MHz or 320 MHz, the frequency band range indication may occupy one bit or two bits. For each user information field of the station, the station may determine one 80 MHz frequency band range based on the frequency band range indication, and determine a corresponding resource unit from the 80 MHz frequency band range based on the resource unit indication.

It is assumed that regardless of a size of a bandwidth, the frequency band range indication occupies two bits that are higher two bits in the resource unit allocation subfield, the resource unit indication occupies seven bits that are lower seven bits in the resource unit allocation subfield, and the values of the resource unit indication, in ascending order, in Table 3 are in a one-to-one correspondence with RUs in each row from left to right in FIG. 3.

For ease of description by using an example, the following describes some possible RU combination solutions with reference to the accompanying drawings.

FIG. 12 to FIG. 17 are used as an example to describe a combination solution of a 52-tone RU and a 26-tone RU in a 20 MHz frequency band range in 80 MHz, namely, a 52-tone RU and a 26-tone RU that are allocated to a station.

The solution is combining a 52-tone RU at a second lowest frequency in a 20 MHz frequency band range in the 80 MHz frequency band range with a 26-tone RU, in the 20 MHz frequency band range, that is on a same side as and that is adjacent to the 52-tone RU. "The 26-tone RU that is on the same side as and that is adjacent to the 52-tone RU" is related to a location of the 20 MHz frequency band range in the 80 MHz frequency band range. If the 20 MHz frequency band range is on the left of a center location of the 80 MHz frequency band range, "the 26-tone RU that is on the same side as and that is adjacent to the 52-tone RU" means that "the 26-tone resource unit is on the left side of the 20 MHz frequency band range and adjacent to the 52-tone RU"; or if the 20 MHz frequency band range is on the right of a center location of the 80 MHz frequency band range, "the 26-tone RU that is on the same side as and that is adjacent to the 52-tone RU" means that "the 26-tone resource unit is on the right side of the 20 MHz frequency band range and adjacent to the 52-tone RU".

In this specification, an RU at a second lowest frequency, an RU at a lowest frequency, an RU at a second highest frequency, and an RU at a highest frequency are all relative concepts in one frequency range. For example, as shown in FIG. 5, in first 20 MHz, a 52-tone RU at a second lowest frequency is a second 52-tone RU in a second row in FIG. 5, a 52-tone RU at a lowest frequency is a first 52-tone RU in the second row in FIG. 5, a 52-tone RU at a second highest frequency is a third 52-tone RU in the second row in FIG. 5, and a 52-tone RU at a highest frequency is a fourth 52-tone RU in the second row in FIG. 5. Correspondingly, for another RU, an RU at a second lowest frequency, an RU at a lowest frequency, an RU at a second highest frequency, and an RU at a highest frequency are similar, and details are not described herein again. In addition, in this specification, a low-frequency RU and a high-frequency RU are also relative concepts in one frequency range. Usually, there are two RUs in the frequency range. The low-frequency RU is an RU that is at a lower frequency in the two RUs, and the high-frequency RU is an RU that is at a higher frequency in the two RUs. For example, as shown in FIG. 5, in the first 20 MHz, a 106-tone RU at a low frequency is a first 106-tone RU in a third row in FIG. 5, and a 106-tone RU at a high frequency is a second 106-tone RU in the third row in FIG. 5.

Figure 12:
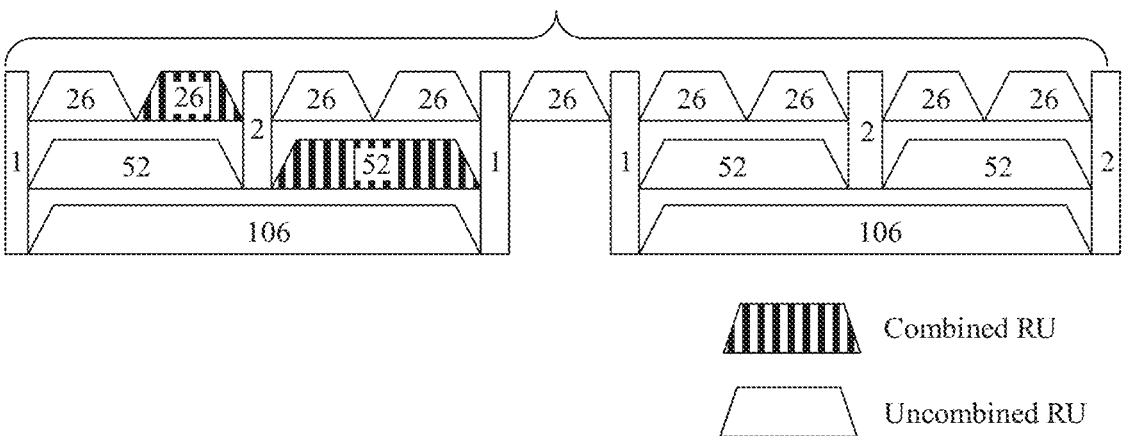

FIG. 12 is a schematic diagram of a combination solution of a 52-tone RU and a 26-tone RU according to an embodiment of this application. FIG. 12 shows RU distribution in a case in which 20 MHz is first 20 MHz or second 20 MHz in 80 MHz. Therefore, in the 20 MHz shown in FIG. 12, a combination solution of a 52-tone RU at a second lowest frequency and a 26-tone RU, in the 20 MHz, that is on a same side as and that is adjacent to the 52-tone RU is shown in FIG. 12.

Figure 13:
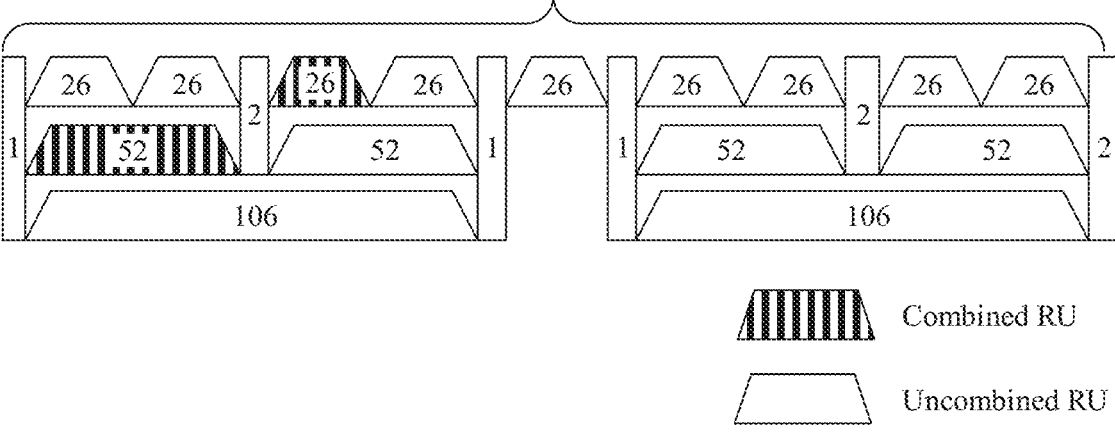

FIG. 13 is a schematic diagram of another combination solution of a 52-tone RU and a 26-tone RU according to an embodiment of this application. FIG. 13 shows RU distribution in a case in which 20 MHz is third 20 MHz or fourth 20 MHz in 80 MHz. In other words, the 20 MHz is at the right side of a center location of the 80 MHz frequency band range. Therefore, in the 20 MHz shown in FIG. 13, a combination solution of a 52-tone RU at a lowest frequency and a 26-tone RU, in the 20 MHz frequency band range, that is on a same side as and that is adjacent to the 52-tone RU is a combination of the 52-tone RU at a lowest frequency and the 26-tone RU that is on the right side of the 20 MHz frequency band range and that is adjacent to the 52-tone RU.

Figure 14:
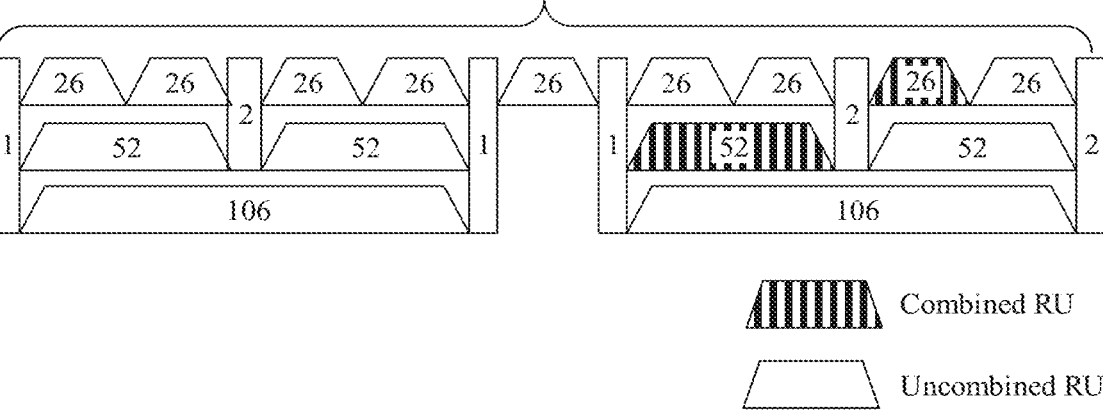

FIG. 14 is a schematic diagram of still another combination solution of a 52-tone RU and a 26-tone RU according to an embodiment of this application. FIG. 14 shows RU distribution in a case in which 20 MHz is third 20 MHz or fourth 20 MHz in 80 MHz. In other words, the 20 MHz is at the right side of a center location of the 80 MHz frequency band range. Therefore, in the 20 MHz shown in FIG. 14, a combination solution of a 52-tone RU at a second highest frequency and a 26-tone RU, in the 20 MHz frequency band range, that is on a same side as and that is adjacent to the 52-tone RU is a combination of the 52-tone RU at a second highest frequency and the 26-tone RU that is on the right side of and that is adjacent to the 52-tone RU.

Figure 15:
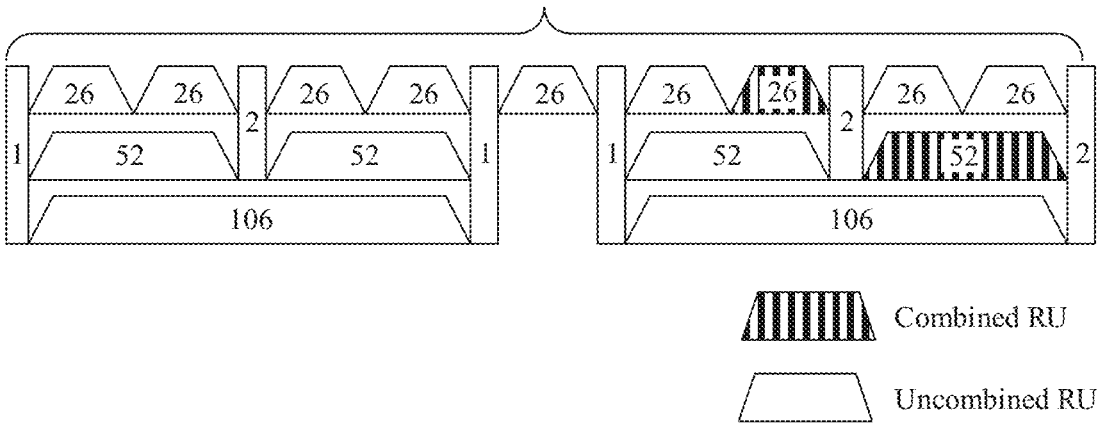

FIG. 15 is a schematic diagram of still another combination solution of a 52-tone RU and a 26-tone RU according to an embodiment of this application. FIG. 15 shows RU distribution in a case in which 20 MHz is first 20 MHz or second 20 MHz in 80 MHz. In other words, the 20 MHz is at the left side of a center location of the 80 MHz frequency band range. Therefore, in the 20 MHz shown in FIG. 15, a combination solution of a 52-tone RU at a highest frequency and a 26-tone RU, in the 20 MHz frequency band range, that is on a same side as and that is adjacent to the 52-tone RU is a combination of the 52-tone RU at a highest frequency and the 26-tone RU that is on the left side of the 20 MHz frequency band range and that is adjacent to the 52-tone RU.

FIG. 16 is a schematic diagram of still another combination solution of a 52-tone RU and a 26-tone RU according to an embodiment of this application. FIG. 16 shows RU distribution in a case in which 20 MHz is a 20 MHz frequency band range in 80 MHz. As shown in FIG. 16, a combination solution of a 52-tone RU at a second lowest frequency in the 20 MHz frequency band range and a 26-tone RU in a center of the 20 MHz frequency band range is a combination of the 52-tone RU at a second lowest frequency and the 26-tone RU in the center of the 20 MHz frequency band range.

FIG. 17 is a schematic diagram of still another combination solution of a 52-tone RU and a 26-tone RU according to an embodiment of this application. FIG. 17 shows RU distribution in a case in which 20 MHz is a 20 MHz frequency band range in 80 MHz. As shown in FIG. 17, a combination solution of a 52-tone RU at a second highest frequency in the 20 MHz frequency band range and a 26-tone RU in a center of the 20 MHz frequency band range is a combination of the 52-tone RU at a second highest frequency and the 26-tone RU in the center of the 20 MHz frequency band range.

Figure 18:
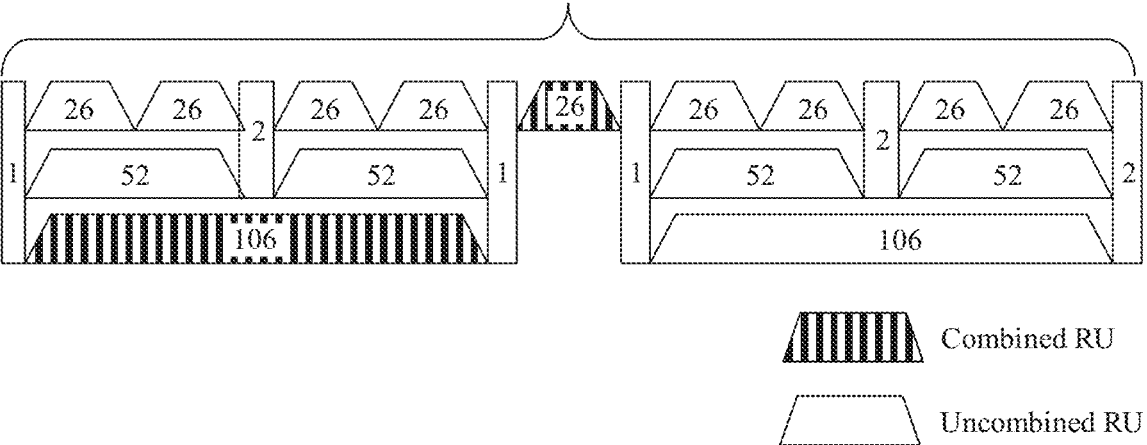
FIG. 18 and FIG. 19 each are a schematic diagram of a combination of a 106-tone RU and a 26-tone RU according to an embodiment of this application.
Figure 19:
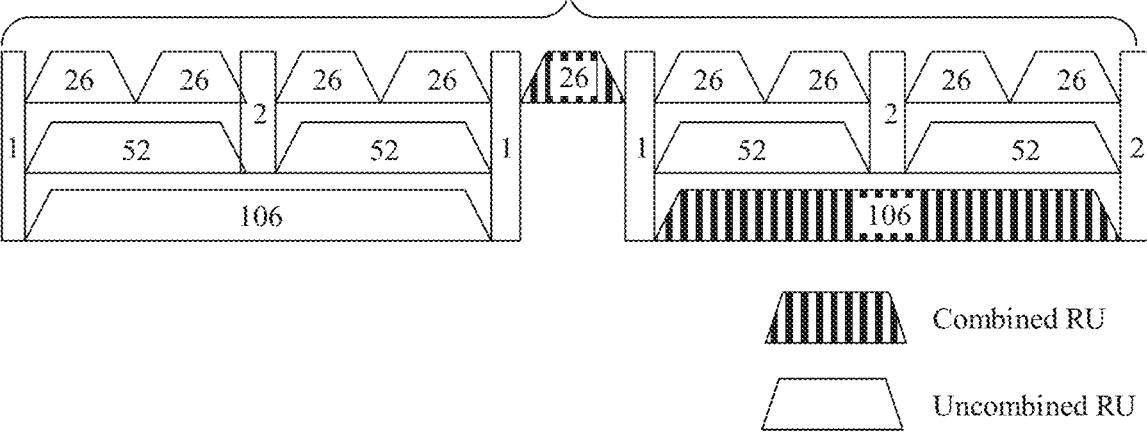

FIG. 18 and FIG. 19 are used as an example to describe a combination solution of a 106-tone RU and a 26-tone RU in a 20 MHz frequency band range in 80 MHz, namely, a 106-tone RU and a 26-tone RU that are allocated to the station.

FIG. 18 is a schematic diagram of a combination of a 106-tone RU and a 26-tone RU according to an embodiment of this application. FIG. 18 shows RU distribution in a 20 MHz frequency band range in 80 MHz. FIG. 18 shows a combination solution of a 106-tone RU at a low frequency in the 20 MHz frequency band range and a 26-tone RU in a center of the 20 MHz frequency band range.

FIG. 19 is a schematic diagram of a combination of a 106-tone RU and a 26-tone RU according to an embodiment of this application. FIG. 19 shows RU distribution in a 20 MHz frequency band range in 80 MHz. FIG. 19 shows a combination solution of a 106-tone RU at a high frequency in the 20 MHz frequency band range and a 26-tone RU in a center of the 20 MHz frequency band range.

FIG. 20 to FIG. 23 are used as an example to describe a combination solution of a 484-tone RU and a 242-tone RU in 80 MHz, namely, a 484-tone RU and a 242-tone RU that are allocated to the station.

Figures 20, 21, 22:
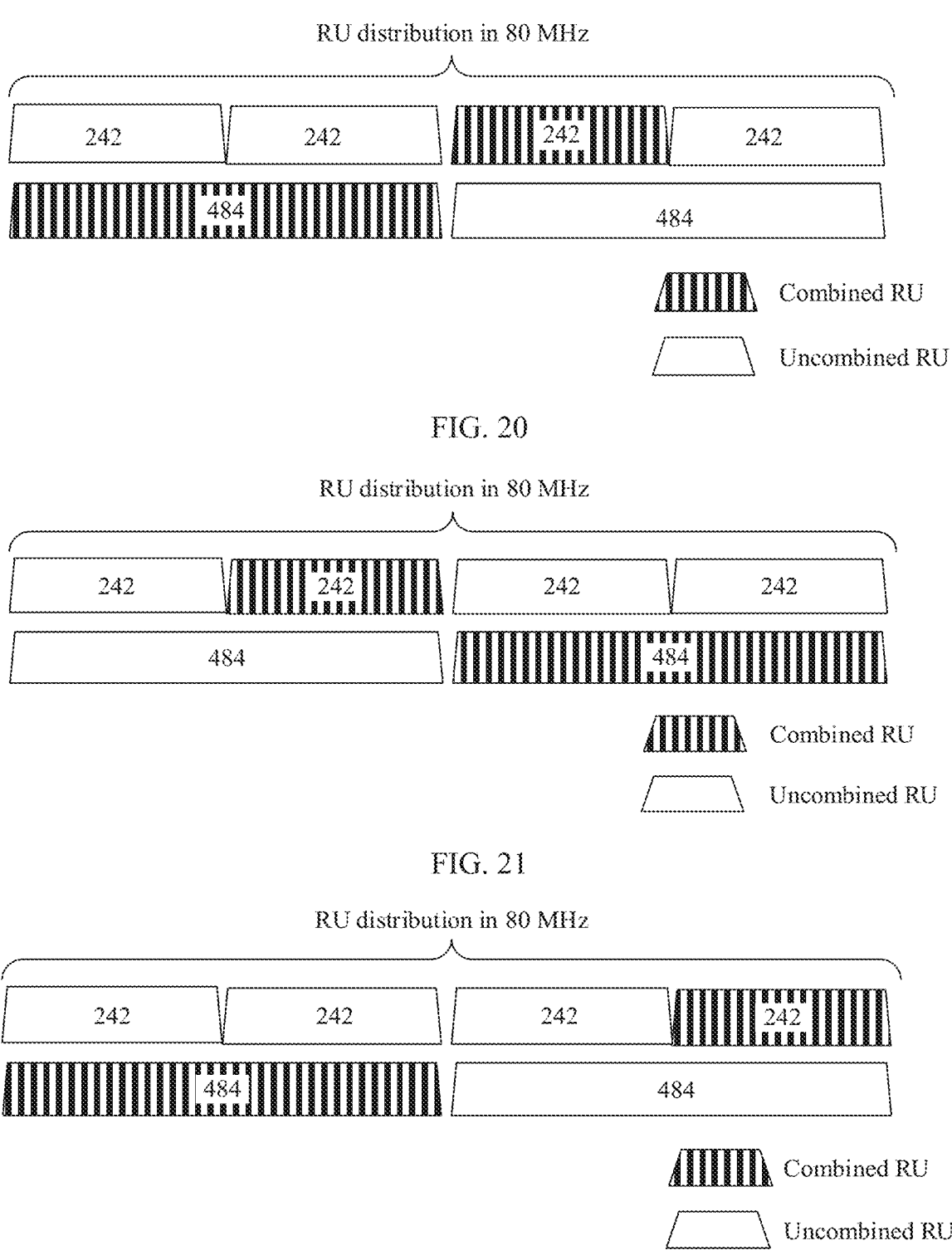
FIG. 20 to FIG. 23 each are a schematic diagram of a combination of one 484-tone RU and one 242-tone RU in an 80 MHz frequency band range according to an embodiment of this application.

FIG. 20 is a schematic diagram of a combination of a 484-tone RU and a 242-tone RU according to an embodiment of this application. FIG. 20 shows RU distribution in 80 MHz. FIG. 20 shows a combination solution of a 484-tone RU at a low frequency and a continuous 242-tone RU.

FIG. 21 is a schematic diagram of a combination of a 484-tone RU and a 242-tone RU according to an embodiment of this application. FIG. 21 shows RU distribution in 80 MHz. FIG. 21 shows a combination solution of a 484-tone RU at a high frequency and a continuous 242-tone RU.

FIG. 22 is a schematic diagram of a combination of a 484-tone RU and a 242-tone RU according to an embodiment of this application. FIG. 22 shows RU distribution in 80 MHz. FIG. 22 shows a combination solution of a 484-tone RU at a low frequency and a discontinuous 242-tone RU.

Figures 23, 24, 25:
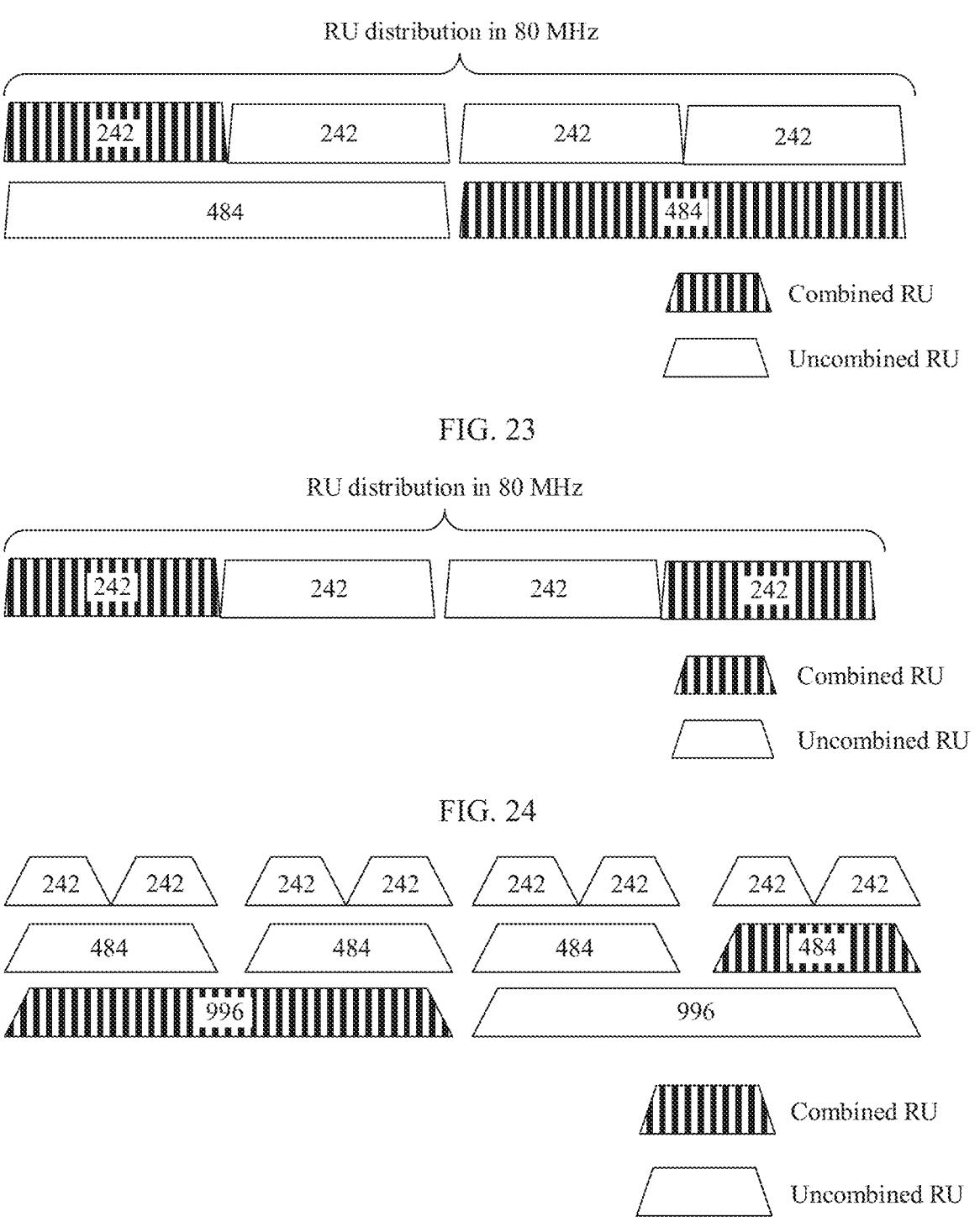
FIG. 24 is a schematic diagram of a combination of two 242-tone RUs according to an embodiment of this application.
FIG. 25 and FIG. 26 each are a schematic diagram of a combination of a 996-tone RU and a 484-tone RU according to an embodiment of this application.

FIG. 23 is a schematic diagram of a combination of a 484-tone RU and a 242-tone RU according to an embodiment of this application. FIG. 23 shows RU distribution in 80 MHz. FIG. 23 shows a combination solution of a 484-tone RU at a high frequency and a discontinuous 242-tone RU.

FIG. 24 is a schematic diagram of a combination of two 242-tone RUs according to an embodiment of this application. FIG. 24 shows RU distribution in 80 MHz. FIG. 24 shows a combination solution of two 242-tone RUs on an outermost side of the 80 MHz. "The outermost side" is relative to the 80 MHz. Optionally, the combination of two 242-tone RUs in FIG. 24 may also be referred to as 242-tone RUs on "two sides" of the 80 MHz.

Figures 26, 27, 28:
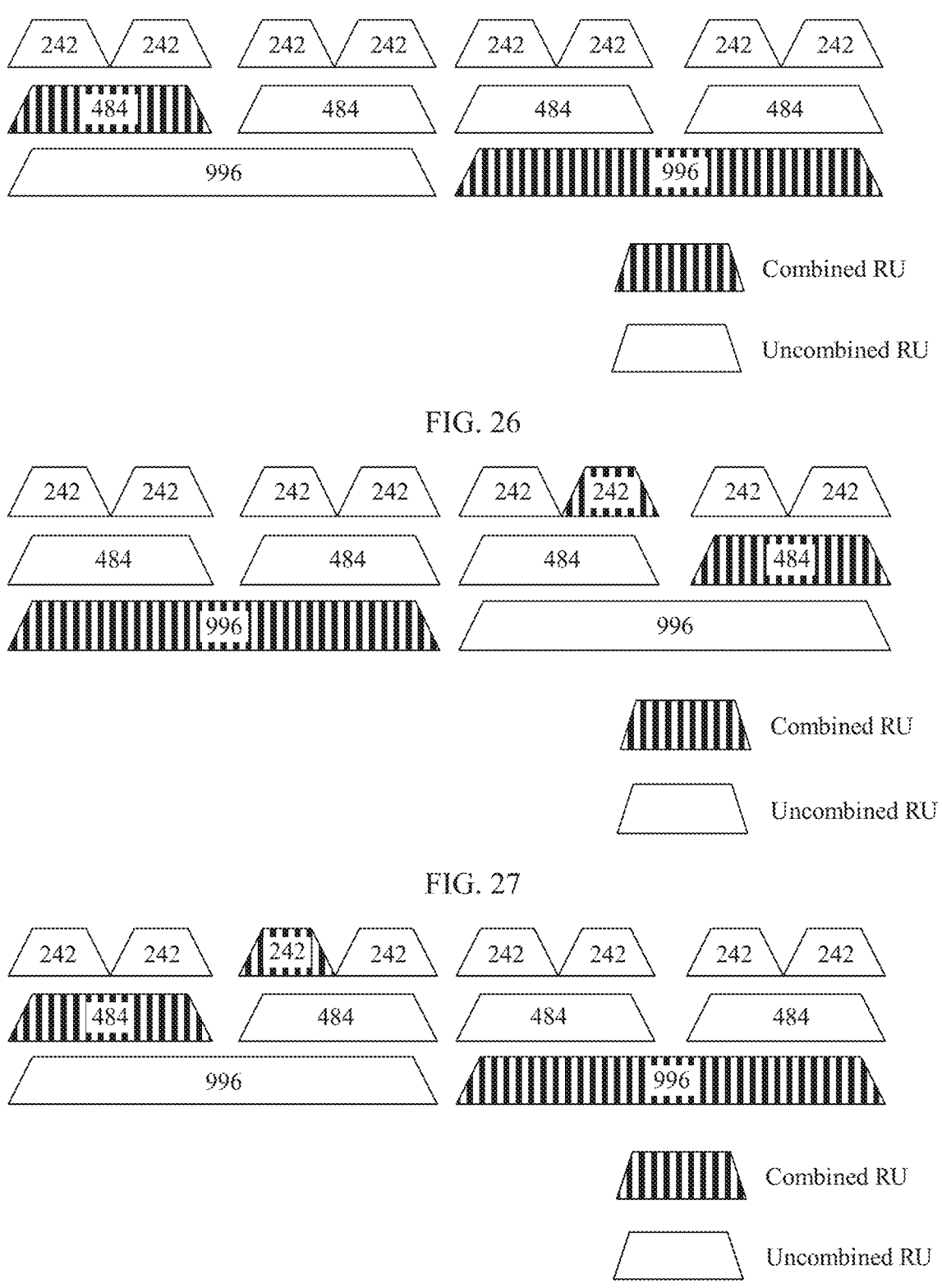
FIG. 27 and FIG. 28 each are a schematic diagram of a combination of a 996-tone RU, a 484-tone RU, and a 242-tone RU according to an embodiment of this application.

FIG. 25 and FIG. 26 each are a schematic diagram of a combination of a 996-tone RU and a 484-tone RU, but are not limited to combination solutions.

FIG. 25 is a schematic diagram of a combination of a 996-tone RU and a 484-tone RU according to an embodiment of this application. FIG. 25 shows RU distribution in 80 MHz that is indicated by the frequency band range indication and that is in a higher-frequency 80 MHz adjacent to the 80 MHz. A combination solution of a 996-tone RU corresponding to 80 MHz indicated by the frequency band range indication and a 484-tone RU that is in a higher-frequency 80 MHz adjacent to the 996-tone RU and that is not adjacent to the 996-tone RU is shown in FIG. 25.

FIG. 26 is a schematic diagram of a combination of a 996-tone RU and a 484-tone RU according to an embodiment of this application. FIG. 26 shows RU distribution in 80 MHz that is indicated by the frequency band range indication and that is in a lower-frequency 80 MHz adjacent to the 80 MHz. A combination solution of a 996-tone RU corresponding to 80 MHz indicated by the frequency band range indication and a 484-tone RU that is in a lower-frequency 80 MHz adjacent to the 996-tone RU and that is not adjacent to the 996-tone RU is shown in FIG. 26.

FIG. 27 and FIG. 28 each are a schematic diagram of a combination of a 996-tone RU, a 484-tone RU, and a 242-tone RU, but are not limited to combination solutions.

FIG. 27 is a schematic diagram of a combination of a 996-tone RU, a 484-tone RU, and a 242-tone RU according to an embodiment of this application. FIG. 27 shows RU distribution in 80 MHz that is indicated by the frequency band range indication and that is in a higher-frequency 80 MHz adjacent to the 80 MHz. A combination solution of a 996-tone RU corresponding to 80 MHz indicated by the frequency band range indication and a 484-tone RU and a 242-tone RU that are in a higher-frequency 80 MHz adjacent to the 996-tone RU and that are not adjacent to the 996-tone RU is shown in FIG. 27.

FIG. 28 is a schematic diagram of a combination of a 996-tone RU, a 484-tone RU, and a 242-tone RU according to an embodiment of this application. FIG. 28 shows RU distribution in 80 MHz that is indicated by the frequency band range indication and that is in a lower-frequency 80 MHz adjacent to the 80 MHz. A combination solution of a 996-tone RU corresponding to 80 MHz indicated by the frequency band range indication and a 484-tone RU and a 242-tone RU that are in a lower-frequency 80 MHz adjacent to the 996-tone RU and that are not adjacent to the 996-tone RU is shown in FIG. 28.

In addition, in this specification, that a frequency band range is "lower-frequency adjacent to" or "higher-frequency adjacent to" another frequency band range means that the two frequency band ranges are nearest. For example, in FIG. 27, relative to a second 80 MHz frequency band range, a first 80 MHz frequency band range may be referred to as a frequency band range lower-frequency adjacent to the second 80 MHz frequency band range. Relative to the first 80 MHz frequency band range, the second 80 MHz frequency band range may be referred to as a frequency band range higher-frequency adjacent to the first 80 MHz frequency band range.

Figures 29, 30, 31:
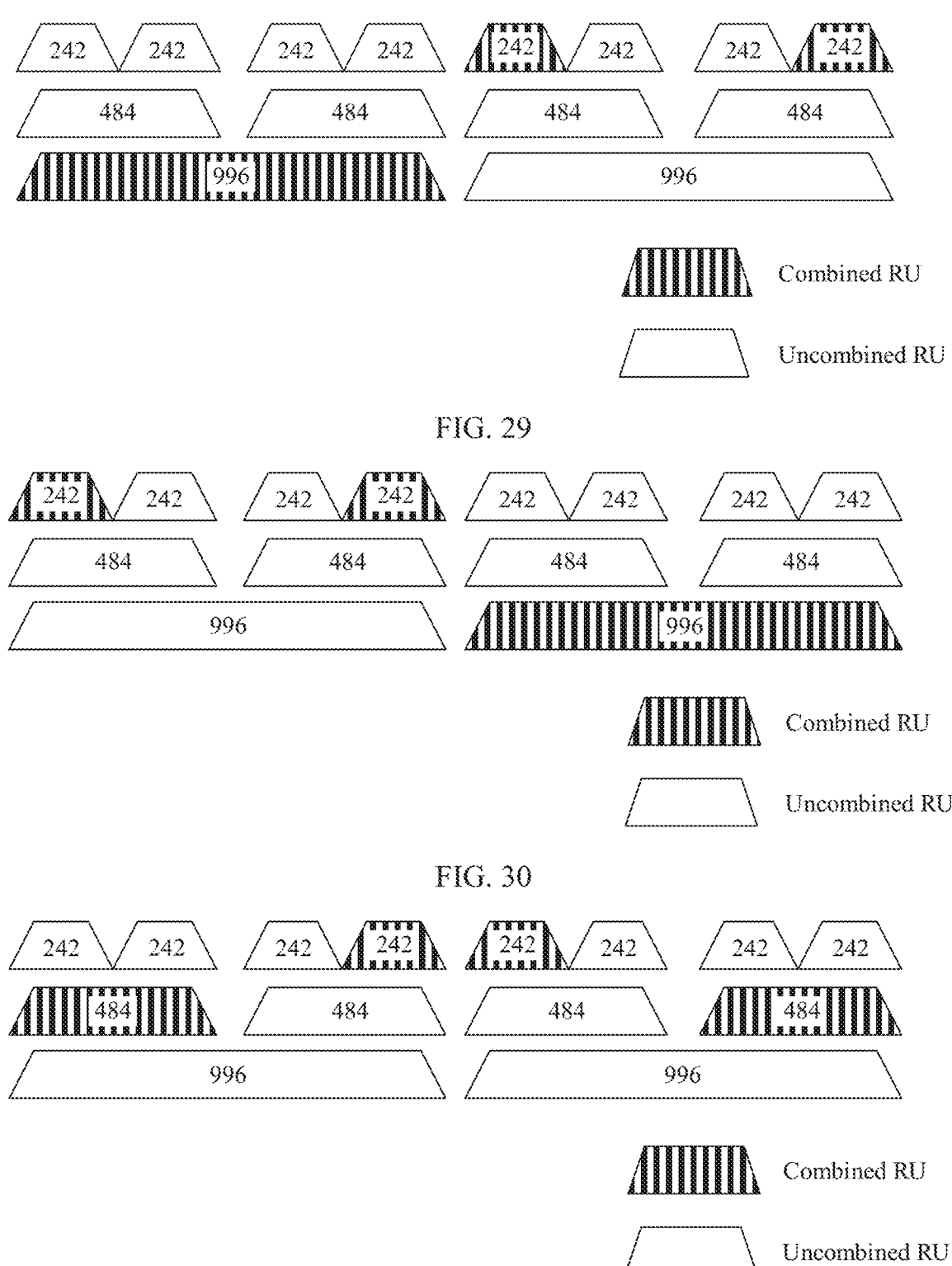
FIG. 29 and FIG. 30 each are a schematic diagram of a combination of a 996-tone RU, a 242-tone RU, and a 242-tone RU according to an embodiment of this application.
FIG. 31 is a schematic diagram of a combination of a 484-tone RU, a 242-tone RU, a 484-tone RU, and a 242-tone RU according to an embodiment of this application.

FIG. 29 and FIG. 30 each are a schematic diagram of a combination of a 996-tone RU, a 242-tone RU, and a 242-tone RU, but are not limited to combination solutions.

FIG. 29 is a schematic diagram of a combination of a 996-tone RU, a 242-tone RU, and a 242-tone RU according to an embodiment of this application. FIG. 29 shows RU distribution in 80 MHz that is indicated by the frequency band range indication and that is in a higher-frequency 80 MHz adjacent to the 80 MHz. A combination solution of a 996-tone RU corresponding to 80 MHz indicated by the frequency band range indication and 242-tone RUs that are in a higher-frequency 80 MHz adjacent to the 996-tone RU and that are on two sides of the 80 MHz is shown in FIG. 29.

FIG. 30 is a schematic diagram of a combination of a 996-tone RU, a 242-tone RU, and a 242-tone RU according to an embodiment of this application. FIG. 29 shows RU distribution in 80 MHz that is indicated by the frequency band range indication and that is in a lower-frequency 80 MHz adjacent to the 80 MHz. A combination solution of a 996-tone RU corresponding to 80 MHz indicated by the frequency band range indication and 242-tone RUs that are in a lower-frequency 80 MHz adjacent to the 996-tone RU and that are on two sides of the 80 MHz is shown in FIG. 30.

FIG. 31 is a schematic diagram of a combination of a 484-tone RU, a 242-tone RU, a 484-tone RU, and a 242-tone RU according to an embodiment of this application. FIG. 31 shows RU distribution in 80 MHz that is indicated by the frequency band range indication and that is in a higher-frequency 80 MHz adjacent to the 80 MHz. A combination solution of a 484-tone RU and a 242-tone RU in 80 MHz indicated by the frequency band range indication and a 484-tone RU and a 242-tone RU that are in a higher-frequency 80 MHz adjacent to the 484-tone RU and the 242-tone RU is shown in FIG. 31.

There are four solutions for selecting a 484-tone RU and a 242-tone RU in 80 MHz. As shown in FIG. 20 to FIG. 23, there are two 80 MHz frequency band ranges between 80 MHz indicated by the frequency band range indication and 80 MHz adjacent to the 80 MHz. Therefore, 4×4=16, that is, there may be 16 combination solutions for the 484-tone RU, 242-tone RU, 484-tone RU, and the 242-tone RU. Details are not described herein.

FIG. 32 to FIG. 36 each are a schematic diagram of a combination of three 996-tone RUs in a 320 MHz frequency band range.

Figures 32, 33, 34, 35:
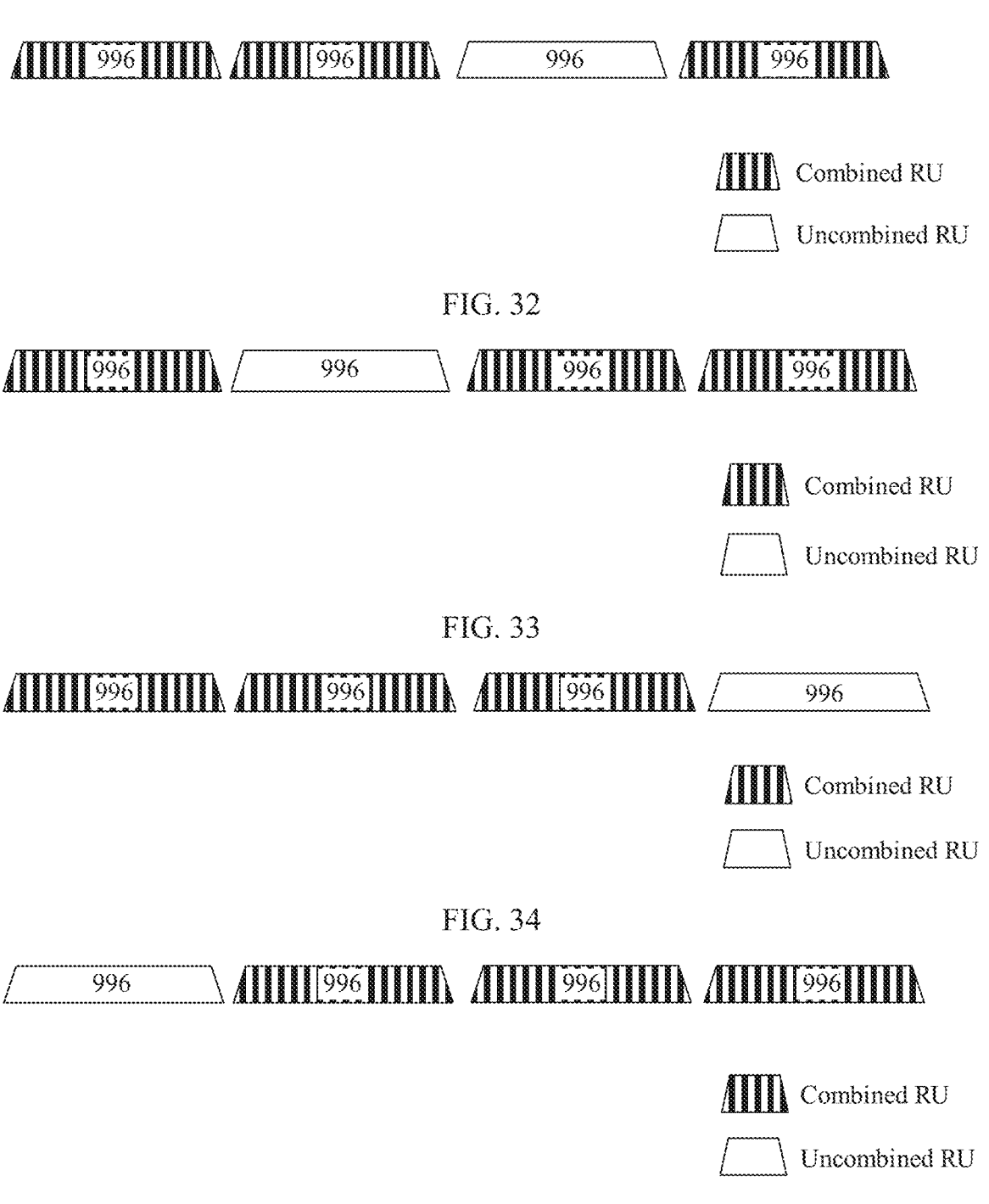
FIG. 32 to FIG. 36 each are a schematic diagram of a combination of three 996-tone RUs in a 320 MHz frequency band range according to an embodiment of this application.

FIG. 32 is a schematic diagram of a combination of three 996-tone RUs according to an embodiment of this application. RU distribution shown in FIG. 32 is RU distribution in 320 MHz. In the 320 MHz, a combination of two 996-tone RUs at a lowest frequency and one 996-tone RU at a highest frequency is shown in FIG. 32.

FIG. 33 is a schematic diagram of a combination of three 996-tone RUs according to an embodiment of this application. RU distribution shown in FIG. 33 is RU distribution in 320 MHz. In the 320 MHz, a combination of one 996-tone RU at a lowest frequency and two 996-tone RUs at a highest frequency is shown in FIG. 33.

FIG. 34 is a schematic diagram of a combination of three 996-tone RUs according to an embodiment of this application. RU distribution shown in FIG. 34 is RU distribution in 320 MHz. In the 320 MHz, a combination of three 996-tone RUs at a lowest frequency is shown in FIG. 34.

FIG. 35 is a schematic diagram of a combination of three 996-tone RUs according to an embodiment of this application. RU distribution shown in FIG. 35 is RU distribution in 320 MHz. In the 320 MHz, a combination of three 996-tone RUs at a highest frequency is shown in FIG. 35.

Figures 36, 37, 38, 39:
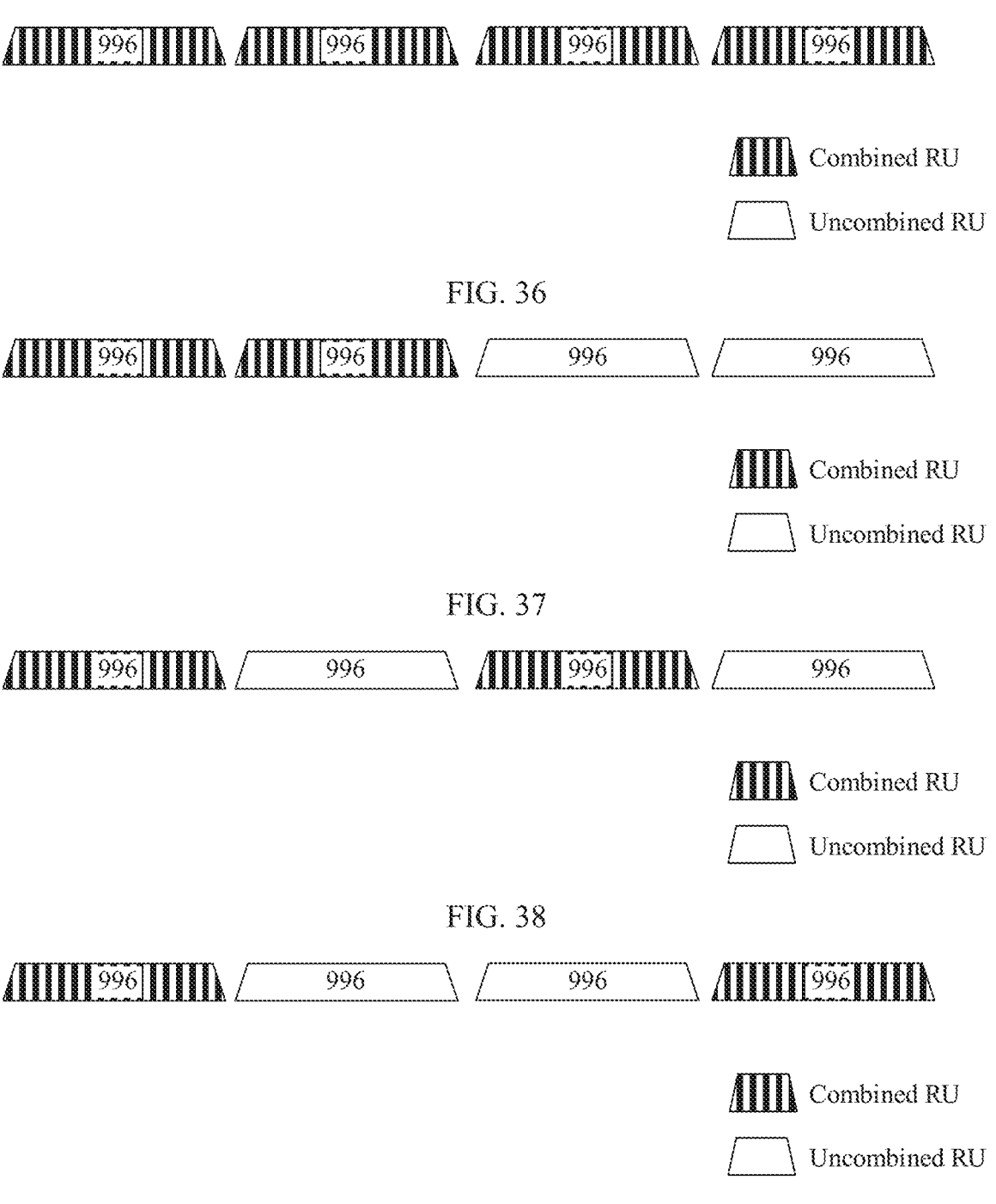
FIG. 37 to FIG. 39 each are a schematic diagram of a combination of two 996-tone RUs according to an embodiment of this application.

FIG. 36 is a schematic diagram of a combination of four 996-tone RUs according to an embodiment of this application. RU distribution shown in FIG. 36 is RU distribution in 320 MHz. In the 320 MHz, a combination of four 996-tone RUs is shown in FIG. 36.

FIG. 37 to FIG. 39 each are a schematic diagram of a combination of two 996-tone RUs according to an embodiment of this application. The two 996-tone RUs include at least one 996-tone RU corresponding to the primary 80 MHz.

FIG. 37 is a schematic diagram of a combination of two 996-tone RUs according to an embodiment of this application. RU distribution shown in FIG. 37 is RU distribution in 320 MHz. In the 320 MHz, a combination of a 996-tone RU corresponding to 80 MHz (for example, first 80 MHz) indicated by the frequency band range indication and another 996-tone RU corresponding to the first 80 MHz is shown in FIG. 37.

FIG. 38 is a schematic diagram of another combination of two 996-tone RUs according to an embodiment of this application. RU distribution shown in FIG. 38 is RU distribution in 320 MHz. In the 320 MHz, a combination of a 996-tone RU corresponding to 80 MHz (for example, first 80 MHz) indicated by the frequency band range indication and another 996-tone RU corresponding to second 80 MHz is shown in FIG. 38.

FIG. 39 is a schematic diagram of another combination of two 996-tone RUs according to an embodiment of this application. RU distribution shown in FIG. 39 is RU distribution in 320 MHz. In the 320 MHz, a combination of a 996-tone RU corresponding to 80 MHz (for example, first 80 MHz) indicated by the frequency band range indication and another 996-tone RU corresponding to third 80 MHz is shown in FIG. 39.

FIG. 12 to FIG. 39 are schematic diagrams of some possible RU combination solutions. In the resource allocation method in this application, the RU combination solutions shown in FIG. 12 to FIG. 39 are used as an example to describe how to provide indications for the station, to implement allocation of a plurality of resource units to the station.

Optionally, the RU combination solutions in FIG. 12 to FIG. 39 are applicable to configuration of resource units in uplink transmission, or configuration of resource units in PPDU transmission, for example, configuration of resource units in a single-user protocol data unit (SU PPDU), a multi-user protocol data unit (MU PPDU), or an extended-range protocol data unit (ER PPDU).

In the implementation, the user information list field includes the plurality of user information fields that are the same as the association identifier of the station, each user information field indicates one resource unit, the frequency band range indication in the resource unit allocation subfield may indicate 80 MHz in the bandwidth, and the resource unit indication may indicate one of the resource units by using the correspondence shown in Table 3.

For example, in the user information list field shown in FIG. 9, the AP sets the resource unit allocation subfield in the first user information field to 000000001. In this case, the STA 1 may parse the first user information field, and determine that the frequency band range indication (higher bits 00) in the resource unit allocation subfield indicates the first 80 MHz, and the resource unit indication (lower bits 0000001) indicates the second 26-tone RU in the first row in FIG. 3. In addition, the AP sets the resource unit allocation subfield in the second user information field to 000100110. In this case, the STA 1 may parse the second user information field, and determine that the frequency band range indication (higher bits 00) in the resource unit allocation subfield indicates the first 80 MHz, and the resource unit indication (lower bits 0100110) indicates the second 52-tone RU in the second row in FIG. 5. Because the STA 1 may determine, based on the implementations described in 1.1 to 1.4, that the user information list field does not include the user information fields of the STA 1, the STA 1 may finally determine that the plurality of RUs allocated to the STA 1 are the second 26-tone RU in the first row in FIG. 5 and the second 52-tone RU in the second row in FIG. 5.

Similarly, the combination solutions of two resource units shown in FIG. 12 to FIG. 26 and the combination solutions of two resource units shown in FIG. 37 to FIG. 39 may alternatively provide indications based on the correspondences shown in Table 2 and Table 3, so that the station can obtain a plurality of allocated resource units. Details are not described herein again.

For the combination solutions of three resource units shown in FIG. 27 to FIG. 34, the user information list field may include three user information fields that are the same as the association identifier of the station, so that the value of the frequency band range indication and the value of the resource unit allocation indication in each resource unit allocation subfield may be separately determined by using the three user information fields and the correspondences shown in Table 2 and Table 3. Correspondingly, the station may obtain the three user information fields of the station from the user information list field by using the implementations shown in 1.1 to 1.4, and then determine three allocated resource units based on Table 2, Table 3, and values in the user information fields in the implementations.

In the implementation, the user information fields are used to allocate a plurality of RUs to a single station, and the station can correctly parse RU allocation information. This helps achieve backward compatibility with a conventional receiving STA.

2.2. One User Information Field Indicates a Plurality of Resource Units.

In a case, a manner in which one user information field is needed to indicate every 80 MHz is used. In this case, a maximum of two user information fields are needed to indicate a combination of RUs in a frequency band range greater than 80 MHz and less than or equal to 160 MHz. A maximum of four user information fields are needed to indicate a combination of RUs in a frequency band range greater than 160 MHz and less than or equal to 320 MHz. In the implementation, a combination of a plurality of RUs in the 80 MHz may be indicated by using one user information field.

In another case, a manner in which one user information field is needed to indicate every 160 MHz is used. In this case, a maximum of one user information field is needed to indicate a combination of RUs in a frequency band range less than or equal to 160 MHz. A maximum of two user information fields are needed to indicate a combination of RUs in a frequency band range greater than 160 MHz and less than or equal to 320 MHz. In the implementation, a combination of a plurality of RUs in a frequency band range less than or equal to 160 MHz may be indicated by using one user information field in the 160 MHz.

When four RUs in a 160 MHz frequency band range are combined, for example, a 484-tone RU, a 242-tone RU, a 484-tone RU, and a 242-tone RU, one user information field is needed to indicate every 80 MHz, to indicate a combination of one 484-tone RU and one 242-tone RU. In this case, two user information fields may indicate the combination of the four RUs.

In addition, when three 996-tone RUs are combined, each 996-tone RU is indicated by using one user information field, and three user information fields may be needed to indicate the combination of the three 996-tone RUs.

Optionally, regardless of a range of a bandwidth of a combination of resource units, if a range of a bandwidth indicated by one user information field is not limited, one user information field indicates the plurality of resource units.

2.2. Correspondence Between a Plurality of Resource Units Indicated by One User Information Field and Indexes In this implementation, the resource unit indication in the resource unit allocation subfield may indicate a plurality of resource units (which are referred to as a combination of a plurality of resource units for ease of description). The station may be notified, in a protocol-defined manner or a signaling configuration manner, of a correspondence between possible combinations of a plurality of resource units and indexes. The AP may indicate one of the indexes by using the resource unit indication, so that the station can determine a combination of a plurality of resource units based on the index indicated by the resource unit indication.

In other words, different from the implementation 2.1, in the implementation 2.2, the resource unit indication indicates a combination of a plurality of resource units. Table 4 includes the correspondence shown in Table 3U and further includes meanings indicated by values 69 to 127 of the resource unit indication, namely, indicating a combination of a plurality of resource units.

TABLE 4

| Correspondence between a value of the resource unit indication and "resource units or a combination of a plurality of resource units" | | |
| --- | --- | --- |
| Resource unit indication | Indicated resource unit (or a combination of a plurality of resource units, a meaning, or a description) | Quantity (number of entries) |
| 0 to 36 | Respectively indicate 37 26-tone RUs in 80 MHz (possible 26-tone RU cases in 80 MHz) | 37 |
| 37 to 52 | Respectively indicate 16 52-tone RUs in 80 MHz (possible 52-tone RU cases in 80 MHz) | 16 |
| 53 to 60 | Respectively indicate eight 106-tone RUs in 80 MHz (possible 106-tone RU cases in 80 MHz) | 8 |
| 61 to 64 | Respectively indicate four 242-tone RUs in 80 MHz (possible 242-tone RU cases in 80 MHz) | 4 |
| 65 and 66 | Respectively indicate two 484-tone RUs in 80 MHz (possible 484-tone RU cases in 80 MHz) | 2 |
| 67 | Indicate one 996-tone RU in 80 MHz (996-tone RU case in 80 MHz) | 1 |
| 68 to 70 | Two 996-tone RUs (as shown in FIG. 37 to FIG. 39) | 3 |
| 71 | Four 996-tone RUs (as shown in FIG. 36) | 1 |

TABLE 4-continued

Correspondence between a value of the resource unit indication and "resource
units or a combination of a plurality of resource units"

| Resource unit indication | Indicated resource unit (or a combination of a plurality of resource units, a meaning, or a description) | Quantity (number of entries) |
|---|---|---|
| 72 to 75 | A combination of a 106-tone RU at a low frequency in 20 MHz in 80 MHz and a 26-tone RU in a center of the 20 MHz (as shown in FIG. 18) | 4 (Each entry represents a 20 MHz frequency band range, so that four values are required for separate indication) |
| 76 to 79 | A combination of a 106-tone RU at a high frequency in 20 MHz in 80 MHz and a 26-tone RU in a center of the 20 MHz (as shown in FIG. 19) | 4 (Each entry represents a 20 MHz frequency band range, so that four values are required for separate indication) |
| 80 to 83 | A combination of a 52-tone RU at a second lowest frequency in 20 MHz in 80 MHz and a 26-tone RU, in the 20 MHz, that is on a same side as and that is adjacent to the 52-tone RU (as shown in FIG. 12) | 4 (Each entry represents a 20 MHz frequency band range, so that four values are required for separate indication) |
| 84 to 87 | A combination of a 52-tone RU at a second lowest frequency in 20 MHz in 80 MHz and a 26-tone RU in a center of the 20 MHz (as shown in FIG. 16) | 4 (Each entry represents a 20 MHz frequency band range, so that four values are required for separate indication) |
| 88 to 91 | A combination of a 52-tone RU at a second highest frequency in 20 MHz in 80 MHz and a continuous 26-tone RU on a same side as the 20 MHz (as shown in FIG. 14) | 4 (Each entry represents a 20 MHz frequency band range, so that four values are required for separate indication) |
| 92 to 95 | A combination of a 52-tone RU at a second highest frequency in 20 MHz in 80 MHz and a 26-tone RU in a center of the 20 MHz (as shown in FIG. 17) | 4 (Each entry represents a 20 MHz frequency band range) |
| 96 and 97 | A combination of a 484-tone RU in 80 MHz and a 242-tone RU adjacent to the 484-tone RU (as shown in FIG. 20 and FIG. 21) | 2 (Two entries separately represent a low-frequency 484-tone RU and a high-frequency 484-tone RU) |
| 98 and 99 | A combination of a 484-tone RU in 80 MHz and a 242-tone RU that is not adjacent to the 484-tone RU (as shown in FIG. 22 and FIG. 23) | 2 (Two entries separately represent a low-frequency 484-tone RU and a high-frequency 484-tone RU) |
| 100 | A combination of two 242-tone RUs on two sides of 80 MHz (as shown in FIG. 24) | 1 |
| 101 and 102 | A combination of a currently indicated 996-tone RU and a 484-tone RU that is in 80 MHz adjacent to the 996-tone RU and that is not adjacent to the 996-tone RU (as shown in FIG. 25 and FIG. 26) | 2 (Two entries separately represent that the 484-tone RU is located in lower-frequency adjacent 80 MHz and that the 484-tone RU is located in higher-frequency adjacent 80 MHz) |
| 103 and 104 | A combination of a currently indicated 996-tone RU, a 484-tone RU that is in 80 MHz adjacent to the 996-tone RU and that is not adjacent to the 996-tone RU, and a 242-tone RU (as shown in FIG. 27 and FIG. 28) | 2 (Two entries separately represent that the 484-tone RU and the 242-tone RU are located in lower-frequency adjacent 80 MHz and that the 484-tone RU and the 242-tone RU are located in higher-frequency adjacent 80 |
| 105 and 106 | A combination of a currently indicated 996-tone RU and two 242-tone RUs that are in 80 MHz adjacent to the 996-tone RU (as shown in FIG. 29 and FIG. 30) | 2 (Two entries separately represent that the two 242-tone RUs are located in lower-frequency adjacent 80 MHz and that the two 242-tone RUs are located in higher-frequency adjacent 80 MHz) |
| 107 | A combination of two 996-tone RUs at a lowest frequency and one 996-tone RU at a highest frequency in 320 MHz (as shown in FIG. 32) | 1 |
| 108 | A combination of one 996-tone RU at a lowest frequency and two 996-tone RUs at a highest frequency in 320 MHz (as shown in FIG. 33) | 1 |
| 109 | A combination of three 996-tone RUs at a lowest frequency in 320 MHz (as shown in FIG. 34) | 1 |
| 110 | A combination of three 996-tone RUs at a highest frequency in 320 MHz (as shown in FIG. 35) | 1 |

TABLE 4-continued

Correspondence between a value of the resource unit indication and "resource
units or a combination of a plurality of resource units"

| Resource unit indication | Indicated resource unit (or a combination of a plurality of resource units, a meaning, or a description) | Quantity (number of entries) |
|---|---|---|
| 111 to 126 | A combination of a currently indicated 484-tone RU in 80 MHz, a 242-tone RU, a 484-tone RU that is in 80 MHz adjacent to the 242-tone RU, and a 242-tone RU (as shown in FIG. 31 and related descriptions) | 16 |
| 127 | Reserved | 1 |

In an optional implementation, the resource unit allocation subfield includes the resource unit indication, and the resource unit indication indicates the plurality of resource units. In Table 4, when a value or an index indicated by the resource unit indication is 71 or any number between 107 to 110, the station may not parse which 80 MHz is indicated by the frequency band range indication.

Correspondingly, that the station determines, based on the resource unit allocation subfield, the plurality of resource units indicated by each user information field includes: for each user information field, the station determines the plurality of resource units indicated by the resource unit indication as the plurality of resource units indicated by the user information field.

In another optional implementation, the resource unit allocation subfield includes the resource unit indication and the frequency band range indication. The frequency band range indication indicates 80 MHz, and the resource unit indication indicates the plurality of resource units. Correspondingly, that the station determines, based on the resource unit allocation subfield, the plurality of resource units indicated by the user information field includes: the station determines a frequency band range indicated by the frequency band range indication; determines two resource units in the frequency band range, and two resource units in a lower-frequency band range adjacent to the frequency band range or in a higher-frequency band range adjacent to the frequency band range based on the resource unit indication; and uses the four determined resource units as the plurality of resource units indicated by the user information field.

For example, in Table 4, when the value or the index indicated by the resource unit indication is any number between 111 to 126, after determining the frequency band range indicated by the frequency band range indication, the station further needs to determine another lower-frequency band range 80 MHz adjacent to the frequency band range or another higher-frequency band range 80 MHz adjacent to the frequency band range, and determine the combination of the plurality of resource units based on the index indicated by the resource unit indication.

In still another optional implementation, in step 104, that the station determines, based on the resource unit allocation subfield, the plurality of resource units indicated by each user information field includes: for each user information field, the station determines a frequency band range indicated by the frequency band range indication; determines that the plurality of resource units indicated by the resource unit indication are resource units corresponding to the frequency band range and one or more resource units in a frequency band range adjacent to the resource units corresponding to the frequency band range. For example, in Table 4, when the value or the index indicated by the resource unit indication is any number between 68 to 70 or 101 to 106, the station may determine, in the implementation, the plurality of resource units indicated by the user information field.

In still another optional implementation, in step 104, that the station determines, based on the resource unit allocation subfield, the plurality of resource units indicated by each user information field includes: the station determines a frequency band range indicated by the frequency band range indication; and determines the plurality of resource units indicated by the resource unit indication from the frequency band range. For example, in Table 4, when the value or the index indicated by the resource unit indication is any number between 72 to 100, the station may determine, in the implementation, the plurality of resource units indicated by the user information fields.

It can be seen that in 2.2.1, the resource units are allocated to the station by using the frequency band range indication, the resource unit indication, and related content in Table 4, and no new bit needs to be added. This helps reduce resource overheads.

2.2.2. The User Information Field Includes a Frequency Band Range Indication, a Resource Unit Indication, and a Resource Unit Combination Indication.

In the implementation, the user information field may also indicate the plurality of resource units by using the three indications. The frequency band range indication indicates an 80 MHz frequency band range. An optional value or index is shown in Table 2, and details are not described herein again. The resource unit indication indicates one resource unit in the frequency band range. An optional value or index is shown in Table 3, and details are not described herein again. The resource unit combination indication indicates a combination of a plurality of resource units and the combination of the plurality of resource units includes the resource unit indicated by the resource unit indication. The combination of the plurality of resource units is used as the plurality of resource units indicated by the user information fields. The resource unit combination (RU combination) indication may also be referred to as a resource unit combination domain, a resource unit combination field, a combination domain, a combination field, or the like.

The resource unit combination indication may occupy one bit, two bits, three bits, or the like. Optionally, a quantity of bits occupied by the resource unit combination indication is related to a quantity of resource unit combination solutions. The combination solution of the resource units is a combination solution of the resource units indicated by the resource unit indication. In addition, locations of bits occupied by the resource unit combination indication are not limited, and may be continuous or discontinuous.

Figure 40:
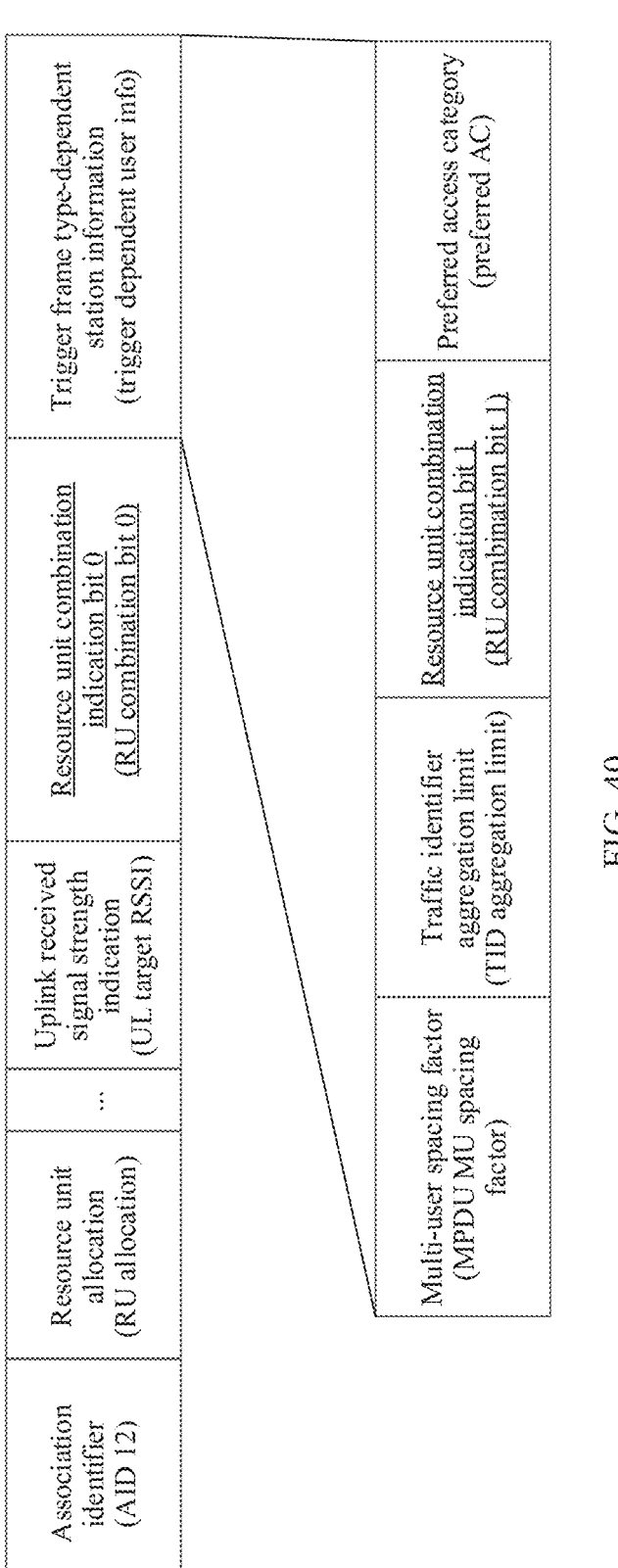
FIG. 40 is a schematic diagram of a structure of a user information field according to an embodiment of this application.

The bits occupied by the resource unit combination indication may be newly added to the user information field, use a reserved field, reuse another information field, or the like. For example, FIG. 40 is a schematic diagram of a structure of a user information field according to an embodiment of this application. As shown in FIG. 40, a trigger frame type-dependent station information field includes a multi-user spacing factor (MPDU MU Spacing Factor), a traffic identifier aggregation limit (TID Aggregation Limit), a resource unit combination indication bit 1 (RU Combination Bit 1), and a preferred access category (Preferred AC). The resource unit combination indication occupies two bits. A resource unit combination indication bit 0 may be a reserved bit in the user information field shown in FIG. 2, and the resource unit combination indication bit 1 may be one bit in the trigger frame type-dependent station information field in the user information field shown in FIG. 40.

In the structure shown in FIG. 40, the resource unit allocation subfield (namely, the frequency band range indication and the resource unit indication) and the resource unit combination indication are two independent fields. In another implementation, the resource unit allocation subfield and the resource unit combination indication may be combined into one field. In other words, a plurality of functions of the frequency band range indication, the resource unit indication, and the resource unit combination indication are implemented by using one field. The one field may be implemented by extending an original resource unit allocation subfield, or by using a reserved bit.

Correspondingly, that the station determines the plurality of resource units indicated by the user information fields includes: the station determines, based on the resource unit combination indication and the resource unit indicated by the resource unit indication, the combination of the plurality of resource units as the plurality of resource units indicated by the user information fields.

The following is described by using an example in which the resource unit combination indication occupies two bits and a combination solution of a 106-tone RU and a 26-tone RU is shown in FIG. 18 and FIG. 19. The resource unit indication may indicate a 106-tone RU by using Table 2 and Table 3. A correspondence between a value or an index of the resource unit combination indication and each description or meaning is shown in Table 5.

For example, when the frequency band range indication is 00 and the resource unit indication is 53, it can be learned from Table 2 and Table 3 that a resource unit indicated by the resource unit indication is a first 106-tone RU in a third row in FIG. 5. As shown in FIG. 18, when the resource unit combination indication is 01, the user information field indicates a plurality of RUs, and the plurality of RUs are the first 106-tone RU in the third row in FIG. 5 and a fifth 26-tone RU in a first row in FIG. 3.

For another example, when the frequency band range indication is 00 and the resource unit indication is 54, it can be learned from Table 2 and Table 3 that a resource unit indicated by the resource unit indication is a second 106-tone RU in a third row in FIG. 5. As shown in FIG. 19, when the resource unit combination indication is 01, the user information field indicates a plurality of RUs, and the plurality of RUs are the second 106-tone RU in the third row in FIG. 5 and a fifth 26-tone RU in a first row in FIG. 3.

TABLE 5

| Resource unit combination indication | | |
| Bit 0 (higher bit) | Bit 1 (lower bit) | Meaning |
| --- | --- | --- |
| 0 | 0 | Single RU (or the user information field indicates one RU) |
| 0 | 1 | A combination of the 106-tone RU and the 26-tone RU (the 26-tone RU is a 26-tone RU that is in a center of 20 MHz in which the 106-tone RU is located) |
| 1 | 0 | Reserved |
| 1 | 1 | Reserved |

The following is described by using an example in which the resource unit combination indication occupies two bits and a combination solution of a 52-tone RU and a 26-tone RU is shown in FIG. 12 to FIG. 17. The resource unit indication may indicate a 52-tone RU by using Table 2 and Table 3. A correspondence between a value or an index of the resource unit combination indication and each description or meaning is shown in Table 6. For "being on the same side as and adjacent to", refer to descriptions in FIG. 12 to FIG. 17. Details are not described herein again.

For example, the resource unit indication may indicate a second 52-tone RU in a second row in FIG. 5 by using Table 2 and Table 3. In other words, as shown in FIG. 16, when the frequency band range indication is 00 and the resource unit indication is 38, if the resource unit combination indication is 01, the user information field indicates a plurality of RUs, and the plurality of RUs are the second 52-tone RU in the second row in FIG. 5 and a fifth 26-tone RU in the first row in FIG. 3. As shown in FIG. 12, if the resource unit combination indication is 10, the user information field indicates a plurality of RUs, and the plurality of RUs are the second 52-tone RU in the second row in FIG. 5 and a second 26-tone RU in the first row in FIG. 5.

A similar indication manner may be used for another combination solution of a 52-tone RU and a 26-tone RU, so that the station can determine, according to the three indications, the plurality of resource units indicated by the user information field.

TABLE 6

| Resource unit indication | | |
| Bit 0 (higher bit) | Bit 1 (lower bit) | Meaning |
| --- | --- | --- |
| 0 | 0 | A single RU (no RU is combined with the 52-tone RU or the user information field indicates one RU) |
| 0 | 1 | A combination of the 52-tone RU and the 26-tone RU (the 26-tone RU is a 26-tone RU that is in a center of 20 MHz in which the 52-tone RU is located) |
| 1 | 0 | A combination of the 52-tone RU and the 26-tone RU (the 26-tone RU is a 26-tone RU, in 20 MHz in which the 52-tone RU is located, that is on a same side as and that is adjacent to the 52-tone RU) |
| 1 | 1 | Reserved |

The following is described by using an example in which the resource unit combination indication occupies two bits and a combination solution of a 484-tone RU and a 242-tone RU is shown in FIG. 20 to FIG. 23. The resource unit indication may indicate a 484-tone RU by using Table 2 and Table 3. A correspondence between a value or an index of the resource unit combination indication and each description or meaning is shown in Table 7.

For example, the resource unit indication may indicate a first 484-tone RU in a fifth row in FIG. 5 by using Table 2 and Table 3. In other words, as shown in FIG. 20, when the frequency band range indication is 00) and the resource unit indication is 65, if the resource unit combination indication is 01, the user information field indicates a plurality of RUs, and the plurality of RUs are the first 484-tone RU in the fifth row in FIG. 5 and a third 242-tone RU in the fourth row in FIG. 3. As shown in FIG. 22, if the resource unit combination indication is 10, the user information field indicates a plurality of RUs, and the plurality of RUs are the first 484-tone RU in the fifth row in FIG. 5 and a fourth 26-tone RU in the fourth row in FIG. 5.

A similar indication manner may be used for another combination solution of a 484-tone RU and a 242-tone RU, so that the station can determine, according to the three indications, the plurality of resource units indicated by the user information field. Details are not described herein again.

TABLE 7

RU combination domain

| Bit 1 | Bit 0 | Meaning |
|---|---|---|
| 0 | 0 | Single RU |
| 0 | 1 | A combination of a 484-tone RU and a 242-tone RU adjacent to the 484-tone RU |
| 1 | 0 | A combination of a 484-tone RU and a 242-tone RU that is not adjacent to the 484-tone RU |
| 1 | 1 | Reserved |

The following is described by using an example in which the resource unit combination indication occupies two bits and a combination solution of a 242-tone RU and a 242-tone RU is shown in FIG. 24. A correspondence between a value or an index of the resource unit combination indication and each description or meaning is shown in Table 8.

For example, the resource unit indication may indicate a first 242-tone RU in a fourth row in FIG. 5 by using Table 2 and Table 3. In other words, as shown in FIG. 24, when the frequency band range indication is 00 and the resource unit indication is 61, if the resource unit combination indication is 01, the user information field indicates a plurality of RUs, and the plurality of RUs are the first 242-tone RU in the fourth row in FIG. 5 and a last 242-tone RU in the fourth row in FIG. 5. If the resource unit combination indication is 00, the user information field indicates one RU: the first 242-tone RU in the fourth row in FIG. 5.

TABLE 8

RU combination domain

| Bit 1 | Bit 0 | Meaning |
|---|---|---|
| 0 | 0 | Single RU |
| 0 | 1 | A combination of two 242-tone RUs on an outermost side of 80 MHz |
| 1 | 0 | Reserved |
| 1 | 1 | Reserved |

The following is described by using an example in which the resource unit combination indication occupies two bits and a combination solution of a 996-tone RU and a 484-tone RU is shown in FIG. 25 and FIG. 26. A correspondence between a value or an index of the resource unit combination indication and each description or meaning is shown in Table 9.

For example, as shown in FIG. 25, when the frequency band range indication is 00 and the resource unit indication is 67, if the resource unit combination indication is 01, the user information field indicates a plurality of RUs and the plurality of RUs are a first 996-tone RU in a third row in FIG. 25 and a last 484-tone RU in a second row in FIG. 25. If the resource unit combination indication is 10, the plurality of RUs indicated by the user information field are a combination of RUs shown in FIG. 28. If the resource unit combination indication is 11, the plurality of RUs indicated by the user information field are a combination of RUs shown in FIG. 29.

TABLE 9

RU combination domain

| Bit 1 | Bit 0 | Meaning |
|---|---|---|
| 0 | 0 | Single RU |
| 0 | 1 | A combination of a 996-tone RU and a 484-tone RU that is not adjacent to the 996-tone RU |
| 1 | 0 | A combination of a 996-tone RU and a 484-tone RU and a 242-tone RU that are not adjacent to the 996-tone RU |
| 1 | 1 | A combination of a 996-tone RU and two 242-tone RUs that are adjacent to the 996-tone RU and that are on an outermost side of 80 MHz |

The following is described by using an example in which the resource unit combination indication occupies two bits and a combination solution is shown in FIG. 25 to FIG. 30. A correspondence between a value or an index of the resource unit combination indication and each description or meaning is shown in Table 10. The currently indicated 996-tone RU is a 996-tone RU determined based on the frequency band range indication and the resource unit indication. Optionally, in Table 10, it may be required that in a combination of a plurality of RUs in a frequency band range greater than 80 MHz, the resource unit indication may indicate a 996-tone RU at a lowest frequency, for example, a 996-tone RU corresponding to primary 80 MHz. Optionally, the resource unit indication in Table 10 may also indicate any 80 MHz in the bandwidth.

For example, when the frequency band range indication is 01 and the resource unit indication is 67, if the resource unit combination indication is 000, the plurality of RUs indicated by the user information field are a combination of RUs shown in FIG. 26.

For another example, when the frequency band range indication is 00 and the resource unit indication is 67, if the resource unit combination indication is 001, the plurality of RUs indicated by the user information field are a combination of RUs shown in FIG. 25.

For another example, when the frequency band range indication is 01 and the resource unit indication is 67, if the resource unit combination indication is 010, the plurality of RUs indicated by the user information field are a combination of RUs shown in FIG. 28.

For another example, when the frequency band range indication is 00 and the resource unit indication is 67, if the resource unit combination indication is 011, the plurality of RUs indicated by the user information field are a combination of RUs shown in FIG. 27.

For another example, when the frequency band range indication is 00 and the resource unit indication is 67, if the resource unit combination indication is 100, the plurality of RUs indicated by the user information field are a combination of RUs shown in FIG. 34.

For another example, when the frequency band range indication is 11 and the resource unit indication is 67, if the resource unit combination indication is 101, the plurality of RUs indicated by the user information field are a combination of RUs shown in FIG. 32.

For another example, when the frequency band range indication is 00 and the resource unit indication is 67, if the resource unit combination indication is 110, the plurality of RUs indicated by the user information field are a combination of RUs shown in FIG. 33.

TABLE 10

| Resource unit combination indication | Meaning |
|---|---|
| 0 means 000 | A combination of a currently indicated 996-tone RU and a 484-tone RU that is in a lower-frequency 80 MHz adjacent to the 996-tone RU and that is not adjacent to the 996-tone RU |
| 1 means 001 | A combination of a currently indicated 996-tone RU and a 484-tone RU that is in a higher-frequency 80 MHz adjacent to the 996-tone RU and that is not adjacent to the 996-tone RU |
| 2 means 010 | A combination of a currently indicated 996-tone RU and a 484-tone RU and a 242-tone RU that are in a lower-frequency 80 MHz adjacent to the 996-tone RU |
| 3 means 011 | A combination of a currently indicated 996-tone RU and a 484-tone RU and a 242-tone RU that are in a higher-frequency 80 MHz adjacent to the 996-tone RU |
| 4 means 100 | A combination of a currently indicated 996-tone RU, a 996-tone RU, and a 996-tone RU |
| 5 means 101 | A combination of a currently indicated 996-tone RU, a 996-tone RU, a 996-tone RU that is not allocated to the station, and a 996-tone RU |
| 6 means 110 | A combination of a currently indicated 996-tone RU, a 996-tone RU that is not allocated to the station, a 996-tone RU, and a 996-tone RU |
| 7 means 111 | Reserved |

Optionally, the resource unit combination indication may also indicate a combination of 996-tone RUs other than the 996-tone RU indicated by the resource unit indication.

Optionally, the resource unit combination indication may occupy one bit. In the resource unit combination indication shown in Table 6, one bit may separately indicate that no RU is combined with the RU indicated by the resource unit indication, and that a 26-tone RU is combined with the RU indicated by the resource unit indication. For details, refer to Table 11.

TABLE 11

| Resource unit combination indication | Meaning |
|---|---|
| 0 | Single RU |
| 1 | A combination of a 106-tone RU and a 26-tone RU |

Optionally, one bit occupied by the resource unit combination indication may indicate whether a 52-tone RU is combined with a 26-tone RU in a center of 20 MHz in which the 52-tone RU is located, as shown in Table 12. It can be seen that, compared with the combination solution shown in Table 6, the combination solution shown in Table 12 can reduce required bit overheads.

TABLE 12

| Resource unit combination indication | Meaning |
|---|---|
| 0 | Single RU |
| 1 | A combination of a 52-tone RU and a 26-tone RU located in a center |

Optionally, one bit occupied by the resource unit combination indication may indicate whether a 52-tone RU is combined with a 26-tone RU that is on a same side as and that is adjacent to the 52-tone RU, as shown in Table 13. It can be seen that, compared with the combination solution shown in Table 6, the combination solution shown in Table 13 can reduce required bit overheads.

TABLE 13

| Resource unit combination indication | Meaning |
|---|---|
| 0 | Single RU |
| 1 | A combination of a 52-tone RU and a 26-tone RU that is on a same side as and that is adjacent to the 52-tone RU |

Similarly, one bit occupied by the resource unit combination indication may indicate whether a 484-tone RU in Table 7 is combined with a 242 tone-RU adjacent to the 484-tone RU, or whether a 484-tone RU in Table 7 is combined with a 242 tone-RU that is not adjacent to the 484-tone RU. In Table 8, one bit may also indicate a combination of a 242-tone RU and a 242-tone RU. For example, when a value of the resource unit combination indication is 0, it indicates a single 242-tone RU. When a value of the resource unit combination indication is 1, it indicates two 242-tone RUs.

It can be seen that in the implementation, for a case in which a plurality of resource units are allocated to one station, the trigger frame does not need two user information fields for indication, and only one user information field is required for indication. In other words, a user information field corresponding to one resource unit that needs to be allocated to the station or one user information field corresponding to the station may indicate a combination and allocation of a plurality of RUs.

It can be seen that a quantity of bits occupied by the resource unit combination indication may be determined based on an RU combination solution and selection flexibility. In the implementation, regardless of a size of a bandwidth, one user information field may indicate a combination of a plurality of resource units. Alternatively, for a large bandwidth, two user information fields may indicate a combination solution of RUs in 80 MHz corresponding to each user information field. The first part describes how to select a plurality of user information (user info) fields in the user information list (user info list) field that are the same as the association identifier of the station, or optional implementations. For a plurality of user information fields, each user information field may indicate one resource unit in the foregoing implementation 2.1, or may indicate a combination of a plurality of resource units in the foregoing implementation 2.2.1 or implementation 2.2.2. Therefore, a plurality of resource units may be allocated to the station in the first part.

2. The Trigger Frame Includes One User Information Field that is the Same as the Association Identifier of the Station.

In the implementation, one user information field may be used to configure a plurality of resource units for the station. The user information field may be the user information field in the foregoing implementation 2.2.1 or 2.2.2, to indicate a plurality of resource units.

The user information field may include a frequency band range indication and a resource unit indication. Alternatively, the user information field may include a frequency band range indication, a resource unit indication, and a resource unit combination indication.

FIG. 41 is a schematic flowchart of a resource allocation method according to an embodiment of this application. As shown in FIG. 41, the resource allocation method includes the following steps.

201: An access point determines a plurality of resource units allocated to a station.

202: The access point sends a trigger frame, where the trigger frame includes one user information field that is the same as an association identifier of the station, and the user information field indicates the plurality of resource units allocated to the station.

203: The station receives the trigger frame, and determines the plurality of allocated resource units based on the trigger frame.

That the station determines the plurality of allocated resource units based on the trigger frame includes: the station selects, from a user information list field, one user information field that is the same as the association identifier of the station, where the association identifier of the station is the same as an association identifier indicated by an association identifier field; and determines the plurality of resources units indicated by the user information field, where the plurality of resources units indicated by the user information field are the plurality of resource units allocated to the station.

A manner in which the station selects, from the user information list field, one user information field that is the same as the association identifier of the station may be the optional implementations from the foregoing implementation 1.1 to 1.4, but is not limited to the foregoing implementations.

For a manner in which the station determines a plurality of resource units indicated by a resource unit allocation subfield, refer to related descriptions in the foregoing implementations 2.2.1 and 2.2.2. Details are not described herein again.

In embodiments of this application, regardless of a range of a bandwidth of a combination of RUs, if a range of a combination of RUs indicated by one user information field is not limited, one user information field may indicate a combination solution of RUs.

For example, the user information field in the foregoing implementation 2.2.1 may indicate a combination of a plurality of RUs in 80 MHz, for example, an RU combination solution that may be indicated when a value of the resource unit indication in Table 4 is any number between 72 to 100. Alternatively, the user information field in the foregoing implementation 2.2.2 may indicate a combination of a 106-tone RU and a 26-tone RU shown in Table 5, a combination of a 52-tone RU and a 26-tone RU shown in Table 6, a combination of a 484-tone RU and a 242-tone RU shown in Table 7, a combination of a 242-tone RU and a 242-tone RU shown in Table 8, or the like.

The user information field in the foregoing implementation 2.2.1 may indicate a combination of RUs in a frequency band range greater than 80 MHz but less than or equal to 160 MHz. When a value of the resource unit indication is any number between 101 to 106 in Table 4, a combination solution of RUs in the range may be indicated. Alternatively, the user information field in the foregoing implementation 2.2.2 may indicate a combination of RUs in a frequency band range greater than 80 MHz but less than or equal to 160 MHz. As shown in Table 9, a frequency band range indication and a resource unit indication in one user information field may indicate one 996-tone RU, and a resource unit combination indication may indicate a possible combination solution of the 996-tone RU.

The user information field in the foregoing implementation 2.2.1 may indicate a combination of RUs in a frequency band range greater than 160 MHz but less than or equal to 320 MHz. When a value of the resource unit indication is any number between 107 to 110 in Table 4, a combination solution of RUs in the range may be indicated.

Alternatively, the user information field in the foregoing implementation 2.2.2 may indicate a combination of RUs in a frequency band range greater than 80 MHz. In the solution shown in Table 10, the resource unit combination indication may occupy three bits, and the three-bit resource unit combination indication includes one bit that is newly added to the user information field. For example, when a frequency of an RU is greater than 80 MHz, an uplink dual-carrier modulation field may be reused as the resource unit combination indication.

It can be seen that, in the implementation 2.2.2, when a frequency of an RU is less than or equal to 80 MHz, the resource unit combination indication may use two bits or one bit for indication, as shown in Table 5 to Table 8, and Table 11 to Table 13. The resource unit combination indication may use two bits to indicate a combination of RUs in a frequency band range greater than 80 MHz but less than or equal to 160 MHz. As shown in Table 9, the resource unit combination indication is in a user information field corresponding to a 996-tone RU that needs to be allocated to the station. As shown in Table 10, the resource unit combination indication may use three bits to indicate a combination of RUs in a frequency band range greater than 80 MHz.

Optionally, in Table 10, it may be required that in a combination of a plurality of RUs in a frequency band range greater than 80 MHz, the resource unit indication may indicate a 996-tone RU at a lowest frequency.

It can be seen that, in the resource allocation method shown in FIG. 41, the plurality of resource units are allocated to the station by using one user information field, to reduce overheads of the user information field.

In addition, in this specification, the resource allocation methods described in the foregoing two parts may be applied to a same network structure. For example, a combination of a plurality of RUs may be configured for some stations, and one RU may be configured for other stations based on a data volume that needs to be transmitted by each station, a priority of data, or the like. This is not limited in embodiments of this application. The resource allocation methods described in the foregoing two parts may be applied to a same station. For example, a combination of a plurality of RUs or one RU may be configured for the station based on data volumes that need to be transmitted by the station at different moments, different priorities of data, or the like. This is not limited in embodiments of this application.

In conclusion, this application provides a resource allocation method. The access point sends the trigger frame to the station. The trigger frame includes the plurality of user information fields that are the same as the association identifier of the station, and each user information field indicates one resource unit allocated to the station, to allocate a plurality of resource units to the station, as shown in related content in the foregoing implementation 2.1.

In another resource allocation method, the trigger frame includes one user information field that is the same as the association identifier of the station, and the user information field indicates a plurality of resource units allocated to the station, to allocate a plurality of resource units to the station, so as to reduce usage of a user information field. The user information field may be the user information field in the foregoing implementation 2.2.1, and may indicate the plurality of resource units by using Table 2, Table 3, the resource unit indication, and the frequency band range indication. The user information field may be redesigned. As described in the implementation 2.2.2, the resource unit combination indication is added to the user information field. To be specific, the resource unit allocation subfield in the trigger frame is redesigned, and the resource unit combination indication is set by reusing another information field or a reserved field, or newly adding a bit, to indicate a combination of a plurality of resource units as the resource units indicated by the user information field.

In still another resource allocation method, the trigger frame includes the plurality of user information fields that are the same as the association identifier of the station, and each user information field indicates the plurality of resource units allocated to the station, as shown in the implementation 2.2.1 and 2.2.2. It can be seen that, in the method, more resource units can be allocated to the station when a range of a bandwidth of a combination of RUs indicated by one user information field is limited.

3. Resource Unit Allocation Method in Downlink Transmission

This application further provides a resource unit allocation method, and the resource unit allocation method is used to allocate, to a station, a resource unit occupied by downlink transmission. An access point may send a PPDU preamble message to the station. As shown in FIG. 42, the PPDU preamble message includes a user information field and a common field. The common field is used to indicate RU allocation information, and the user information field includes a series of user fields. It should be noted that the user information field is a field in the PPDU preamble message in downlink transmission, and is different from the user information field in uplink transmission in the foregoing embodiments.

Each user field indicates one RU or a combination of a plurality of RUs, and is allocated to a corresponding station.

As shown in Table 14, the user field may include fields such as a user identifier, spatial stream configuration, a modulation and coding scheme, and a coding domain. In addition, other fields other than the user identifier may also be moved to a last field of a combined user domain. The user field further includes a newly added continuous field and an "RU number or RU allocation bitmap" field. The continuous field may include two bits. A value 0 of the continuous field indicates that a single RU is allocated to the station. In this case, the "RU number or RU allocation bitmap" field does not exist. A value 1 of the continuous field indicates that a plurality of continuous RUs are allocated to the station. In this case, a value of the "RU number or RU allocation bitmap" field indicates a quantity of RUs allocated to the station. A value 2 of the continuous field indicates that a plurality of discontinuous RUs are allocated to the station. In this case, a value of the "RU number or RU allocation bitmap" field indicates an allocation result of future X (for example, X is equal to 9) RUs. If one of the future X RUs is allocated to the station, a corresponding bit is set to 1; otherwise, a corresponding bit is set to 0. If a value of the allocation bitmap field is 0, it indicates that none of the future X RUs is allocated to the STA, and a user field corresponding to a future $(X+1)^{th}$ RU may be directly jumped to for reading.

TABLE 14

| Subdomain in a user field | Quantity of bits | Description |
| --- | --- | --- |
| User identifier (STA-ID) | 11 | Lower 11 bits of a user AID, which are the same as those in 802.11ax |
| Spatial stream configuration (Spatial Configuration) | 4 or 5 or 6 | Indicate spatial stream configuration, which is the same as that in 802.11ax, and a quantity of bits may be different |
| Modulation and coding scheme (MCS) | 4 | Indicate a modulation and coding sequence number, which is the same as that in 802.11ax |
| Coding | 1 | Indicate a coding manner, which is the same as that in 802.11ax |
| Continuous field (Continuous) | 2 | 0: single RU; 1: a plurality of continuous RUs; 2: a plurality of discontinuous RUs; and 3: reserved |
| An RU number or RU allocation bitmap field | X | When a single RU is allocated to a station, the field may not exist; when a plurality of continuous RUs are allocated to the station, the field indicates a quantity of RUs; and when a plurality of discontinuous RUs are allocated to the station, the field indicates whether future X RUs are allocated to a bitmap of the STA |

For example, it is assumed that X is equal to 9, the value 2 of the continuous field indicates that a plurality of discontinuous RUs are allocated to the station, and a user identifier in a first user field in the user information field is the same as a user identifier of the station. If a value of the RU allocation bitmap field is 010000000, it indicates that an RU corresponding to a third user field in the user information field is allocated to the station. If the value of the RU allocation bitmap field is 000000000, it indicates that none of RUs corresponding to a second user field to a tenth user field in the user information field is allocated to the station. The station needs to jump to an eleventh user field to read whether a user identifier in the eleventh user field is the same as the identifier of the station. If the user identifier in the eleventh user field is the same as the identifier of the station, the station may read the value of the RU allocation bitmap field from the eleventh user field, to determine whether RUs corresponding to a twelfth user field to a twenty user field are RUs allocated to the station. Similar operations are performed until the user information field is parsed completely.

It can be seen that, in the resource allocation method, the access point can allocate a plurality of resource units to a user in multi-user transmission.

The foregoing embodiments of this application describe the method provided in the embodiments of this application from perspectives of the access point and the station. To implement functions in the method provided in embodiments of this application, the access point and the station may include a hardware structure and a software module, and implement the functions in a form of the hardware structure, the software module, or a combination of the hardware structure and the software module. A function in the foregoing functions may be performed in a form of the hardware structure, the software module, or a combination of the hardware structure and the software module.

Figure 43:
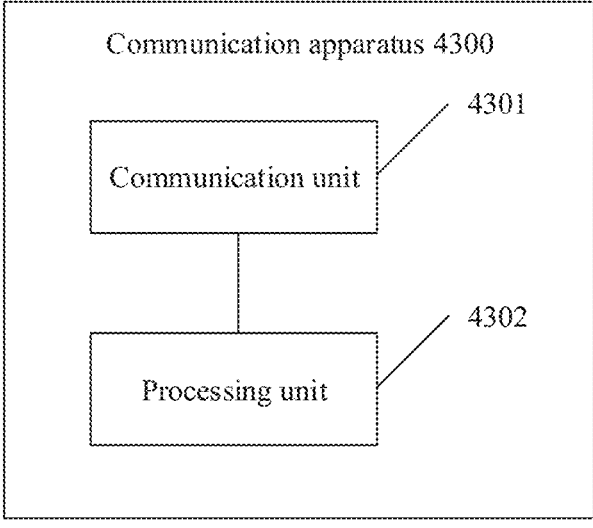
FIG. 43 is a schematic diagram of a structure of a communication apparatus according to an embodiment of this application.

FIG. 43 is a schematic diagram of a structure of a communication apparatus according to an embodiment of this application. As shown in FIG. 43, a communication apparatus 4300 includes a communication unit 4301 and a processing unit 4302. The communication unit 4301 may include a sending unit and a receiving unit. The sending unit is configured to implement a sending function, the receiving unit is configured to implement a receiving function, and the communication unit 4301 may implement a sending function and/or a receiving function. The communication unit may also be described as a transceiver unit.

The communication apparatus 4300 may be a station, or may be an apparatus in a station, or may be an apparatus that can be used together with an access point.

In an implementation, the communication apparatus 4300 includes a communication unit 4301 and a processing unit 4302.

The communication unit 4301 is configured to receive a trigger frame from an access point.

The trigger frame includes a plurality of user information fields that are the same as an association identifier of the communication apparatus, and each user information field indicates one or more resource units allocated to the communication apparatus; or the trigger frame includes one user information field that is the same as an association identifier of the communication apparatus, and the one user information field indicates a plurality of resource units allocated to the communication apparatus.

The processing unit 4302 is configured to determine the plurality of allocated resource units based on the trigger frame.

For related content of this implementation, refer to related content of the foregoing method embodiments. Details are not described herein again.

The communication apparatus 4300 may be an access point, or may be an apparatus in an access point, or may be an apparatus that can be used together with a station.

In an implementation, the communication apparatus 4300 includes:

a processing unit 4302, configured to determine a plurality of resource units allocated to a station; and a communication unit 4301, configured to send a trigger frame to the station, where the trigger frame includes a plurality of user information fields that are the same as an association identifier of the station, and each user information field indicates one or more resource units allocated to the station; or the trigger frame includes one user information field that is the same as an association identifier of the station, and the one user information field indicates the plurality of resource units allocated to the station.

For related content of this implementation, refer to related content of the foregoing method embodiments. Details are not described herein again.

It can be seen that, in embodiments of this application, the access point can use the trigger frame to allocate the plurality of resource units to the station.

Figure 44:
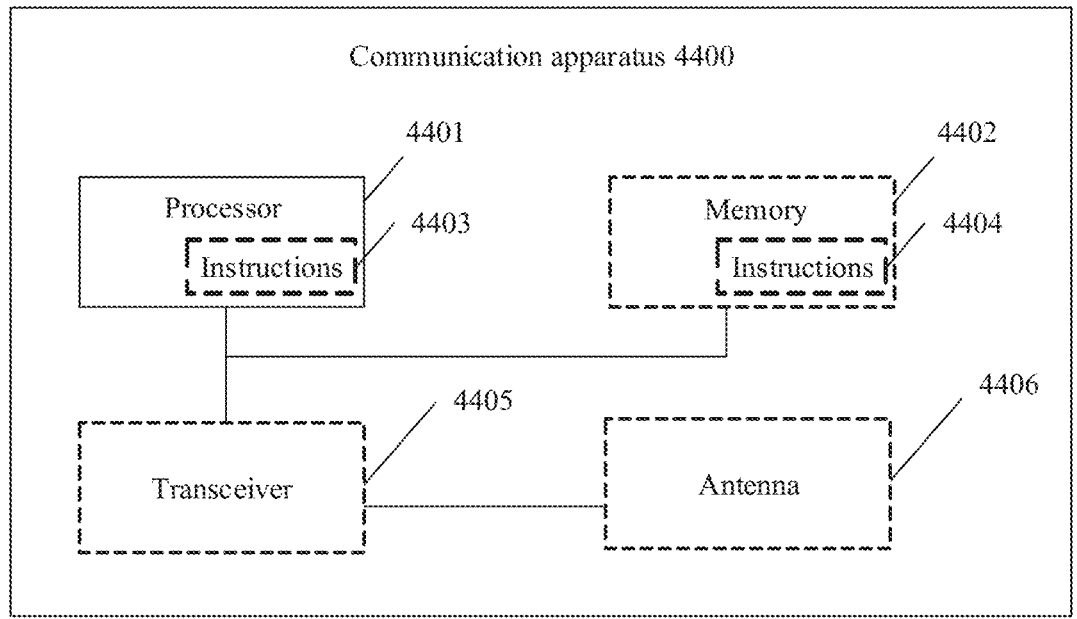
FIG. 44 is a schematic diagram of a structure of another communication apparatus according to an embodiment of this application.

FIG. 44 is a schematic diagram of a structure of another communication apparatus according to an embodiment of this application. A communication apparatus 4400 may be an access point, or may be a station, or may be a chip, a chip system, a processor, or the like that supports an access point in implementing the foregoing method, or may be a chip, a chip system, a processor, or the like that supports a station in implementing the foregoing method. The apparatus may be configured to implement the method described in the foregoing method embodiment. For details, refer to the descriptions in the foregoing method embodiment.

The communication apparatus 4400 includes one or more processors 4401. The processor 4401 may be a general-purpose processor, a dedicated processor, or the like. The processor 4401 may be configured to control the communication apparatus (for example, an access point, an access point chip, a station, or a station chip), execute a software program, and process data in the software program.

Optionally, the communication apparatus 4400 may include one or more memories 4402 storing instructions 4404. The instructions may be run by the processor 4401, to enable the communication apparatus 4400 to perform the method described in the foregoing method embodiments. Optionally, the memory 4402 may further store data. The processor 4401 and the memory 4402 may be separately disposed, or may be integrated together.

Optionally, the communication apparatus 4400 may further include a transceiver 4405 and an antenna 4406. The transceiver 4405 may be referred to as a transceiver unit, a transceiver machine, a transceiver circuit, or the like, and is configured to implement a transceiver function. The transceiver 4405 may include a receiver and a transmitter. The receiver may be referred to as a receiver, a receive circuit, or the like, and is configured to implement a receiving function. The transmitter may be referred to as a transmitter, a transmit circuit, or the like, and is configured to implement a sending function.

The communication apparatus 4400 is an access point. The processor 4401 is configured to perform step 101 in FIG. 8 or perform step 101 in FIG. 41. The transceiver 4405 is configured to perform step 102 in FIG. 8 or step 202 in FIG. 41.

The communication apparatus 4400 is a station. The processor 4401 is configured to perform an operation of determining a plurality of allocated resource units in step 103 in FIG. 8, or perform an operation of determining a plurality of allocated resource units in step 203 in FIG. 41. The transceiver 4405 is configured to perform an operation of receiving a trigger frame in step 103 in FIG. 8, or perform an operation of receiving a trigger frame in step 203 in FIG. 41.

In another possible design, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code or data. Alternatively, the transceiver circuit, the interface, or the interface circuit may be configured to transmit or transfer a signal.

In still another possible design, optionally, the processor 4401 may store instructions 4403. The instructions 4403 may be run by the processor 4401, to enable the communication apparatus 4400 to perform the method described in the foregoing method embodiments. The instructions 4403 may be fixed in the processor 4401. In this case, the processor 4401 may be implemented by hardware.

In still another possible design, the communication apparatus 4400 may include a circuit. The circuit may implement a sending function, a receiving function, or a communication function in the foregoing method embodiments.

The processor and the transceiver that are described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like.

The communication apparatus described in the foregoing embodiments may be an access point or a station. However, a scope of the communication apparatus described in this application is not limited thereto, and a structure of the communication apparatus may not be limited by FIG. 44. The communication apparatus may be an independent device or may be a part of a relatively large device. For example, the communication apparatus may be:

(1) an independent integrated circuit IC, a chip, or a chip system or subsystem;

(2) a set including one or more ICs, where optionally, the IC set may further include a storage component configured to store data and instructions;

(3) an ASIC, for example, a modem;

(4) a module that can be embedded in another device:

(5) a receiver, an intelligent terminal, a wireless device, a handheld device, a mobile unit, a vehicle-mounted device, a cloud device, an artificial intelligence device, and the like; or (6) another device, or the like.

Figure 45:
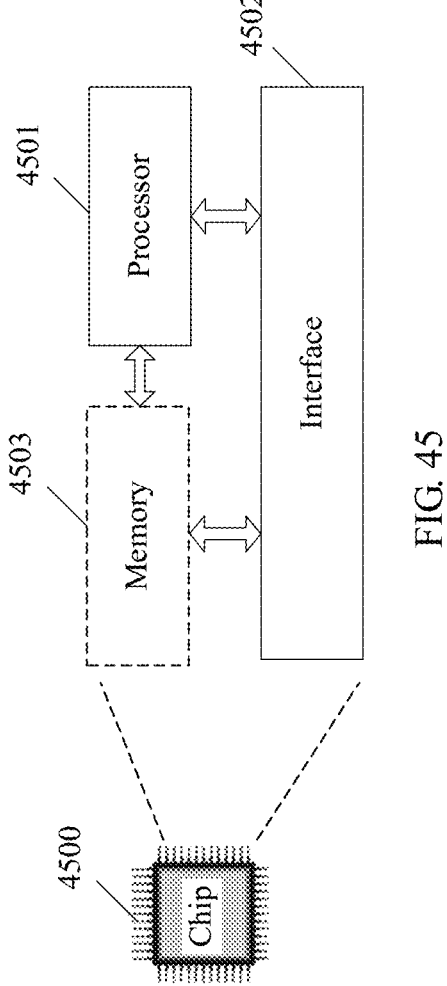
FIG. 45 is a schematic diagram of a structure of a chip according to an embodiment of this application.

For a case in which the communication apparatus may be a chip or a chip system, refer to a schematic diagram of a structure of a chip shown in FIG. 45. As shown in FIG. 45, a chip 4500 includes a processor 4501 and an interface 4502. There may be one or more processors 4501 and one or more interfaces 4502.

For a case in which the chip is configured to implement functions of a station in embodiments of this application, refer to the following descriptions.

In an implementation, the interface 4502 is configured to receive a trigger frame from an access point.

The trigger frame includes a plurality of user information fields that are the same as an association identifier of the station, and each user information field indicates one or more resource units allocated to the station; or the trigger frame includes one user information field that is the same as an association identifier of the station, and the one user information field indicates a plurality of resource units allocated to the station.

The processor 4501 is configured to determine the plurality of allocated resource units based on the trigger frame.

For a case in which the chip is configured to implement functions of an access point in embodiments of this application, refer to the following descriptions.

In an implementation, the processor 4501 is configured to determine a plurality of resource units allocated to a station.

The interface 4502 is configured to send a trigger frame to the station, where the trigger frame includes a plurality of user information fields that are the same as an association identifier of the station, and each user information field indicates one or more resource units allocated to the station; or the trigger frame includes one user information field that is the same as an association identifier of the station, and the one user information field indicates the plurality of resource units allocated to the station.

Optionally, the chip further includes a memory 4503, where the memory 4503 is configured to store program instructions and data that are necessary for a terminal device.

A person skilled in the art may further understand that various illustrative logical blocks (illustrative logical block) and steps (step) that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of embodiments of this application.

This application further provides a computer-readable storage medium. The computer-readable storage medium stores a computer program, and when the computer-readable storage medium is executed by a computer, a function of any one of the foregoing method embodiments is implemented.

This application further provides a computer program product. When the computer program product is executed by a computer, functions of any one of the foregoing method embodiments are implemented.

All or some of the embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state disk (SSD)), or the like.

A person of ordinary skill in the art may understand that various numerals such as "first" and "second" in this application are merely used for differentiation for ease of description, and are not used to limit the scope of embodiments of this application or represent a sequence.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store". "pre-negotiate", "pre-configure", "solidify", or "pre-burn".

A person of ordinary skill in the art may be aware that, with reference to the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A resource allocation method, comprising:
receiving, by a station, a trigger frame from an access point, wherein the trigger frame comprises one user information field corresponding to the station, wherein the user information field comprises a frequency band range indication and a resource unit indication, wherein the frequency band range indication indicates an 80 MHz frequency band range in a bandwidth and the resource unit indication indicates one index of a combination of a plurality of resource units allocated to the station, wherein the combination of the plurality of resource units is one of the following combinations:
a combination of a second lowest-frequency 52-tone resource unit in a 20 MHz frequency band range and a second lowest-frequency 26-tone resource unit in the 20 MHz frequency band range;
a combination of a second highest-frequency 52-tone resource unit in the 20 MHz frequency band range and a second highest-frequency 26-tone resource unit in the 20 MHz frequency band range;
a combination of a second lowest-frequency 52-tone resource unit in the 20 MHz frequency band range in the 80 MHz frequency band range and a 26-tone resource unit in a center of the 20 MHz frequency band range;
a combination of a low-frequency 106-tone resource unit in the 20 MHz frequency band range in the 80 MHz frequency band range and a 26-tone resource unit in a center of the 20 MHz frequency band range;
a combination of a high-frequency 106-tone resource unit in the 20 MHz frequency band range in the 80 MHz frequency band range and a 26-tone resource unit in a center of the 20 MHz frequency band range;

a combination of a low-frequency 484-tone resource unit in the 80 MHz frequency band range and a second highest-frequency 242-tone resource unit in the 80 MHz frequency band range;
a combination of a high-frequency 484-tone resource unit in the 80 MHz frequency band range and a second lowest-frequency 242-tone resource unit in the 80 MHz frequency band range;
a combination of a low-frequency 484-tone resource unit in the 80 MHz frequency band range and a highest-frequency 242-tone resource unit in the 80 MHz frequency band range; or
a combination of a high-frequency 484-tone resource unit in the 80 MHz frequency band range and a lowest-frequency 242-tone resource unit in the 80 MHz frequency band range;
determining, by the station, the plurality of allocated resource units based on the trigger frame;
wherein the 20 MHz frequency band range is one of the following: a first 20 MHz frequency band range in the 80 MHz frequency band range, a second 20 MHz frequency band range in the 80 MHz frequency band range, a third 20 MHz frequency band range in the 80 MHz frequency band range, or a fourth 20 MHz frequency band range in the 80 MHz frequency band range.

2. The method according to claim 1, wherein the 80 MHz frequency band range indicated by the frequency band range indication is any one of the following:
a primary 80 MHz frequency band range, a secondary 80 MHz frequency band range, a third 80 MHz frequency band range, or a fourth 80 MHz frequency band range.

3. The method according to claim 1, wherein the frequency band range indication occupies 2 bits.

4. The method according to claim 1, further comprising:
sending, by station to the access point, a data packet on the plurality of resource units allocated to the station.

5. The method according to claim 4, wherein the data packet is an extremely high throughput trigger-based physical layer protocol data unit (EHT TB PPDU).

6. A communication apparatus, comprising:
at least one processor; and
at least one computer-readable storage medium, wherein the at least one computer-readable storage medium stores instructions, and wherein the instructions, when executed by the at least one processor, cause the communication apparatus to:
receive a trigger frame from an access point, wherein the trigger frame comprises one user information field corresponding to a station, wherein the user information field comprises a frequency band range indication and a resource unit indication, wherein the frequency band range indication indicates an 80 MHz frequency band range in a bandwidth and the resource unit indication indicates one index of a combination of a plurality of resource units allocated to the station, wherein the combination of the plurality of resource units is one of the following combinations:
a combination of a second lowest-frequency 52-tone resource unit in a 20 MHz frequency band range and a second lowest-frequency 26-tone resource unit in the 20 MHz frequency band range;
a combination of a second highest-frequency 52-tone resource unit in the 20 MHz frequency band range and a second highest-frequency 26-tone resource unit in the 20 MHz frequency band range;

a combination of a second lowest-frequency 52-tone resource unit in the 20 MHz frequency band range in the 80 MHz frequency band range and a 26-tone resource unit in a center of the 20 MHz frequency band range;

a combination of a low-frequency 106-tone resource unit in the 20 MHz frequency band range in the 80 MHz frequency band range and a 26-tone resource unit in a center of the 20 MHz frequency band range;

a combination of a high-frequency 106-tone resource unit in the 20 MHz frequency band range in the 80 MHz frequency band range and a 26-tone resource unit in a center of the 20 MHz frequency band range;

a combination of a low-frequency 484-tone resource unit in the 80 MHz frequency band range and a second highest-frequency 242-tone resource unit in the 80 MHz frequency band range;

a combination of a high-frequency 484-tone resource unit in the 80 MHz frequency band range and a second lowest-frequency 242-tone resource unit in the 80 MHz frequency band range;

a combination of a low-frequency 484-tone resource unit in the 80 MHz frequency band range and a highest-frequency 242-tone resource unit in the 80 MHz frequency band range; or a combination of a high-frequency 484-tone resource unit in the 80 MHz frequency band range and a lowest-frequency 242-tone resource unit in the 80 MHz frequency band range;

determine the plurality of allocated resource units based on the trigger frame;

wherein the 20 MHz frequency band range is one of the following: a first 20 MHz frequency band range in the 80 MHz frequency band range, a second 20 MHz frequency band range in the 80 MHz frequency band range, a third 20 MHz frequency band range in the 80 MHz frequency band range, or a fourth 20 MHz frequency band range in the 80 MHz frequency band range.

7. The communication apparatus according to claim 6, wherein the 80 MHz frequency band range indicated by the frequency band range indication is any one of the following:

a primary 80 MHz frequency band range, a secondary 80 MHz frequency band range, a third 80 MHz frequency band range, or a fourth 80 MHz frequency band range.

8. The communication apparatus according to claim 6, wherein the frequency band range indication occupies 2 bits.

9. The communication apparatus according to claim 6, wherein the instructions, when executed by the at least one processor, further cause the communication apparatus to:

send, to the access point, a data packet on the plurality of resource units allocated to the station.

10. The communication apparatus according to claim 9, wherein the data packet is an extremely high throughput trigger-based physical layer protocol data unit (EHT TB PPDU).

11. A chip, comprising:

at least one processor; and at least one computer-readable storage medium, wherein the at least one computer-readable storage medium stores instructions, and wherein the instructions, when executed by the at least one processor, cause a communication apparatus comprising the chip to:

receive a trigger frame from an access point, wherein the trigger frame comprises one user information field corresponding to a station, wherein the user information field comprises a frequency band range indication and a resource unit indication, wherein the frequency band range indication indicates an 80 MHz frequency band range in a bandwidth and the resource unit indication indicates one index of a combination of a plurality of resource units allocated to the station, wherein the combination of the plurality of resource units is one of the following combinations:

a combination of a second lowest-frequency 52-tone resource unit in a 20 MHz frequency band range and a second lowest-frequency 26-tone resource unit in the 20 MHz frequency band range;

a combination of a second highest-frequency 52-tone resource unit in the 20 MHz frequency band range and a second highest-frequency 26-tone resource unit in the 20 MHz frequency band range;

a combination of a second lowest-frequency 52-tone resource unit in the 20 MHz frequency band range in the 80 MHz frequency band range and a 26-tone resource unit in a center of the 20 MHz frequency band range;

a combination of a low-frequency 106-tone resource unit in the 20 MHz frequency band range in the 80 MHz frequency band range and a 26-tone resource unit in a center of the 20 MHz frequency band range;

a combination of a high-frequency 106-tone resource unit in the 20 MHz frequency band range in the 80 MHz frequency band range and a 26-tone resource unit in a center of the 20 MHz frequency band range;

a combination of a low-frequency 484-tone resource unit in the 80 MHz frequency band range and a second highest-frequency 242-tone resource unit in the 80 MHz frequency band range;

a combination of a high-frequency 484-tone resource unit in the 80 MHz frequency band range and a second lowest-frequency 242-tone resource unit in the 80 MHz frequency band range;

a combination of a low-frequency 484-tone resource unit in the 80 MHz frequency band range and a highest-frequency 242-tone resource unit in the 80 MHz frequency band range; or a combination of a high-frequency 484-tone resource unit in the 80 MHz frequency band range and a lowest-frequency 242-tone resource unit in the 80 MHz frequency band range;

determine the plurality of allocated resource units based on the trigger frame;

wherein the 20 MHz frequency band range is one of the following: a first 20 MHz frequency band range in the 80 MHz frequency band range, a second 20 MHz frequency band range in the 80 MHz frequency band range, a third 20 MHz frequency band range in the 80 MHz frequency band range, or a fourth 20 MHz frequency band range in the 80 MHz frequency band range.

12. The chip according to claim 11, wherein the 80 MHz frequency band range indicated by the frequency band range indication is one of the following:

a primary 80 MHz frequency band range, a secondary 80 MHz frequency band range, a third 80 MHz frequency band range, or a fourth 80 MHz frequency band range.

13. The chip according to claim 11, wherein the frequency band range indication occupies 2 bits.

14. The chip according to claim 11, wherein the instructions, when executed by the at least one processor, further cause the communication apparatus comprising the chip to:

send, to the access point, a data packet on the plurality of resource units allocated to the station.

15. The chip according to claim 14, wherein the data packet is an extremely high throughput trigger-based physical layer protocol data unit (EHT TB PPDU).

\*    \*    \*    \*    \*